US011243456B2

(12) United States Patent
Fujihashi et al.

(10) Patent No.: US 11,243,456 B2
(45) Date of Patent: Feb. 8, 2022

(54) MOUNT DEVICE INCLUDING A PLURALITY OF TERMINALS INCLUDING A TERMINAL USED FOR SUPPLYING OF ELECTRIC POWER, ACCESSORY DETACHABLY ATTACHED TO THE MOUNT DEVICE, CONTROL METHOD FOR THE MOUNT DEVICE, AND NON-TRANSITORY COMPUTER-READABLE STORAGE MEDIUM STORING PROGRAM FOR PERFORMING THE CONTROL METHOD

(71) Applicant: CANON KABUSHIKI KAISHA, Tokyo (JP)

(72) Inventors: Naoto Fujihashi, Tokyo (JP); Yasuyuki Watazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 352 days.

(21) Appl. No.: 16/540,302

(22) Filed: Aug. 14, 2019

(65) Prior Publication Data

US 2020/0073209 A1 Mar. 5, 2020

(30) Foreign Application Priority Data

Aug. 30, 2018 (JP) ............................ JP2018-161164

(51) Int. Cl.
*G03B 17/56* (2021.01)
*G03B 17/14* (2021.01)

(52) U.S. Cl.
CPC ........... *G03B 17/14* (2013.01); *G03B 17/565* (2013.01); *G03B 2206/00* (2013.01)

(58) Field of Classification Search
CPC ...... G03B 17/14; G03B 17/18; G03B 17/565; H04N 5/2253; H04N 5/2254; H04N 5/23209
See application file for complete search history.

(56) References Cited

U.S. PATENT DOCUMENTS 10,666,842 B2 * 5/2020 Yasuda ................ G03B 17/565
2013/0028590 A1 1/2013 Hasuda
2013/0077954 A1 * 3/2013 Oikawa .................. G03B 17/14 396/530

(Continued)

FOREIGN PATENT DOCUMENTS

CN 103019008 A 4/2013
CN 103365042 A 10/2013

(Continued)

*Primary Examiner* — Christopher E Mahoney
(74) *Attorney, Agent, or Firm* — Canon U.S.A., Inc. I.P. Division

(57) ABSTRACT

In a mount device including a mount which an accessory is attachable to and detachable from, a plurality of terminals arranged along a circumferential direction of the mount and used for electrical connection with the accessory includes a first terminal which is used to supply driving electric power serving as a first voltage to the accessory, and a second terminal which exhibits a voltage that changes according to the accessory mounted to the mount device, wherein the second terminal is able to be set to an input state or an output state, and is set to the input state during a period in which the driving electric power is not output to the accessory via the first terminal.

20 Claims, 32 Drawing Sheets

(56) References Cited

U.S. PATENT DOCUMENTS

| | | | | |
|---|---|---|---|---|
| 2013/0265657 | A1* | 10/2013 | Hasegawa | H04N 5/2254 359/755 |
| 2018/0224720 | A1* | 8/2018 | Pan | G03B 17/14 |

FOREIGN PATENT DOCUMENTS

| | | | | | |
|---|---|---|---|---|---|
| CN | 106027859 | A | | 10/2016 | |
| JP | 2003-015011 | A | | 1/2003 | |
| JP | 2012-078770 | A | | 4/2012 | |
| JP | 2013-214009 | A | | 10/2013 | |
| WO | WO-2018179319 | A1 | * | 10/2018 | G03B 9/02 |

* cited by examiner

SECTION C-C

SECTION C-C

FIG.24

| ELECTRIC POWER MODE | UPPER LIMIT OF SUPPLIED ELECTRIC POWER |
|---|---|
| Full Power Mode | 10 W |
| High Power Mode | 7 W |
| Mid Power Mode | 5 W |
| Low Power Mode | 3 W |

MOUNT DEVICE INCLUDING A PLURALITY OF TERMINALS INCLUDING A TERMINAL USED FOR SUPPLYING OF ELECTRIC POWER, ACCESSORY DETACHABLY ATTACHED TO THE MOUNT DEVICE, CONTROL METHOD FOR THE MOUNT DEVICE, AND NON-TRANSITORY COMPUTER-READABLE STORAGE MEDIUM STORING PROGRAM FOR PERFORMING THE CONTROL METHOD

BACKGROUND OF THE INVENTION

Field of the Invention

Aspects of the present invention generally relate to an imaging apparatus and an accessory each of which includes a mount including terminals which are able to electrically connect to another apparatus.

Description of the Related Art

A known accessory (camera accessory) which is attachable to and detachable from an imaging apparatus receives the supply of electric power from the imaging apparatus or performs communication of, for example, various instructions and data between the accessory and the imaging apparatus while the accessory is in the state of being mounted to the imaging apparatus. Usually, to enable performing such supplying of electric power and communication, a mounting portion, which is called a mount, used for coupling between the imaging apparatus and the accessory is including a plurality of terminals, which is configured to be electrically connected to other terminals by contact with the other terminals. Then, the plurality of terminals may be used to perform the respective independent communications via different communication systems.

For example, in a technique discussed in Japanese Patent Application Laid-Open No. 2012-078770, a plurality of communication systems independent and different in communication speed is provided, and the arrangement sequence of terminals respectively associated with the plurality of communication systems is determined. Then, in the technique discussed in Japanese Patent Application Laid-Open No. 2012-078770, a terminal associated with a communication system in which the communication speed is high is located near a power source terminal in which there are few changes of current.

SUMMARY OF THE INVENTION

According to an aspect of the present invention, a mount device including a second mount which an accessory including a first mount is attachable to and detachable from includes a plurality of terminals arranged along a circumferential direction of the second mount and used for electrical connection with the accessory, the plurality of terminals including a first terminal which is used to supply driving electric power serving as a first voltage for driving an internal member of the accessory while the accessory is in a state of being mounted to the mount device, and a second terminal which is located adjacent to the first terminal and which exhibits a voltage that changes according to the accessory mounted to the mount device, wherein the second terminal is able to be set to an input state or an output state and is set to the input state during a period in which the driving electric power is not output to the accessory via the first terminal.

Further features of the present invention will become apparent from the following description of embodiments with reference to the attached drawings.

BRIEF DESCRIPTION OF THE DRAWINGS

FIG. 24 is a diagram illustrating, as an example, electric power modes which are able to be used to perform drive control of the first interchangeable lens with use of mode 2, according to the present embodiment.

DESCRIPTION OF THE EMBODIMENTS

Various embodiments, features, and aspects of the invention will be described in detail below with reference to the drawings.

<Connection System for Imaging Apparatus and Camera Accessory>

An embodiment of the present invention is described as follows with reference to FIG. 1 to FIGS. 19A and 19B.

Figure 1:
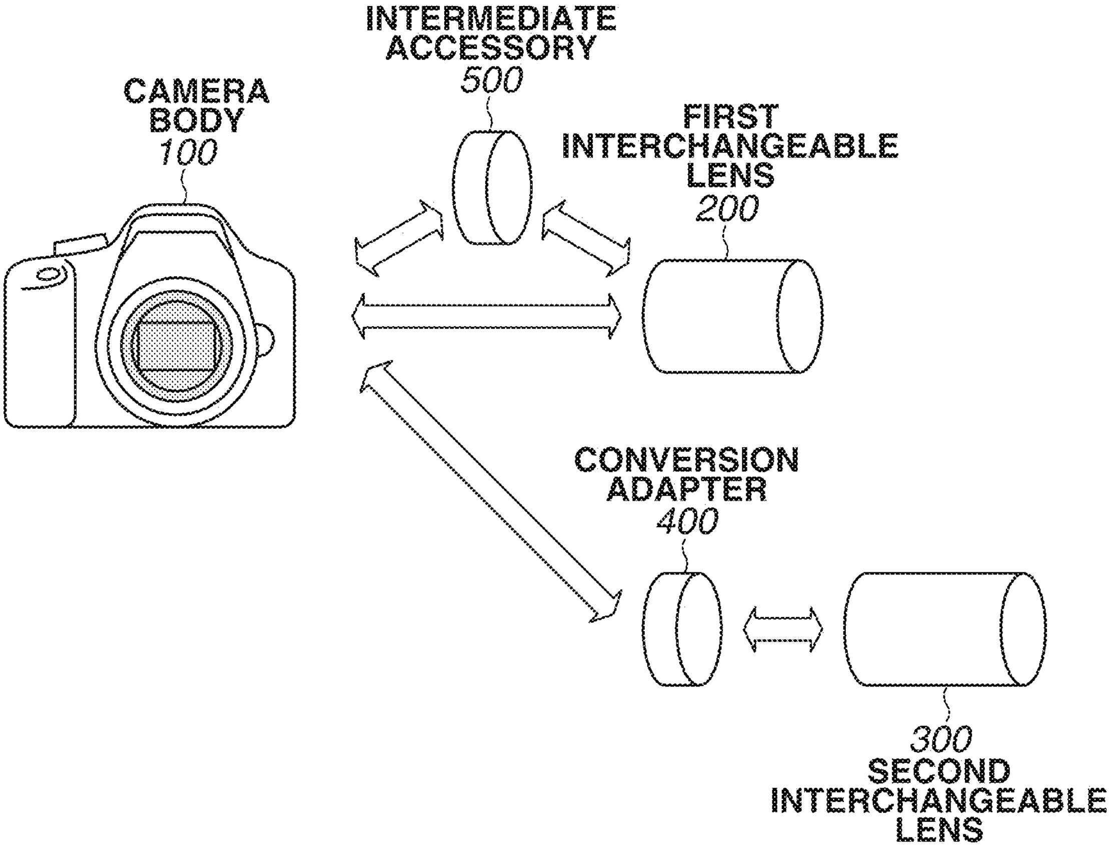
FIG. 1 is a system diagram illustrating, as an example, types of camera accessories which are able to be mounted to a camera body, according to an embodiment of the present invention.

First, an example of connection between an imaging apparatus, which employs a lens-interchangeable system, and a camera accessory according to the present embodiment is described with reference to FIG. 1. FIG. 1 is a system diagram illustrating, as an example, types of camera accessories which are able to be mounted to a camera body 100, according to the present embodiment. Furthermore, examples of the camera accessory in the present embodiment include an interchangeable lens, a conversion adapter, and an intermediate accessory each of which is including an accessory mount that is able to be coupled to a camera mount provided in the imaging apparatus. Specifically, the above-mentioned accessory mount is including a plurality of accessory recessed portions and a plurality of accessory tabs, which are able to engage with a plurality of camera tabs and a plurality of camera recessed portions arranged in sequence along a circumferential direction approximately perpendicular to the optical axis in the camera mount. Then, the accessory mount is able to shift from a fitted-in state in which the tabs and recessed portions of the respective mounts are fitted in each other to an engaged state in which the tabs of the respective mounts are engaged with each other in a direction parallel to the optical axis (hereinafter referred to simply as an "optical axis direction"). Furthermore, the fitted-in state corresponds to a mounting start state of the camera accessory described below, and the engaged state corresponds to a mounting completion state of the camera accessory described below.

The camera accessories which are able to be connected to the camera body 100 are described with reference to FIG. 1. A first interchangeable lens 200 is one of camera accessories which are able to be directly mounted to the camera body 100, and includes a lens mount B, which serves as an accessory mount that is able to be directly coupled to a camera mount (described below) of the camera body 100. Moreover, an intermediate accessory 500 is one of camera accessories which are able to be directly mounted to the camera body 100, and includes the lens mount B, which serves as an accessory mount that is able to be directly coupled to the camera body 100, and a camera mount A, which is able to be directly coupled to the first interchangeable lens 200. Thus, the first interchangeable lens 200 is also able to be connected to the camera body 100 via the intermediate accessory 500.

Moreover, a second interchangeable lens 300 is able to be indirectly mounted to the camera body 100 via a conversion adapter 400, which is able to be directly mounted to the camera body 100. Thus, a lens mount D, which serves as an accessory mount provided in the second interchangeable lens 300, is not able to be directly coupled to a camera mount A provided in the camera body 100. Then, a camera mount C provided in the conversion adapter 400 is able to be directly coupled (mounted) to the lens mount D of the second interchangeable lens 300.

As mentioned above, each of the first interchangeable lens 200, the first interchangeable lens 200 using the intermediate accessory 500 as a coupling medium, and the second interchangeable lens 300 using the conversion adapter 400 as a coupling medium is able to be mounted to the camera body 100. Furthermore, hereinafter, with regard to descriptions which are common to the first interchangeable lens 200 and the second interchangeable lens 300, the first interchangeable lens 200 and the second interchangeable lens 300 are collectively referred to as an "interchangeable lens".

<Basic Configurations of Camera Body 100 and First Interchangeable Lens 200>

Figure 2:
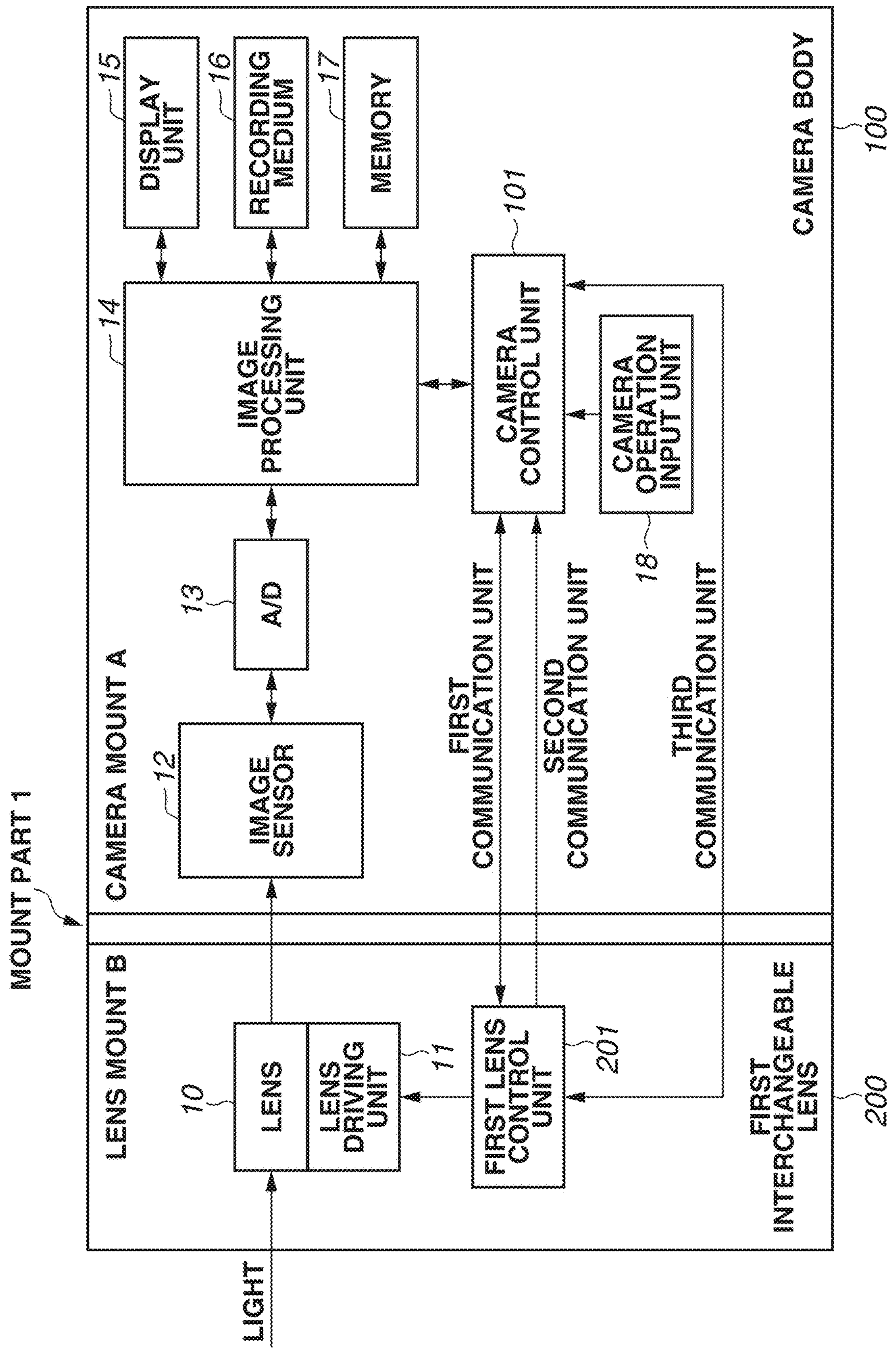
FIG. 2 is a block diagram illustrating, as an example, a camera system including a first interchangeable lens and a camera body, which allows the first interchangeable lens to be directly coupled thereto, according to the present embodiment.

Next, basic configurations of the camera body 100 and the first interchangeable lens 200 are described with reference to FIG. 2. FIG. 2 is a block diagram illustrating, as an example, a camera system including the first interchangeable lens 200 and the camera body 100, which allows the first interchangeable lens 200 to be directly coupled thereto (attached thereto and detached therefrom), according to the present embodiment. In FIG. 2, both the respective mounts provided in the first interchangeable lens 200 and the camera body 100 are collectively referred to as a "mount part 1". Details of the respective mounts provided in the first interchangeable lens 200 and the camera body 100 are described below. Furthermore, in the present embodiment, the imaging apparatus (for example, the camera body 100) and the camera accessory (for example, the first interchangeable lens 200) are able to be attached to and detached from each other.

The camera body 100 is an imaging apparatus typified by a digital camera. As illustrated in FIG. 2, the camera body 100 includes a charge storage-type solid-state image sensor (hereinafter referred to simply as an "image sensor") 12, which photoelectrically converts the optical image of a subject guided by a lens 10 provided inside the first interchangeable lens 200 to output an electrical signal. Moreover, the camera body 100 includes an analog-to-digital (A/D) conversion unit 13, which converts an analog electrical signal output from the image sensor 12 into a digital signal, and an image processing unit 14, which performs various image processing operations on the digital signal to generate a video signal. A video signal (a still image or a moving image) generated by the image processing unit 14 is able to be displayed on a display unit 15 and to be recorded on a recording medium 16.

Moreover, the camera body 100 includes a memory 17, which serves as a buffer used to perform processing on the video signal and stores an operation program which a camera control unit 101 described below uses.

Moreover, the camera body 100 includes a camera operation input unit 18, which includes, for example, a power switch for performing powering-on and powering-off, an image capturing switch (release switch) for starting recording of a video signal, and selection and setting switches for performing setting of various menus. Moreover, the camera body 100 includes the camera control unit 101, which includes a microprocessor (or a central processing unit (CPU)) for comprehensively controlling operations of the camera body 100 and the camera accessory that is able to be mounted to the camera body 100. For example, the camera control unit 101 performs various setting operations based on signals input from the camera operation input unit 18, or controls communications with a first lens control unit 201 included in the first interchangeable lens 200 via the mount part 1.

On the other hand, the first interchangeable lens 200 includes a lens 10, which is an optical member including a plurality of lens groups, such as a zoom lens, a shift lens, and a focus lens, and a light quantity adjustment member, such as a diaphragm. Moreover, the first interchangeable lens 200 includes actuators for moving or operating components of the optical member, such as the plurality of lens groups and the light quantity adjustment member, and further includes a lens driving unit 11 for driving the actuators. Moreover, the first interchangeable lens 200 includes the first lens control unit 201, which includes a lens microprocessor (or a lens CPU (LCPU)) for comprehensively controlling operations of the first interchangeable lens 200. For example, the first lens control unit 201 controls communications with the camera control unit 101 via the mount part 1, or controls the lens driving unit 11.

<Basic Configuration of Electrical Terminals>

Figure 3:
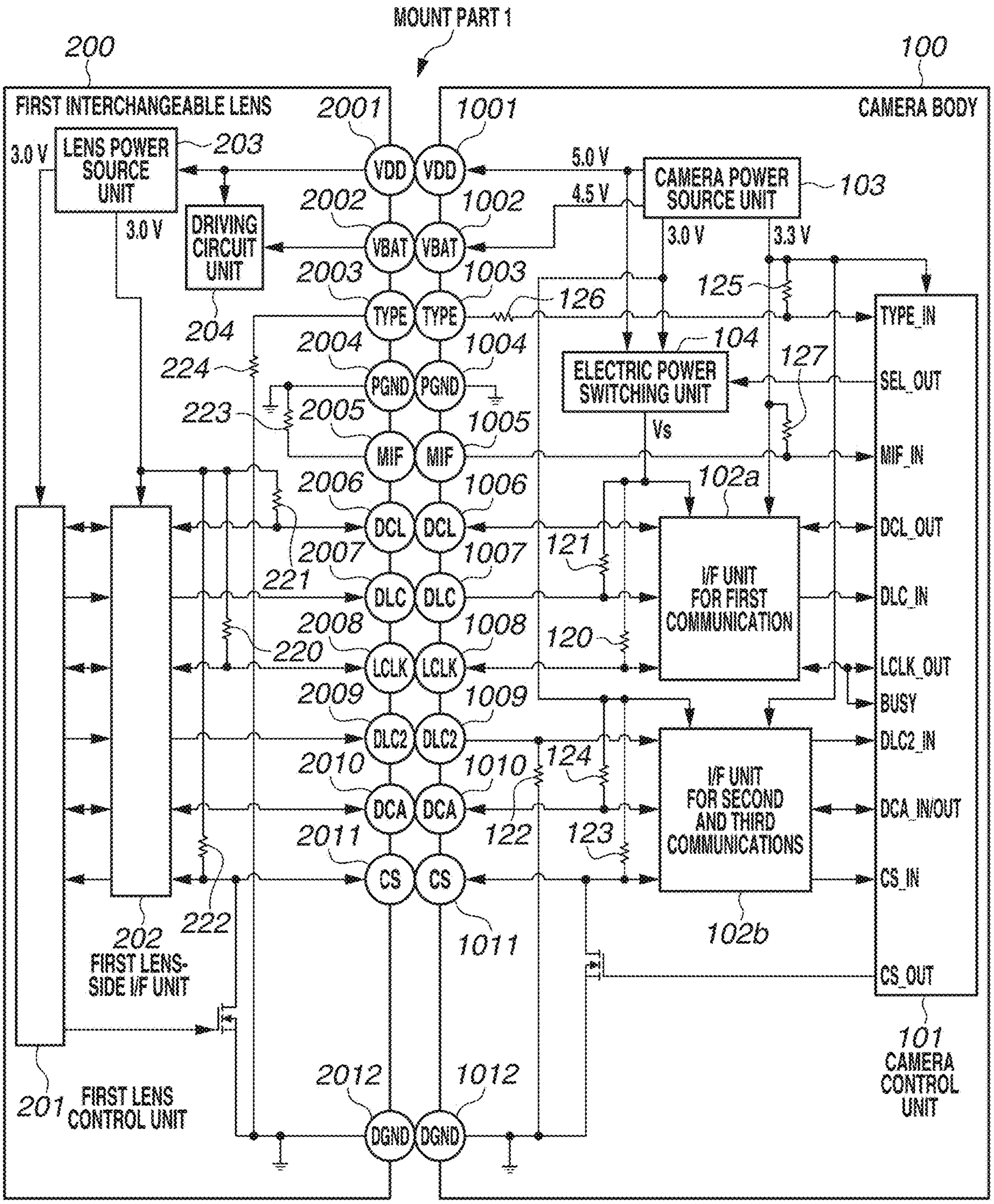
FIG. 3 is a block diagram illustrating, as an example, internal configurations of the first interchangeable lens and the camera body in the state in which the first interchangeable lens is connected to the camera body, according to the present embodiment.

Next, a camera internal configuration in the connection state between the camera body 100 and the first interchangeable lens 200 is described with reference to FIG. 3. FIG. 3 is a block diagram illustrating, as an example, internal configurations of the first interchangeable lens 200 and the camera body 100 in the state in which the first interchangeable lens 200 is connected to the camera body 100, according to the present embodiment. Furthermore, the camera mount and the lens mount include a lock mechanism, a mount holding mechanism, and a plurality of electrical terminals. Details of the respective mounts are described below.

Figure 4A:
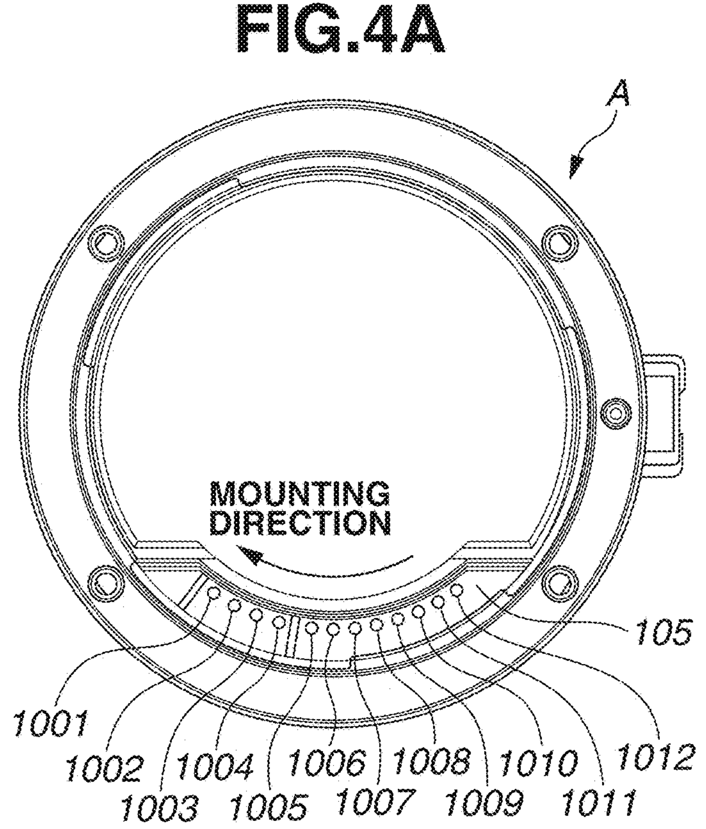
FIGS. 4A and 4B are diagrams illustrating, as an example, configurations of a camera mount A and a lens mount B, respectively, according to the present embodiment.
Figure 4B:
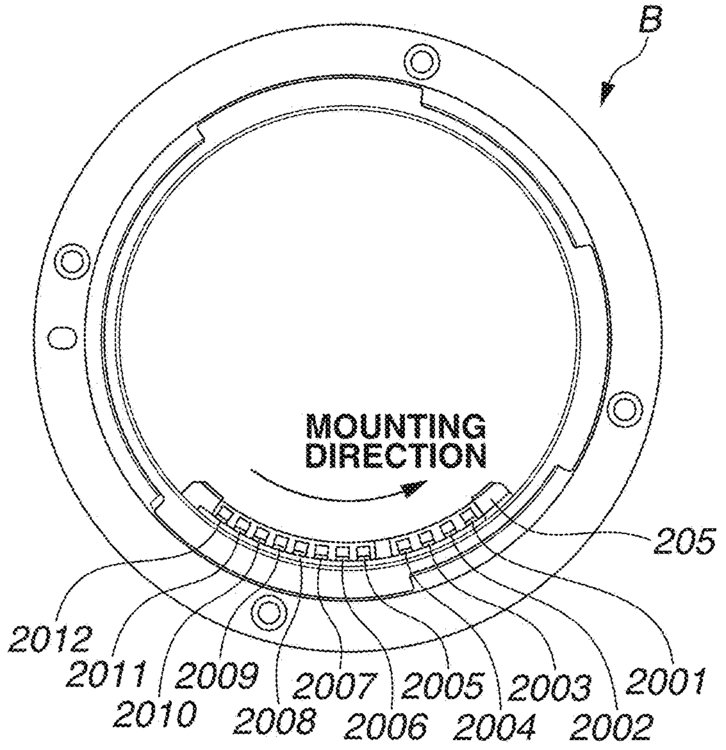

As illustrated in FIG. 3, the mount part 1 includes a plurality of terminals which are able to electrically connect the camera body 100 and the first interchangeable lens 200 to each other. In the camera body 100, the plurality of terminals (camera-side terminals) is exposed on the outside of the camera body 100 as a plurality of electrical contact pins provided in a contact holding member 105, which corresponds to a terminal holding portion of the ring-shaped camera mount A, as illustrated in FIG. 4A. Moreover, in the first interchangeable lens 200, the plurality of terminals (accessory-side terminals) is exposed on the outside of the first interchangeable lens 200 as a plurality of electrical contact surfaces provided in a contact surface holding member 205, which corresponds to a terminal holding portion of the ring-shaped lens mount B, as illustrated in FIG. 4B. The electrical contact pins on the side of the camera body 100 and the electrical contact surfaces on the side of the first interchangeable lens 200 are kept in contact with each other in the state in which the first interchangeable lens 200 is mounted to the camera body 100, so that the respective corresponding contacts are electrically connected to each other.

Furthermore, in the present embodiment, each mount is provided with a step difference, which is a difference in height in the optical axis direction (the central axis direction of the mount), in such a manner that the contact positions between the respective corresponding terminals formed in the respective mounts differ from each other in the optical axis direction of each mount. Such a plurality of terminals is assumed to be unitized as a single component, and, in each mount, each terminal is assumed to be connected to a flexible printed circuit board as a single wiring portion.

Figure 18:
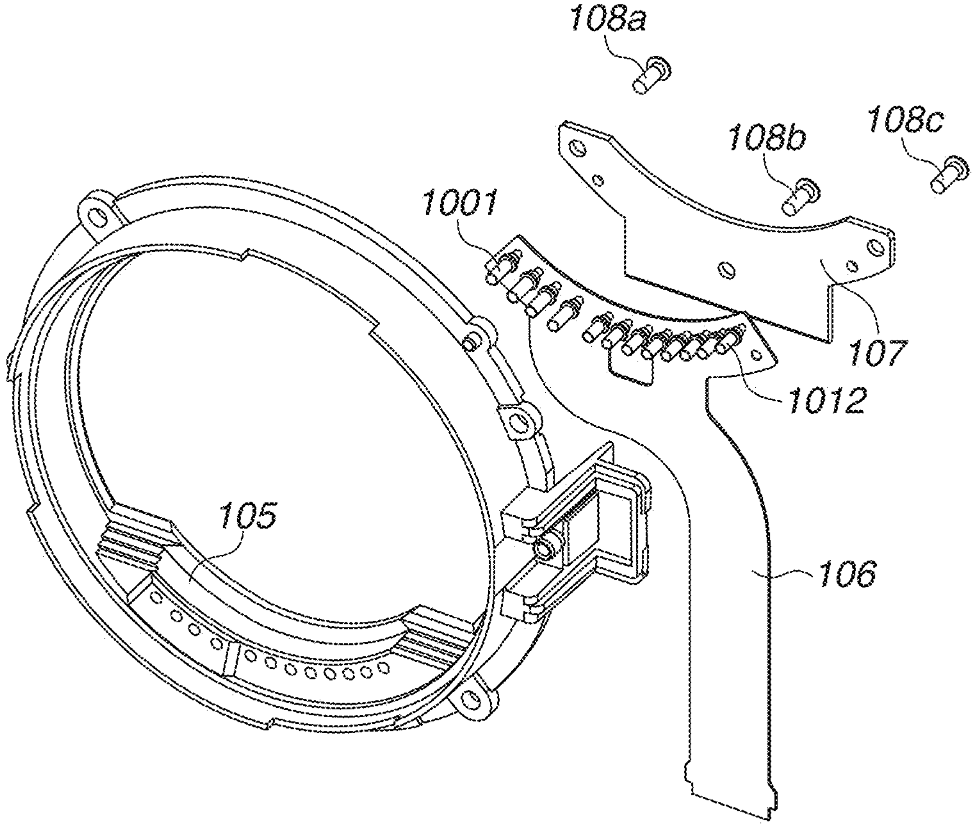
FIG. 18 is a diagram, illustrating, as an example, an internal configuration of the camera mount A of the camera body, according to the present embodiment.

FIG. 18 is a diagram illustrating, as an example, an internal configuration of the camera mount A of the camera body 100, according to the present embodiment. For example, as illustrated in FIG. 18, each terminal is electrically connected to an internal circuit board (not illustrated), which is provided inside the camera body 100, by a single flexible printed circuit board 106. Then, the contact holding member 105 is provided with a plurality of hole portions, into which the respective terminals are insertable, at positions thereof where the respective terminals are held, so that terminals 1001 to 1012, serving as camera-side terminals, are respectively inserted into the plurality of hole portions. In this state, a restraining plate 107 restrains each terminal toward the subject side (mount contacting surface side) in the optical axis direction, and screws 108*a*, 108*b*, and 108*c* are fastened to the contact holding member 105 while penetrating through the through-holes of the restraining plate 107.

Furthermore, while, in the present embodiment, a single unit structure of the camera mount A in the camera body 100 has been described, this also applies to the other mounts described below at least with respect to such a feature that a plurality of terminals is electrically connected to a single flexible printed circuit board (wiring).

In this configuration, for example, as compared with a case where a group of terminals of each mount is divided into a plurality of units and the respective units are scattered in the circumferential direction of the mount, the respective terminals can be collectively located at a position away from an exposure opening provided in front of the image sensor 12. Accordingly, in a case where, for example, undesirable light has entered the camera mount side while a camera accessory is mounted to the camera body 100, an influence of undesirable light reflected by a terminal made of a metallic member on image capturing of a subject can be reduced. Moreover, forming the terminals as a single unit reduces any complicated arrangement of wirings inside the imaging apparatus and the camera accessory and facilitates assembling of each mount.

The function of each terminal common to both the camera mount A and the lens mount B is described as follows. VDD terminals 1001 and 2001 are terminals used to supply, from the camera body 100 to a camera accessory (for example, the first interchangeable lens 200), communication control electric power (VDD), which primarily serves as communication electric power for use in communication control. Furthermore, the voltage of electric power which is supplied to the first interchangeable lens 200 via the VDD terminals 1001 and 2001 is set to 5.0 V.

VBAT terminals 1002 and 2002 are terminals used to supply, from the camera side to the camera accessory side, driving electric power (VBAT), which serves as driving power used for operations of mechanical driving portions of actuators used for driving of the diaphragm and the focus lens. In other words, the VBAT terminals 1002 and 2002 are terminals used to supply electric power other than the above-mentioned communication electric power. Furthermore, the voltage of electric power which is supplied to the first interchangeable lens 200 via the VBAT terminals 1002 and 2002 is set to 4.5 V. Moreover, the above-mentioned VDD terminals and VBAT terminals are power source system terminals for supplying electric power from the camera body 100 to the camera accessory. Furthermore, voltages to be supplied via the VBAT terminals can be configured to be changeable by changing the output setting of a power source circuit according to the type of an accessory which is mounted to the camera body 100.

DGND terminals 1012 and 2012 are grounding terminals (ground terminals) which are associated with the communication control electric power VDD. In other words, the DGND terminals 1012 and 2012 are terminals which exhibit the ground level (the voltage thereof) associated with predetermined terminals. Furthermore, in the present embodiment, the term "grounding" refers to making the level of voltage of the ground terminal equal to approximately the same level (ground level) as that of the negative electrode side of a power source such as a battery.

PGND terminals 1004 and 2004 are terminals which exhibit a ground level associated with terminals of a mechanical driving system including, for example, motors (actuators) provided in the camera body 100 and the camera accessory (for example, the first interchangeable lens 200). In other words, the PGND terminals are grounding terminals (ground terminals) which are associated with the driving electric power VBAT. The above-mentioned DGND terminals and PGND terminals are ground terminals used to connect various power source systems of the camera body 100 and the camera accessory to the ground level.

MIF terminals 1005 and 2005 are terminals used to detect that the camera accessory (for example, the first interchangeable lens 200) has been mounted to the camera body 100. The MIF terminal line is pulled up to the same potential as that of the electric power for the camera control unit 101 via a resistor R_MIF 127 and is connected to an MIF_IN terminal, which is an input terminal of the camera control unit 101. The camera control unit 101 detects the level of a voltage which the MIF terminal exhibits, thus detecting that the camera accessory has been mounted to or has been detached from the camera body 100. Then, for example, after detecting mounting of the camera accessory in the above-mentioned detection method, the camera control unit 101 performs control to start supplying of electric power to the power source system terminals and start communication between the camera body 100 and the camera accessory.

TYPE terminals 1003 and 2003 are terminals used to discriminate the type of a camera accessory (for example, the first interchangeable lens 200) mounted to the camera body 100. The camera control unit 101 detects the value of voltage of a signal which the TYPE terminal exhibits, and discriminates the type of a camera accessory mounted to the camera body 100 based on the detected value. Furthermore, in the first interchangeable lens 200, the TYPE terminal is pull-down-connected to the DGND terminal with a predetermined resistance value described below. Furthermore, the resistance value varies depending on the type of a camera accessory.

Next, various terminals for communications between the camera body 100 and the camera accessory are described. Furthermore, a plurality of communication terminals provided at the mount part 1 is divided into a plurality of communication systems (groups), and each communication system is able to independently perform communication. In the present embodiment, LCLK terminals 1008 and 2008, DCL terminals 1006 and 2006, and DLC terminals 1007 and 2007 are set as terminals for a first communication unit which performs a first communication. Moreover, DLC2 terminals 1009 and 2009 are set as terminals for a second communication unit which performs a second communication, which is independent from the first communication unit. Additionally, CS terminals 1011 and 2011 and DCA terminals 1010 and 2010 are set as terminals for a third communication unit which performs a third communication, which is independent from the first and second communication units. In the present embodiment, the camera control unit 101 and the first lens control unit 201 are able to perform the first to third communications, which are independent from each other, via the above-mentioned plurality of communication terminals.

The LCLK terminals 1008 and 2008, which are terminals for the first communication unit, are terminals for clock signals for communication which are output from the camera body 100 to the camera accessory and are also terminals used for the camera body 100 to monitor a busy state of the camera accessory.

The DCL terminals 1006 and 2006, which are terminals for the first communication unit, are terminals for communication data used to perform two-way communication between the camera body 100 and the camera accessory.

The DLC terminals 1007 and 2007, which are terminals for the first communication unit, are terminals for communication data which is output from the camera accessory (for example, the first interchangeable lens 200) to the camera body 100.

The above-mentioned LCLK terminals, DCL terminals, and DLC terminals associated with the first communication unit are able to switch the output method for signals between what is called a CMOS output type and what is called an open type. Furthermore, the CMOS output type in the present embodiment is a type having switch outputs at both the high (H) side and the low (L) side which the voltage exhibits. On the other hand, the open type is a type having a switch output at only the L side. Furthermore, the open type in the present embodiment is what is called an open drain type, but can also be an open collector type.

The DLC2 terminals 1009 and 2009, which are terminals for the second communication unit, are terminals for communication data which is output from the camera accessory (for example, the first interchangeable lens 200) to the camera body 100.

The DCA terminals 1010 and 2010, which are terminals for the third communication unit, are terminals for communication data used to perform two-way communication between the camera body 100 and the camera accessory (for example, the first interchangeable lens 200).

The CS terminals 1011 and 2011, which are terminals for the third communication unit, are signal terminals for communication request between the camera body 100 and the camera accessory (for example, the first interchangeable lens 200). Furthermore, in the present embodiment, a communication voltage in each of the terminals associated with the first to third communication units in a case where the first interchangeable lens 200 is mounted to the camera body 100 is set to 3.0 V.

<Structure of Mount Part 1>

Figure 5A:
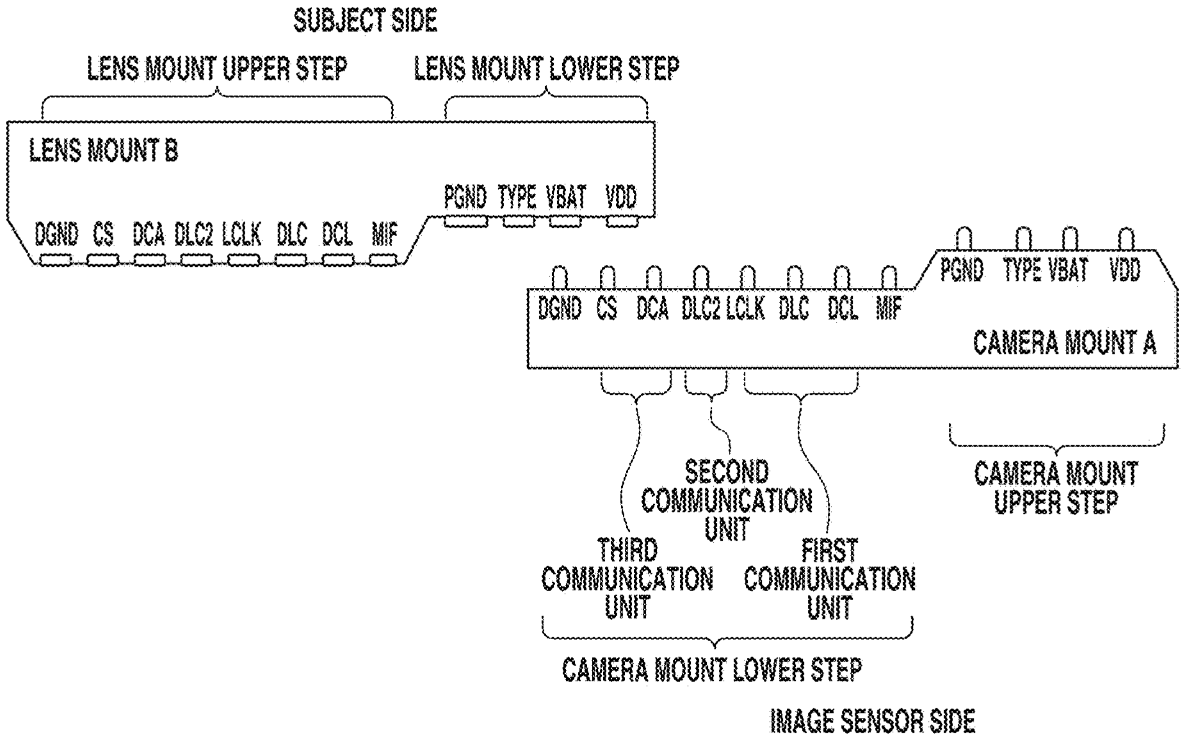
FIGS. 5A, 5B, and 5C are diagrams illustrating, as an example, connection states between the respective terminals caused by relative rotation of the camera mount A and the lens mount B, according to the present embodiment.
Figure 5B:
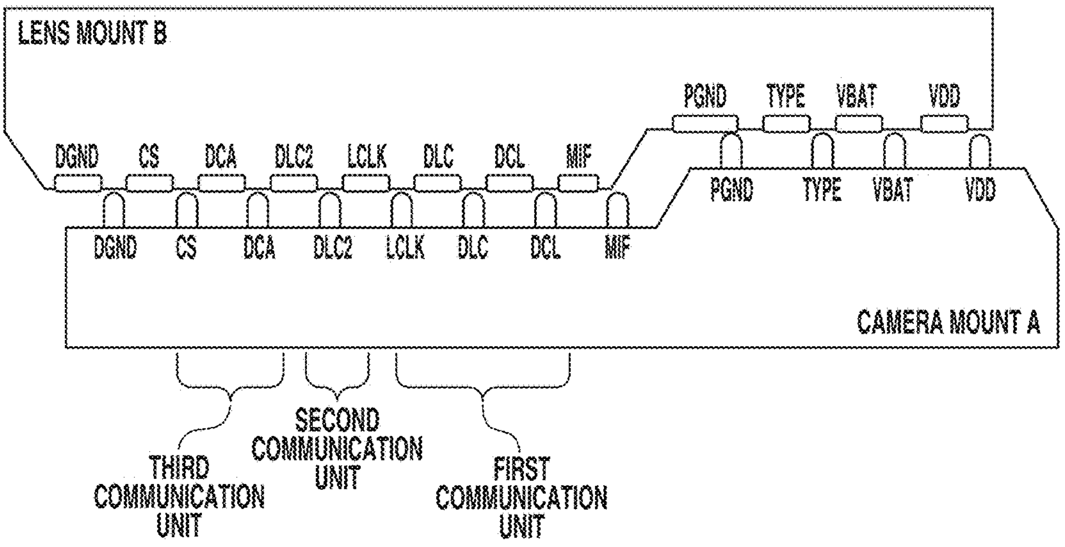
Figure 5C:
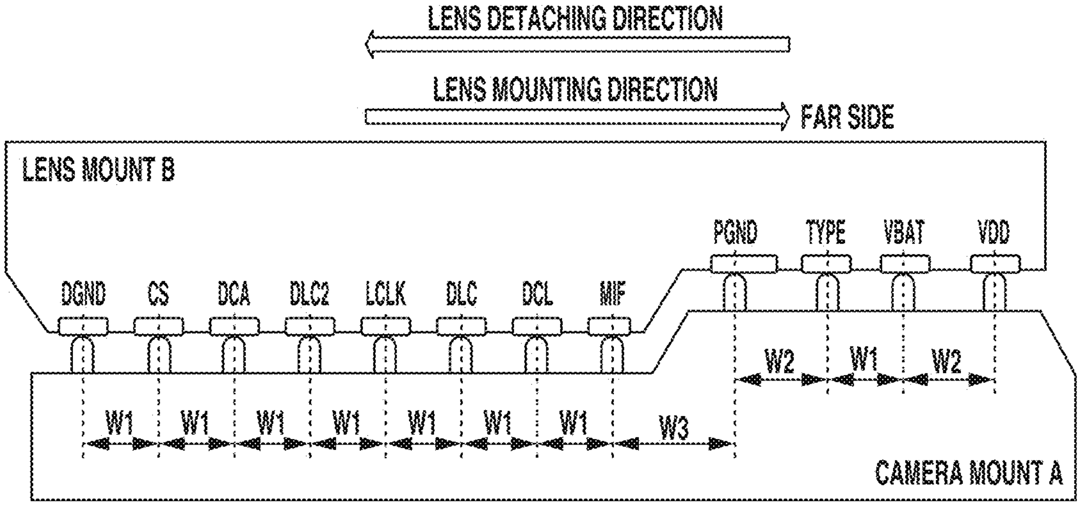

Next, the structure of the mount part 1, which includes the camera mount A and the lens mount B, is described with reference to FIGS. 4A and 4B and FIGS. 5A, 5B, and 5C. FIGS. 4A and 4B are diagrams, illustrating, as an example, the configurations of the camera mount A and the lens mount B, according to the present embodiment. FIG. 4A illustrates a front view of the camera mount A provided in the camera body 100, and FIG. 4B illustrates a front view of the lens mount B provided in the first interchangeable lens 200. FIGS. 5A to 5C are diagrams illustrating, as an example, connection states between the respective terminals caused by relative rotation of the camera mount A and the lens mount B, according to the present embodiment. FIG. 5A illustrates a mounting start state between the camera mount A and the lens mount B, FIG. 5B illustrates a mounting transition state between the camera mount A and the lens mount B, and FIG. 5C illustrates a mounting completion state between the camera mount A and the lens mount B. Furthermore, FIGS. 5A to 5C illustrate states of the terminals provided in the respective mounts as viewed from a direction perpendicular to the optical axis of each of the camera mount A and the lens mount B. Here, the above-mentioned optical axis is parallel to a central axis passing through the center of an opening portion of each of the camera mount A and the lens mount B.

Furthermore, the state illustrated in FIG. 5A is a state in which a plurality of tabs provided in the camera mount A has been inserted into a plurality of recessed portions provided in the lens mount B and a plurality of tabs provided in the lens mount B has been inserted into a plurality of recessed portions provided in the camera mount A. When the camera mount A and the lens mount B are rotated relative to each other in a lens mounting direction from the state illustrated in FIG. 5A, such a state transitions to the state illustrated in FIG. 5C, in which the respective corresponding terminals provided in both mounts have been connected to each other. Here, the lens mounting direction is a direction perpendicular to the central axis of the camera mount A (and the lens mount B) and represents a mounting direction of the interchangeable lens that is based on the side of the camera mount A. Furthermore, in a case where the optical axis (of the interchangeable lens) and the mount central axis coincide with each other, the lens mounting direction and the optical axis are perpendicular to each other. Then, in the state illustrated in FIG. 5C, the relative rotation between the camera mount A and the lens mount B is restricted by a lock mechanism (not illustrated), which is a rotation restriction member provided in each mount.

Figure 19A:
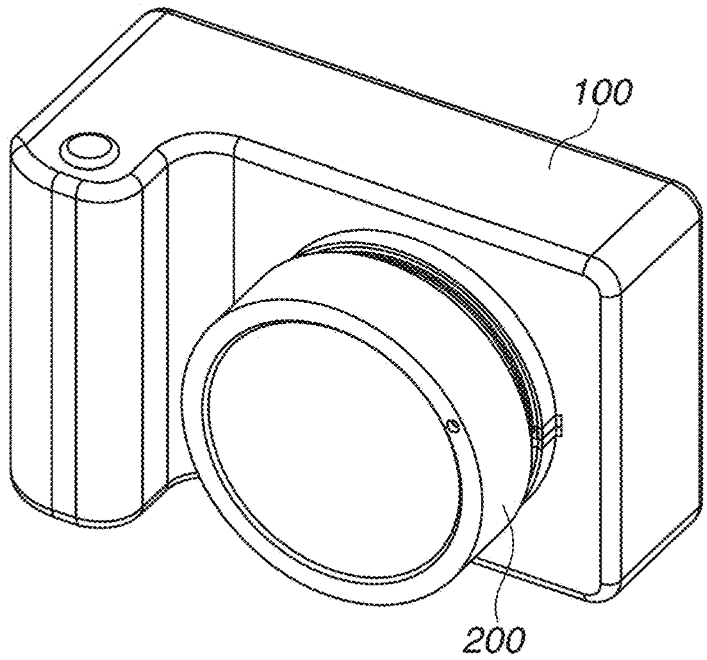
FIGS. 19A and 19B are diagrams illustrating, as an example, appearance perspective views of the camera body and the first interchangeable lens, according to the present embodiment.
Figure 19B:
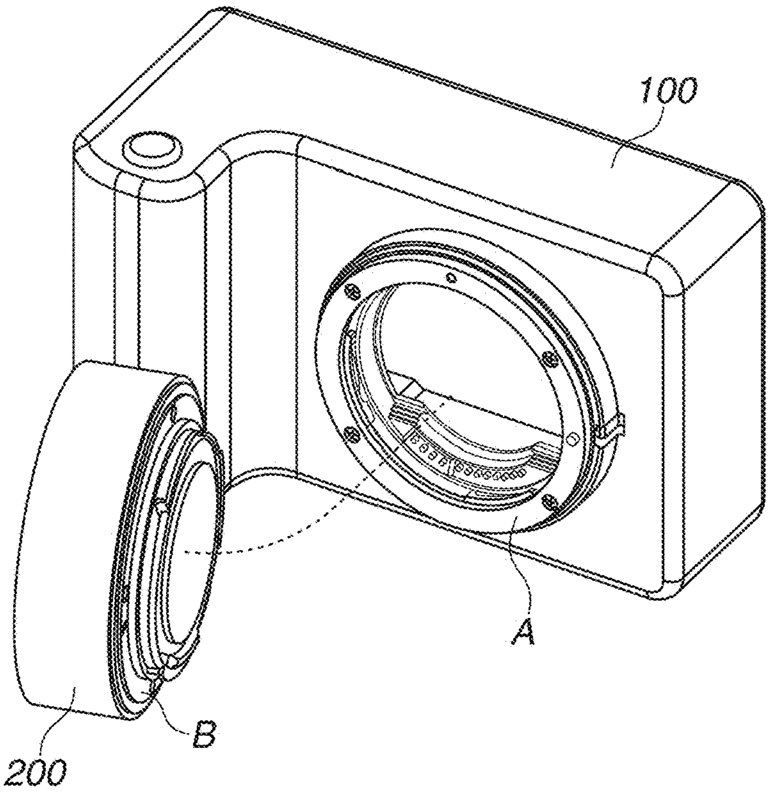

Furthermore, FIGS. 19A and 19B are diagrams illustrating, as an example, appearance perspective views of the camera body 100 and the first interchangeable lens 200, according to the present embodiment. FIG. 19A illustrates a state in which the first interchangeable lens 200 has been mounted to the camera body 100, and FIG. 19B illustrates a state in which the first interchangeable lens 200 has been detached from the camera body 100.

As illustrated in FIGS. 19A and 19B, the camera body 100 and the first interchangeable lens 200 respectively include the camera mount A and the lens mount B, each of which is provided with a contact surface parallel to a direction perpendicular to the optical axis. In the state in which the respective reference surfaces of the camera mount A and the lens mount B are in contact with each other, the camera body 100 and the first interchangeable lens 200 are able to be rotated relative to each other from the above-mentioned mounting start position to the mounting completion position.

Moreover, the state illustrated in FIG. 5B is a state in which, during a state between the above-mentioned mounting start state and the mounting completion state of the camera mount A and the lens mount B, only the PGND terminals have started to be connected to each other earlier than the other respective corresponding terminals. Details of this state are described below.

Here, in the subsequent description of the present embodiment, electrical terminals provided in the camera mount are referred to as contact pins, and electrical terminals provided in the lens mount are referred to as contact surfaces (or pieces) Furthermore, a configuration in which terminals provided in the camera mount are formed as contact surfaces and terminals provided in the lens mount are formed as contact pins can be employed.

In the mount part 1 in the present embodiment, each mount is configured to have a two-step configuration with a step difference formed in the optical axis direction, as illustrated in FIGS. 4A and 4B and FIGS. 5A to 5C. As illustrated in FIG. 5A, in the camera mount A of the camera body 100, a step which protrudes toward the subject side is referred to as a "camera mount upper step" (second step), and a step which is on the image sensor side is referred to as a "camera mount lower step" (first step). Thus, the camera mount upper step protrudes toward the subject side (or the camera accessory side) in the optical axis direction more than the camera mount lower step.

Moreover, as illustrated in FIG. 5A, in the lens mount B of the first interchangeable lens 200, a step which is recessed toward the subject side is referred to as a "lens mount lower step" (second step), and a step which protrudes toward the image sensor side when the lens mount B is mounted to the camera mount A is referred to as a "lens mount upper step" (first step). Thus, in the state in which the lens mount B is mounted to the camera mount A, the lens mount upper step protrudes toward the image sensor side in the optical axis direction more than the lens mount lower step. Furthermore, the terminals of the camera mount upper step are configured to be able to come into contact with only the terminals of the lens mount lower step, and the terminals of the camera mount lower step are configured to be able to come into contact with only the terminals of the lens mount upper step. Moreover, in the camera mount A, the camera mount lower step is located at the near side in the rotational direction relative to the lens mount B (the mounting direction for the accessory) and the camera mount upper step is located at the far side in such a rotational direction. Moreover, in the lens mount B, the lens mount upper step is located at the near side in the rotational direction relative to the camera mount A and the lens mount lower step is located at the far side in such a rotational direction.

Furthermore, while, in the present embodiment, to have different positions at which terminals for use in electrical connection are arranged (in a direction parallel to the central axis of each mount), both the camera mount A and the lens mount B are configured to have a step difference, the present embodiment is not limited to this. In each mount, any configuration which has different positions at which terminals are arranged can be employed. For example, a configuration in which an inclination which has progressively different positions at which terminals are arranged is provided with respect to a direction parallel to the central axis of each mount or a configuration which has different amounts of protrusion of terminals themselves provided in a protruding manner in a direction parallel to the central axis of each mount can be employed.

Moreover, as illustrated in FIG. 5C, the lens mount B rotationally moves (rightward in FIG. 5C) relative to the camera mount A while the respective terminals provided on the lens mount B and the camera mount A are sliding on and coming contact with each other. Then, for example, in the state in which the first interchangeable lens 200 is completely mounted to the camera body 100, the contact pins of the camera mount A and the respectively paired (corresponding) contact surfaces of the lens mount B are electrically connected to each other in an independent manner. Furthermore, in the subsequent direction, for ease of description, in the camera mount A and the lens mount B, terminals which are electrically paired with (which electrically correspond to) each other being made electrically conductive to each other is referred to as "connection", and terminals which are not electrically paired with (which do not electrically correspond to) each other being made electrically conductive to each other is referred to as "contact".

Furthermore, in the present embodiment, a plurality of tab groups provided in the camera mount A and the lens mount B include bayonet tabs, and, when the tab groups are engaged with each other in the optical axis direction by what is called a bayonet coupling method, mounting (coupling) between the camera mount A and the lens mount B is completed.

The alignment sequence of the terminals of the mount part 1 according to the present embodiment is described as follows. Furthermore, in the present embodiment, the lens (accessory) mounting direction is defined as a relative rotational (mounting) direction of the lens mount B that is based on the camera mount A. Accordingly, with respect to the accessory mounting direction, the side at which a terminal (VDD terminal) that last comes into contact with one of the terminals provided in the lens mount B out of the terminals provided in the camera mount A is located is regarded as the far side in the lens mounting direction, and the side opposite to such a far side is regarded as the near side. Then, the side at which a terminal (VDD terminal) that first comes into contact with one of the terminals provided in the camera mount A out of the terminals provided in the lens mount B is located is regarded as the far side in the lens mounting direction, and the side opposite to such a far side is regarded as the near side. As illustrated in FIG. 5A, on the camera mount upper step, the VDD terminal 1001, the VBAT terminal 1002, the TYPE terminal 1003, and the PGND terminal 1004 are arranged in order from the far side (ending edge) in the lens mounting direction. Furthermore, the far side in the lens mounting direction is a side which a terminal that last comes into contact with one of the terminals provided in the lens mount B when mounting of the first interchangeable lens 200 to the camera body 100 is performed is located.

On the camera mount lower step, the MIF terminal 1005, the DCL terminal 1006, the DLC terminal 1007, the LCLK terminal 1008, the DLC2 terminal 1009, the DCA terminal 1010, the CS terminal 1011, and the DGND terminal 1012 are arranged in order from the far side in the lens mounting direction.

Similarly, on the lens mount lower step, the VDD terminal 2001, the VBAT terminal 2002, the TYPE terminal 2003, and the PEND terminal 2004 are arranged in order from the far side in the lens mounting direction. On the lens mount upper step, the MIF terminal 2005, the DCL terminal 2006, the DLC terminal 2007, the LCLK terminal 2008, the DLC2 terminal 2009, the DCA terminal 2010, the CS terminal 2011, and the DGND terminal 2012 are arranged in order from the far side in the lens mounting direction.

Thus, four terminals are arranged on each of the camera mount upper step and the lens mount lower step, and eight terminals are arranged on each of the camera mount lower step and the lens mount upper step. Then, the camera mount upper step and the lens mount lower step are configured to be smaller in the number of terminals (exposed contacts) arranged thereon than the camera mount lower step and the lens mount upper step.

In a case where, as in the bayonet coupling method, the camera mount and the lens mount are rotated relative to each other to perform attachment and detachment between the imaging apparatus and the camera accessory, the terminals provided in the respective mounts slide on each other during such attachment and detachment. Usually, in the same surface in the optical axis direction, on the camera mount side, a contact pin present at the farthest side in the lens mounting direction does not slide on a contact surface on the accessory side which does not correspond to the contact pin during attachment or detachment of the camera accessory to or from the imaging apparatus. Moreover, in the same surface in the optical axis direction, on the lens mount side, a contact surface present at the nearest side in the lens mounting direction does not slide on a contact pin on the camera side which does not correspond to the contact surface during attachment or detachment of the camera accessory to or from the imaging apparatus. Thus, in the camera mount, a contact pin (terminal) located farther than the other contact pins (terminals) does not slide on (come into contact with) contact surfaces other than a contact surface with which the contact pin comes into contact in the state in which the camera accessory is mounted to the imaging apparatus, out of the contact surfaces (terminals) provided on the lens mount. Moreover, in the lens mount, a contact surface (terminal) located nearer than the other contact surfaces (terminals) does not slide on (come into contact with) contact pins other than a contact pin with which the contact surface comes into contact in the state in which the camera accessory is mounted to the imaging apparatus, out of the contact pins (terminals) provided on the camera mount.

However, with regard to terminals other than the above-mentioned specific terminals, as the number of times of attachment or detachment of the lens mount to or from the camera mount increases, such other terminals may abrade away. In particular, since each terminal (contact pin) of the camera mount is a movable pin which is able to move backward and forward (project and retract) in a direction parallel to the optical axis direction, and thus slides, at one point of the tip thereof, on a terminal (contact surface) of the lens mount, it is necessary to improve the durability of each contact pin with respect to sliding movement.

The above-mentioned issue is more conspicuous as the number of terminals arranged in a row in the same surface perpendicular to the optical axis increases, so that the number of times of sliding between a contact pin and a contact surface increases. Then, since abrasion of the contact pin and the contact surface causes a rise in contact impedance of each terminal, a voltage drop becomes large and the voltage falls below an operation allowable voltage range for electrical circuits, so that, for example, a false operation of the interchangeable lens may occur.

Therefore, in the present embodiment, to reduce the number of times of sliding between terminals, the positions at which the terminals are held in the optical axis direction are divided into two different steps, i.e., an upper step and a lower step, and the height of contact between a contact pin on the camera side and a contact surface on the interchangeable lens side is made different between the upper step and the lower step. This configuration enables reducing abrasion of the terminals caused by sliding on each other, for each step at which the terminals are held.

Additionally, in the present embodiment, since the numbers of terminals held at the upper step and the lower step are made different from each other, for example, locating a terminal which is of high importance out of a plurality of terminals at the side in which the number of terminals is smaller enables reducing abrasion of the important terminal. Specifically, power source system terminals (VDD terminals, VBAT terminals, and PGND terminals), which are terminals for signals in which a rise in contact impedance is to be prevented or reduced as much as possible, are located on the camera mount upper step and the lens mount lower step, at which the number of terminals is smaller. On the other hand, terminals primarily used for performing communication, which are terminals that are less affected by a rise in contact impedance (as compared with the power source system terminals), are located on the camera mount lower step and the lens mount upper step. This configuration enables stable supplying of electric power to the camera accessory and contributes to stabilizing each operation (for example, focus control) of the camera accessory.

Furthermore, the DGND terminal 1012 in the camera mount A is located on the camera mount lower step and is set at the nearest side (starting edge) in the lens mounting direction, and is, therefore, located at the most disadvantageous position with regard to durability affected by sliding motion of a contact pin in the camera side. However, to protect electrical circuits or elements provided in the camera accessory from static electricity, the DGND terminal 1012 needs to be physically ground-connected to a metallic portion formed at the camera mount. In the present embodiment, to facilitate the processing of the DGND terminal required due to the above-mentioned reason, the DGND terminal is located at the nearest side in the lens mounting direction.

Moreover, in the present embodiment, a system in which the level of an electric current value flowing through the DGND terminal is smaller than that flowing through the PGND terminal is supposed. Accordingly, in the present embodiment, the PGND terminal, in which the level of an electric current value flowing is large, is located on the camera mount upper step (lens mount lower step), in which the number of terminals arranged thereon is small and which is advantageous to reducing a rise in contact impedance.

Next, in the camera mount A according to the present embodiment, two electric power-system contact pins, i.e., the VDD terminal 1001 and the VBAT terminal 1002, are located at the first place and the second place, respectively, as viewed from the far side in the lens mounting direction, on the camera mount upper step. Moreover, in the camera mount A according to the present embodiment, the TYPE terminal 1003 is located adjacent to the power source system terminals. Additionally, in the lens mount B according to the present embodiment, two electric power-system contact surfaces, i.e., the VDD terminal 2001 and the VBAT terminal 2002, are located at the first place and the second place, respectively, as viewed from the far side in the lens mounting direction, on the lens mount lower step. Moreover, in the lens mount B according to the present embodiment, the TYPE terminal 2003 is located adjacent to the power source system terminals. Furthermore, the above-mentioned state in which terminals are located adjacent to each other represents a state in which terminals are located adjacent to each other in each mount.

With the above-described configuration, in the mount part 1 according to the present embodiment, a set of two power source system terminals (the VDD terminal and the VBAT terminal) and the PGND terminal are not adjacent to each other. Accordingly, a short circuit between terminals is reduced between the two power source system terminals and the PGND terminal, so that any false operation or malfunction of a power source circuit provided at the camera side can be prevented from occurring due to such a short circuit.

Moreover, locating the electric power-system VDD terminal 1001 and VBAT terminal 1002 at the far side in the lens mounting direction enables reducing the number of times of sliding between terminals caused by attachment and detachment of the camera accessory and producing an advantage in durability of terminals as compared with the other terminals located at the upper step of the camera mount A. Furthermore, to prevent the VDD terminal 1001 at the camera mount side from coming into contact with the VBAT terminal 2002 at the lens mount side when the accessory is detached from the camera body 100, the VDD terminal 1001 is located at the farther side in the lens mounting direction than the VBAT terminal 1002. For example, if the VBAT terminal 1002 is located at the farther side in the lens mounting direction than the VDD terminal 1001, when the accessory is detached from the camera body 100, the VBAT terminal 1002 may come into contact with the VDD terminal 1001 before electric charge accumulated in a capacitor of the VBAT terminal 2002 decreases. In this case, electric charge accumulated in the capacitor of the VBAT terminal 2002 to drive, for example, an internal member (actuator) incorporated in the accessory may flow into the camera body 100 via the VDD terminal 1001 as a large current. In particular, this issue may occur in a case where the accessory is quickly detached from the camera body 100. Therefore, in the present embodiment, in the camera mount A, the VDD terminal 1001 is located at the farther side in the lens mounting direction than the VBAT terminal 1002.

Furthermore, with regard to the TYPE terminal 1003, which is located between the VBAT terminal 1002 and the PGND terminal 1004, a protection element being included in a signal line for the TYPE terminal 1003 enables protecting electrical circuits in the camera body 100.

Here, if, with regard to terminals other than the TYPE terminal 1003, a protection element is added to a signal line for each terminal as with the TYPE terminal 1003, a similar measure to that for the TYPE terminal 1003 may be taken. However, since, as mentioned above, each of the DCL terminal, the DLC terminal, the LCLK terminal, the DLC2 terminal, the DCA terminal, and the CS terminal is a terminal for communication, adding a protection element thereto may cause an increase in wiring capacity. In this case, since communication may be affected in such a manner that, for example, the responsiveness of rising or falling of a communication waveform is disturbed as the wiring capacity increases, a configuration in which no protection element is provided for a terminal for communication as far as possible is desirable.

On the other hand, in the mount part 1 according to the present embodiment, a signal voltage for the TYPE terminal 1003 is fixed, and, for example, during a period when the first interchangeable lens 200 is mounted to the camera body 100, the signal voltage does not vary. Accordingly, even when, for example, a protection element is added to the TYPE terminal 1003 as with the mount part 1 according to the present embodiment, operations which the camera body 100 and the first interchangeable lens 200 perform are little affected.

Furthermore, with regard to the MIF terminal 1005, since a signal voltage therefor is also fixed as with the TYPE terminal 1003, a protection element can be provided for the MIF terminal 1005 as with the TYPE terminal 1003. However, in the mount part 1 according to the present embodiment, the MIF terminal 1005 is not located next to the power source system terminals. The reason for this is described below.

Next, as illustrated in FIG. 5C, in the camera mount A and the lens mount B, an interterminal pitch W2 (distance) between the VDD terminal and the VBAT terminal is configured to be wider than a basic pitch W1 (i.e., W2>W1). Moreover, in the camera mount A and the lens mount B, the MIF terminal and the PGND terminal are held on the respective different steps in the optical axis direction of each mount, an interterminal pitch W3 between the MIF terminal and the PGND terminal is configured to be wider than the basic pitch W1 and the pitch W2 (i.e., W3>W2>W1). Furthermore, in the present embodiment, the interterminal pitch is defined as a distance between the centers (between the center lines) of the respective terminals (contact pins and contact surfaces) in the mounting direction (rotational direction) of the lens mount B, but can be defined as a distance between conductive portions (between metallic regions) provided in the respective terminals. Moreover, the interte ninal pitch can be defined as a distance between contact portions (connection points) between the corresponding contact pins and contact surfaces in the adjacent terminals when the lens mount B is mounted to the camera mount A.

Furthermore, while, in the present embodiment, a case where the width of a contact surface of each of the VDD terminal 2001 and the VBAT terminal 2002 in the circumferential direction of the lens mount B is a basic width described below has been described, the present embodiment is not limited to this. For example, the width of a contact surface of each of the VDD terminal 2001 and the VBAT terminal 2002 can be configured to be wider than the basic width or narrower than the basic width. In this case, it is necessary to set a pitch between the VDD terminal and the VBAT terminal in consideration of a difference between the basic width and the width of a contact surface of each of the VDD terminal 2001 and the VBAT terminal 2002. For example, in a case where the width of a contact surface of each of the VDD terminal 2001 and the VBAT terminal 2002 is wider than the basic width toward the lens detaching direction, it is necessary to widen the pitch between the VDD terminal and the VBAT terminal as much as a difference from the above-mentioned basic width.

The above-mentioned basic pitch is a distance between adjacent terminals which is set in consideration of any looseness and tolerance in manufacturing and assembling of the camera body 100. Furthermore, contact pins on the camera mount A with the basic pitch set thereto are configured in such a manner that, unless there is a deformation such as bending or a conductive foreign substance between terminals, one contact surface on the lens mount B with the basic width set thereto does not come into contact with a plurality of contact pins at the same time. Accordingly, it is possible to prevent adjacent terminals from being short-circuited with each other due to a contact pin on the camera mount A coming into contact with two or more contact surfaces on the lens mount B. In the subsequent description, unless otherwise described, the basic pitch is assumed to be set as each pitch between adjacent terminals (contact pins).

Moreover, the above-mentioned basic width is defined as the width of a contact surface on the lens mount B which is set in consideration of any looseness and tolerance in manufacturing and assembling of the camera accessory. Furthermore, the width of a contact surface is the width of each contact surface in the mounting direction (rotational direction) of the lens mount B. As mentioned above, a plurality of contact pins on the camera mount A with the basic pitch set thereto does not concurrently come into contact with one contact surface with the basic width set thereto. Then, with regard to the contact surfaces on the lens mount B with the basic width set thereto, unless there is a deformation of a contact pin on the camera mount A or, for example, a conductive foreign substance between contact pins, a contact pin on the imaging apparatus side does not drop out of a contact surface on the camera accessory side in the state of the camera accessory being mounted to the imaging apparatus. In the subsequent description, unless otherwise described, the basic width is assumed to be set as the width of each contact surface.

Moreover, the interterminal pitch between the VDD terminal 1001 and the VBAT terminal 1002 on the camera side in the present embodiment is set wider about 3° than the width of the VDD terminal 2001 and the VBAT terminal 2002 on the accessory side with the basic width set thereto, in consideration of miniaturization of a unit and safety of supplying of electric power. With this configuration, even in a case where there is a deformation of the VDD terminal or the VBAT terminal on the camera side or a conductive foreign substance between the above-mentioned two terminals, it is possible to reduce a situation in which the VDD terminal on the accessory side concurrently comes into contact with the above-mentioned two terminals, so that a short circuit between adjacent terminals can be reduced.

Furthermore, while, in the present embodiment, a case where the interterminal pitch between the VDD terminal 1001 and the VBAT terminal 1002 is set wider 3° than the basic pitch in the circumferential direction of the camera mount A has been described, the present embodiment is not limited to this. In the present embodiment, a configuration in which the interterminal pitch is set wider at least in the relative rotational direction between the camera mount A and the lens mount B only needs to be employed.

Next, in the mount part 1 according to the present embodiment, the PGND terminal 1004 is located at the nearest side in the lens mounting direction on the camera mount upper step, and the PGND terminal 2004 is located at the nearest side in the lens mounting direction on the lens mount lower step.

Moreover, the PGND terminal 2004 in the lens mount B is a contact surface having a width wider than the above-mentioned basic width, and is a terminal the width of a contact surface of which is the widest out of a plurality of terminals provided in the lens mount B. Furthermore, in the present embodiment, the above-mentioned width of a contact surface is defined as the width of a contact surface toward the direction to demount the lens mount B from the camera mount A (the detaching direction) based on a portion (connection point) at which the corresponding terminals are electrically connected to each other. The detaching direction is synonymous with a direction toward the near side in the mounting direction of the lens mount B. Furthermore, a configuration in which the width of a contact surface is defined as the width of a contact surface toward the direction to demount the lens mount B from the camera mount A (the detaching direction) simply based on the center of the contact surface in the circumferential direction of the lens mount B can be employed.

With this configuration, the PGND terminal 2004 is a terminal which is first electrically connected to the corresponding terminal out of all of the terminals when the first interchangeable lens 200 is mounted to the camera body 100. Moreover, the PGND terminal 2004 is a terminal which is last electrically disconnected from the corresponding terminal out of all of the terminals when the first interchangeable lens 200 is demounted (detached) from the camera body 100.

For example, suppose a case where the PGND terminal is located at the farther side in the lens mounting direction than the power source system terminals (the VDD terminal and the VBAT terminal). In this case, for example, when the first interchangeable lens 200 is detached from the camera body 100, the PGND terminal of the lens mount may slide on the power source system terminal of the camera mount. In this instance, depending on the speed at which to rotate the first interchangeable lens 200 in the detaching direction, the PGND terminal of the lens mount instantaneously comes into contact with the power source system terminal of the camera mount. Accordingly, due to the above-mentioned issue, the output of a camera power source unit 103 described below of the camera body 100 connected to the power source system terminal is short-circuited, so that a false operation concerning supplying of electric power or a false operation in controlling of electric power may occur.

Moreover, for example, suppose a configuration in which the PGND terminal is disconnected from the contact surface on the lens mount prior to the other terminals. In this case, in particular, the power source system terminals on the camera mount A and the lens mount B are not yet disconnected from each other, and, if the PGND terminals are disconnected from each other while supplying of electric power from the camera body 100 is maintained, a false operation or failure may occur in both of the apparatuses.

To address the above-mentioned issue, in the mount part 1 according to the present embodiment, when the first interchangeable lens 200 is attached to and detached from the camera body 100, the PGND terminal 2004 of the lens mount B does not slide on (come into contact with) any other terminals other than the PGND terminal 1004 of the camera mount A. With this configuration, since the power source system terminals (the VDU terminal and the VBAT terminal) of the camera mount A do not instantaneously come into contact with the PGND terminal 2004 of the lens mount B, it is possible to reduce a situation in which the two terminals are short-circuited.

Moreover, in the mount part 1 according to the present embodiment, out of all of the above-mentioned terminals, the PGND terminals in both mounts are first connected to each other when the camera accessory is mounted to the camera side, and are last disconnected from each other when the camera accessory is detached from the camera side. In other words, when the camera accessory is removed (detached) from the camera side, in the mount part 1, until the other corresponding terminals except the PGND terminals are disconnected from each other, the connection state between the PGND terminals on the camera mount and the lens mount is maintained. With this configuration, in the camera mount A and the lens mount B, it is possible to avoid what is called floating of ground potential, in which the PGND terminals are disconnected from each other while supplying of electric power is maintained, and it is possible to reduce a false operation or failure in both of the apparatuses.

Furthermore, as illustrated in FIG. 5C, in the camera mount A and the lens mount B, the interterminal pitch between the PGND terminal 1004 and the TYPE terminal 1003, which is adjacent to the PGND terminal 1004, is wider than the above-mentioned basic pitch (i.e., W2>W1). Specifically, the interterminal pitch between the PGND terminal 1004 and the TYPE terminal 1003 is made wider by a distance approximately equal to an increased length obtained by widening the width of a connection surface of the PGND terminal 2004 toward the direction to demount the lens mount B (the detaching direction). With this configuration, it is possible to reduce a situation in which the PGND terminal 2004 of the lens mount B concurrently comes into contact with the PGND terminal 1004 and the TYPE terminal 1003, which is caused by the width of the PGND terminal 2004 being set wider than the basic width, so that a short circuit between adjacent terminals can be reduced.

Next, as illustrated in FIGS. 5A to 5C, in the mount part 1 according to the present embodiment, the MIF terminal 1005 is located at the farthest side in the lens mounting direction on the camera mount lower step, and the MIF terminal 2005 is located at the farthest side in the lens mounting direction on the lens mount upper step. With this configuration, it is possible to reduce abrasion of the MIF terminals, which are terminals used to detect the mounting state of the lens mount B to the camera mount A and are important terminals serving as triggers for starting and ending of communications between the camera and the camera accessory.

Moreover, the MIF terminal 1005 is located at the farthest side on the lower step of the camera mount A, and is located adjacent to the PGND terminal 1004, which is located at the nearest side on the upper step of the camera mount A. Then, a boundary portion between the upper step and the lower step of the camera mount A is situated between the MIF terminal 1005 and the PGND terminal 1004, and the interterminal pitch W3 between the MIF terminal 1005 and the PGND terminal 1004 is wider than the other interterminal pitches. In the present embodiment, a configuration in which detecting the level of a voltage at the MIF terminal 1005 enables detecting that the camera accessory has been mounted to or detached from the camera body 100 is employed. If the PGND terminal 1004 and the MIF terminal 1005 are short-circuited, the voltage level at the MIF terminal 1005 may become low level even when the camera accessory is not mounted to the camera body 100, so that the presence or absence of mounting of the camera accessory may be erroneously detected. Therefore, the MIF terminal 1005 is configured to be located in such a manner that, to maximally prevent or reduce abrasion of terminals caused by attachment and detachment of the camera accessory and to prevent or reduce a short circuit between the MIF terminal 1005 and the PGND terminal 1004, a physical distance between the MIF terminal 1005 and the PGND terminal 1004 is set as large as possible.

Furthermore, the reason why the MIF terminal 1005 is located in proximity to the boundary portion between the upper step and the lower step of the camera mount A is that, in a case where a foreign substance has invaded the camera mount A, the upper step (the terminal holding portion of the upper step) of the camera mount A prevents the foreign substance from coming into contact with the MIF terminal 1005. With this configuration, it is possible to reduce the probability of a foreign substance coming into contact with the MIF terminal 1005, as compared with a case where the MIF terminal 1005 is located on the upper step of the camera mount A.

Additionally, the contact surface of the MIF terminal 2005 of the lens mount B is set narrower in width than the connection surface having the above-mentioned basic width in the relative rotational direction of the lens mount B. Specifically, in the lens mount B according to the present embodiment, to secure the above-mentioned connection sequence of terminals even when the looseness or tolerance in manufacturing and assembling of the lens mount B is taken into consideration, the width of the MIF terminal 2005 is set narrower (shorter) about 1° than the basic width. With this configuration, out of all of the above-mentioned terminals included in the mount part 1, the MIF terminals are last connected to each other when the camera accessory is mounted to the camera side, and the MIF terminals are first disconnected from each other when the camera accessory is detached from the camera side.

Accordingly, in the mount part 1 according to the present embodiment, when the lens mount B is not yet completely mounted to the camera mount A, mounting of the camera accessory is not erroneously detected by the camera side. With this configuration, for example, it is possible to prevent or reduce mounting of the camera accessory from being erroneously detected in the state in which the power source system terminals are not connected to each other, and it is possible to reduce any false operation of the camera before supplying of electric power from the camera side to the camera accessory is performed.

Furthermore, as mentioned above, in the camera system according to the present embodiment, a configuration in which, out of the terminals included in the mount part 1, contact (conduction) start timing of the PGND terminals and contact (conduction) start timing of the MIF terminals are made different from the contact (conduction) start timing of the other sets of terminals is employed. As a specific configuration for implementing this, in the present embodiment, interterminal pitches are adjusted in the camera mount A, and widths of terminals are adjusted in the lens mount B. As positions advantageous to such physical adjustment of terminals, out of a plurality of terminals for use in electrical connection, the MIF terminals and the PGND terminals are respectively located at the ends of the upper steps and the lower steps of the respective mounts.

Next, as illustrated in FIGS. 5A to 5C, in the camera mount A according to the present embodiment, the DGND terminal 1012 is located at the nearest side in the lens mounting direction on the camera mount lower step, and the CS terminal 1011 is located adjacent to the DGND terminal 1012. Moreover, in the lens mount B according to the present embodiment, the DGND terminal 2012 is located at the nearest side in the lens mounting direction on the lens mount upper step, and the CS terminal 2011 is located adjacent to the DGND terminal 2012. Furthermore, details of location of the CS terminals are described below. Moreover, as mentioned above, the DGND terminals are located at the nearest side in the lens mounting direction in consideration of easiness of processing for physically connecting a metallic portion of the mount to ground.

Next, as illustrated in FIGS. 5A to 5C, in the mount part 1 according to the present embodiment, a terminal group (the LCLK terminal, the DCL terminal, and the DLC terminal) for the first communication unit is located adjacent to the MIF terminal in each mount. Moreover, in the mount part 1 according to the present embodiment, the terminal group associated with the first communication unit is located at the farther side in the lens mounting direction than terminal groups for the second and third communication units.

With this configuration, in the camera mount lower step and the lens mount upper step, it is possible to reduce abrasion of terminals associated with the first communication unit next to the MIF terminal 1005. Then, with the above-described configuration, it is possible to more reduce abrasion of the terminal group associated with the first communication unit, which performs a first communication particularly important out of communications performed between the camera side and the lens side, than abrasion of the other communication terminals.

Next, as illustrated in FIGS. 5A to 5C, in the mount part 1 according to the present embodiment, the DLC2 terminal 1009 is located adjacent to the terminal group associated with the first communication unit on the camera mount lower step. Moreover, in the mount part 1 according to the present embodiment, the DLC2 terminal 2009 is located adjacent to the terminal group associated with the first communication unit on the lens mount upper step. Details of location of the DLC2 terminals are described below.

<Configuration of Conversion Adapter 400>

Figure 6:
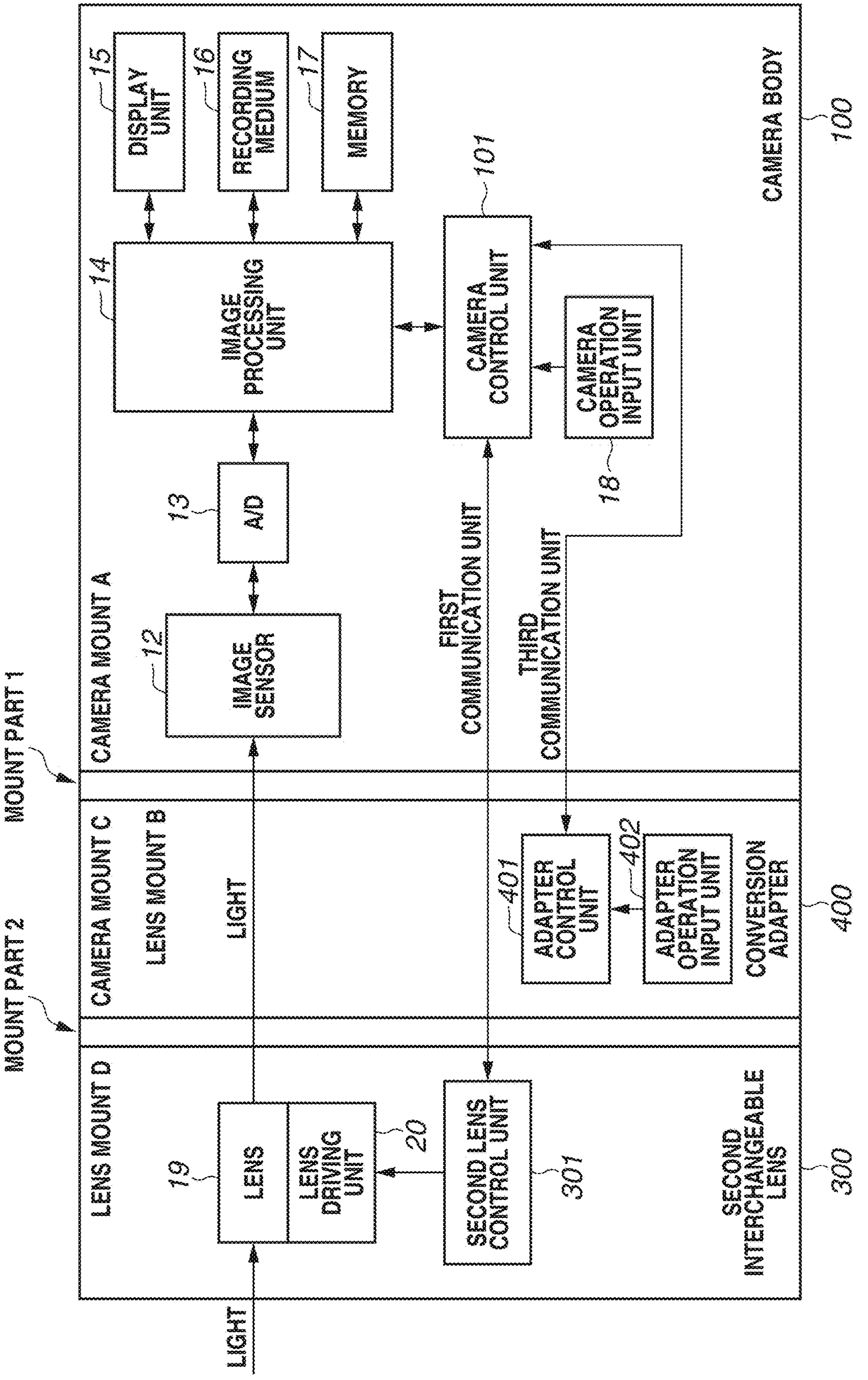
FIG. 6 is a block diagram illustrating, as an example, a state in which a second interchangeable lens is mounted to the camera body via a conversion adapter, according to the present embodiment.

Next, a case where the second interchangeable lens 300 is mounted to the camera body 100 via the conversion adapter 400 is described with reference to FIG. 6. FIG. 6 is a block diagram illustrating, as an example, a state in which the second interchangeable lens 300 is mounted to the camera body 100 via the conversion adapter 400, according to the present embodiment. Furthermore, as illustrated in FIG. 6, the respective mounts of the conversion adapter 400 and the second interchangeable lens 300 are collectively referred to as a "mount part 2".

Figure 7A:
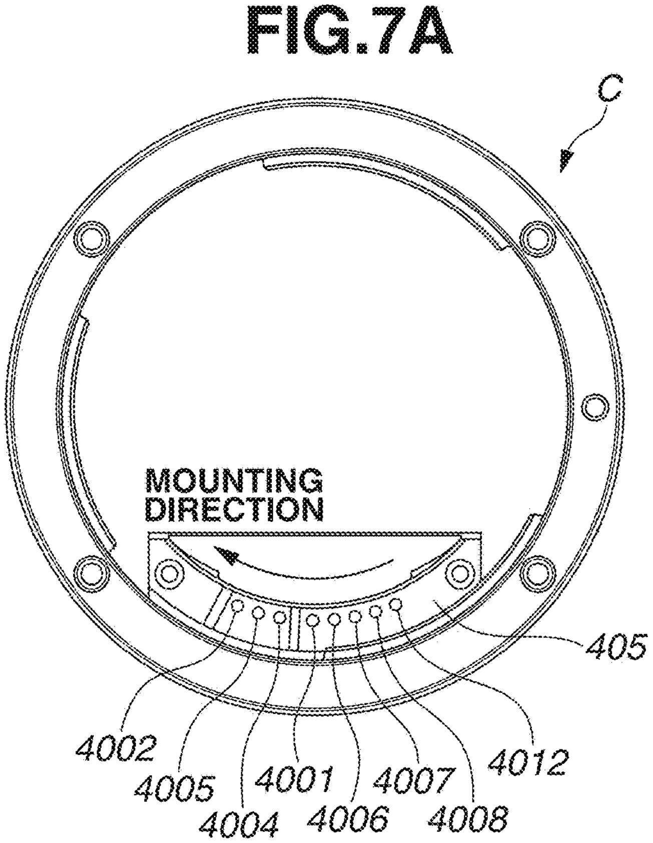
FIGS. 7A and 7B are diagrams illustrating, as an example, configurations of a camera mount C and a lens mount D, respectively, according to the present embodiment.
Figure 7B:
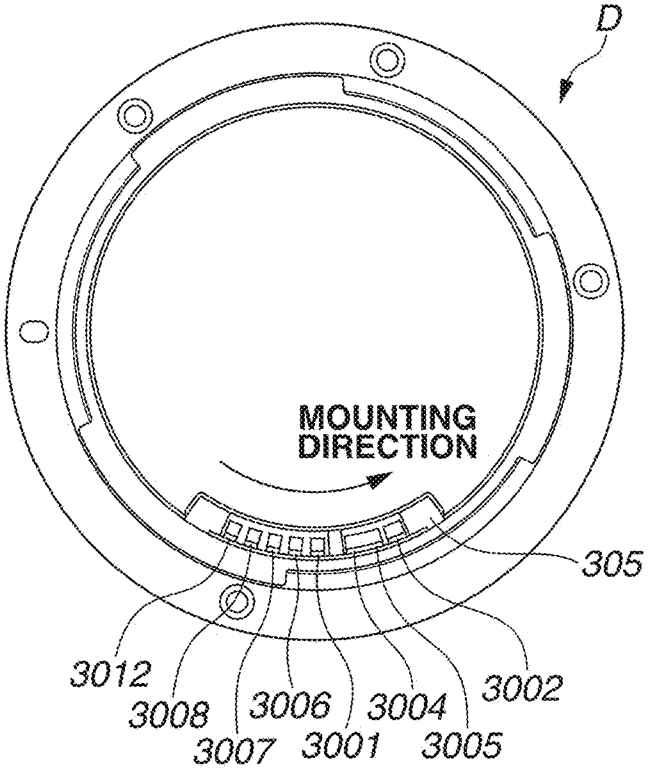

The conversion adapter 400 includes the lens mount B, which is the same as that of the first interchangeable lens 200 described above, at the side to which the camera body 100 is to be coupled. Moreover, the conversion adapter 400 includes the camera mount C, which is associated with the lens mount D provided in the second interchangeable lens 300, at the side opposite to the lens mount B. FIGS. 7A and 7B are diagrams illustrating, as an example, the camera mount C and the lens mount D according to the present embodiment. FIG. 7A illustrates a front view of the camera mount C provided in the conversion adapter 400, and FIG. 7B illustrates a front view of the lens mount D provided in the second interchangeable lens 300. Furthermore, details of the respective terminals included in the camera mount C and the lens mount D are described below.

The conversion adapter 400 is a camera accessory including an adapter operation input unit 402, which is able to receive an operation input performed by the user, an adapter power source unit 403 (FIG. 8), which is provided for the conversion adapter 400, and an adapter control unit 401, which includes a CPU for comprehensively controlling an operation of the conversion adapter 400. The adapter control unit 401 controls, for example, communication performed between the adapter control unit 401 and the camera control unit 101 via the mount part 1, or receives an operation input to the adapter operation input unit 402. Furthermore, in the present embodiment, the conversion adapter 400 is used to indirectly mount, for example, the second interchangeable lens 300, which is an interchangeable lens with a flange back distance that is not compatible with the camera body 100, to the camera body 100.

On the other hand, the second interchangeable lens 300 includes a lens 19, which includes optical members such as a focus lens, a zoom lens, a diaphragm, and an image stabilization lens (each not illustrated), and a lens driving unit 20. The lens driving unit 20 is a driving unit for moving or actuating structural objects (for example, the optical members) provided inside the lens 19. Moreover, the second interchangeable lens 300 includes a second lens control unit 301, which includes a CPU for controlling communication which is performed between the second lens control unit 301 and the camera control unit 101 via the mount part 1 and the mount part 2, or for performing control to drive the lens driving unit 20.

Figure 8:
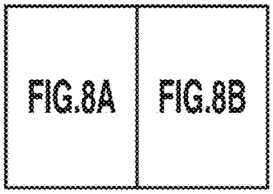
FIG. 8, which is composed of FIGS. 8A and 8B, is a diagram illustrating, as an example, connection states between the respective mounts in a case where the second interchangeable lens is mounted to the camera body via the conversion adapter, according to the present embodiment.
Figure 8A:
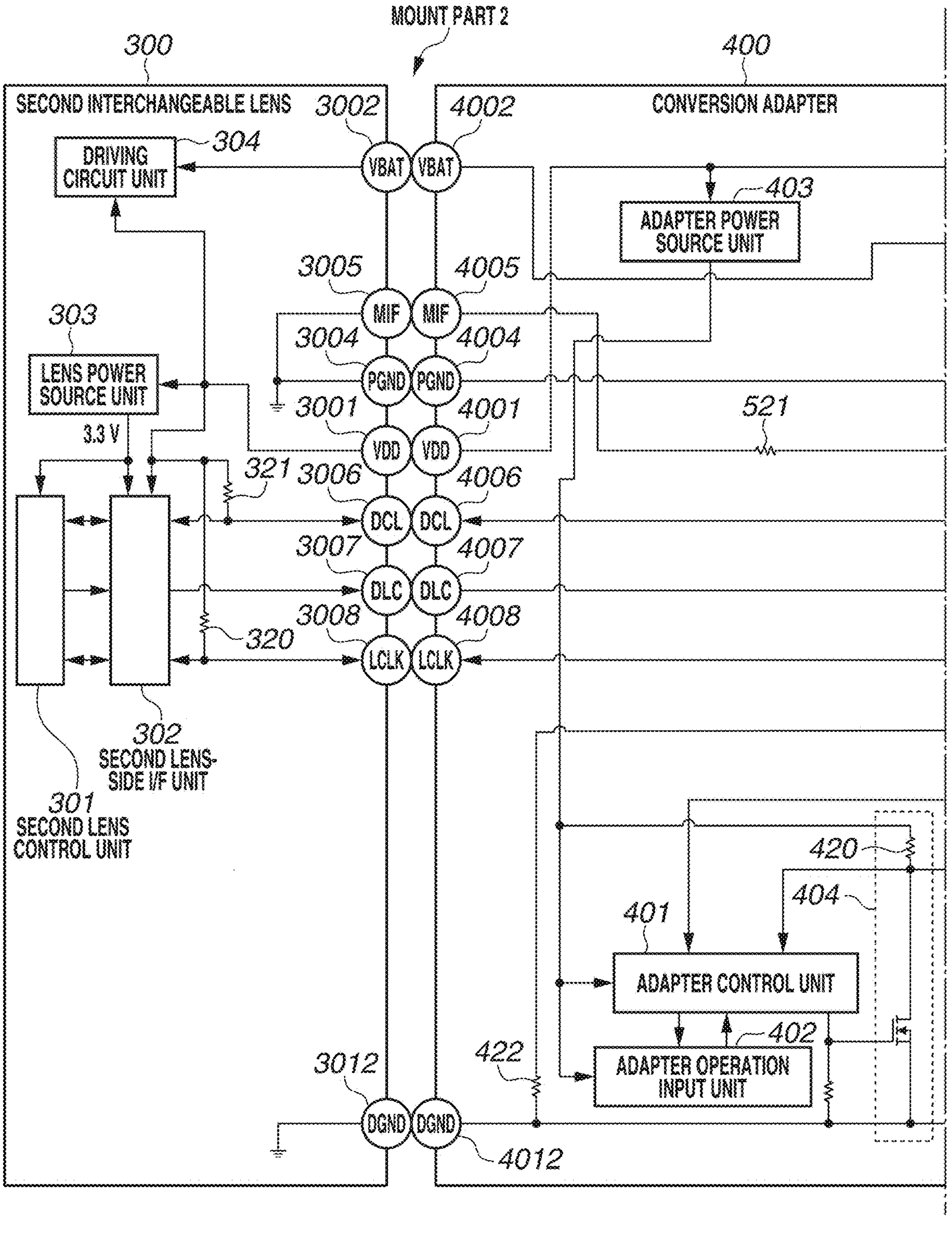
Figure 8B:
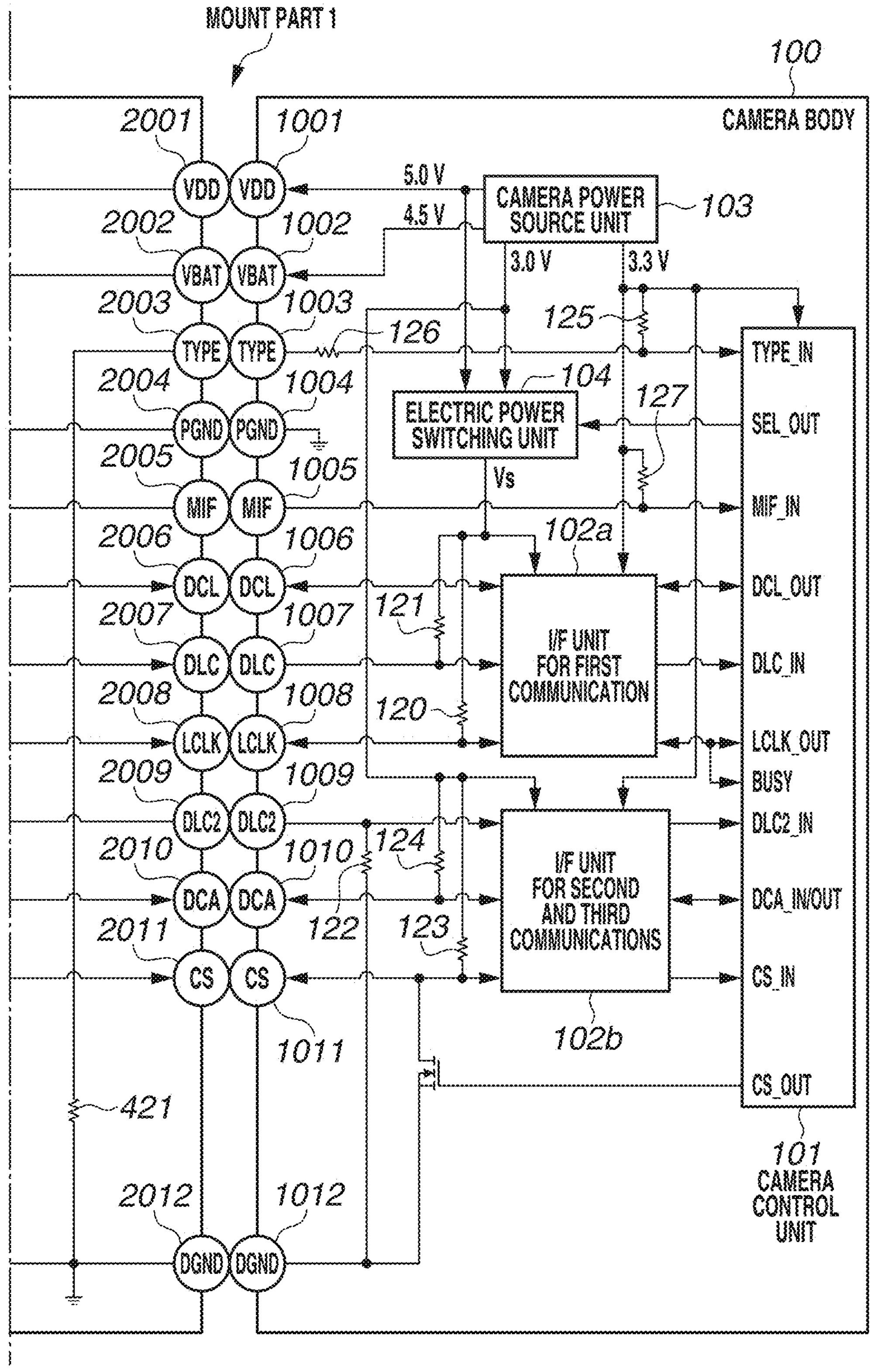

Next, a connection configuration made between the camera body 100 and the second interchangeable lens 300 via the conversion adapter 400 is described with reference to FIG. 8. FIG. 8, which is composed of FIGS. 8A and 8B, is a diagram illustrating, as an example, connection states between the respective mounts in a case where the second interchangeable lens 300 is mounted to the camera body 100 via the conversion adapter 400, according to the present embodiment. The configuration of each terminal in the mount part 1 is the same as that described above, and is, therefore, omitted from description here. Furthermore, in the present embodiment, the DLC2 terminal being provided at the side of the conversion adapter 400 facing the second interchangeable lens 300 (at the side of the camera mount C) is not essential.

As illustrated in FIG. 8, the mount part 2 includes a plurality of terminals used to electrically connect the conversion adapter 400 and the second interchangeable lens 300 to each other. The plurality of terminals includes, in the camera mount C, a plurality of electrical contact pins provided on a contact holding member 405 (FIG. 7A), corresponding to a terminal holding portion, and exposed on the outside of the conversion adapter 400. Moreover, the plurality of terminals includes, in the lens mount D, a plurality of electrical contact surfaces provided on a contact surface holding member 305 (FIG. 7B), corresponding to a terminal holding portion, and exposed on the outside of the second interchangeable lens 300. With regard to the above-mentioned contact pins and contact surfaces, the respectively corresponding contacts are electrically connected to each other in the state in which the second interchangeable lens 300 is mounted to the conversion adapter 400 mounted to the camera body 100.

Functions of the terminals which are common to both the camera mount C and the lens mount D are described as follows. VDD terminals 3001 and 4001 are terminals used to supply, from the camera body 100 to the second interchangeable lens 300 via the conversion adapter 400, communication control electric power (VDD), which primarily serves as communication electric power for use in communication control. Furthermore, the voltage of electric power which is supplied from the camera body 100 to the respective accessories is set to 5.0 V.

VBAT terminals 3002 and 4002 are terminals used to supply, from the camera body 100 to the second interchangeable lens 300, driving electric power (VBAT), which primarily serves as driving power used for operations of mechanical driving portions including actuators such as motors. Furthermore, the voltage of electric power which is supplied from the camera body 100 to the respective accessories is set to 4.5 V. Moreover, the above-mentioned VDD terminals and VBAT terminals are power source system terminals for supplying electric power from the camera body 100 to the camera accessories.

DGND terminals 3012 and 4012 are grounding terminals (ground terminals (GND terminals)) which are associated with the communication control electric power VDD. The DGND terminals 3012 and 4012 are configured to be also ground-connected to circuits provided inside the conversion adapter 400.

PGND terminals 3004 and 4004 are grounding terminals (ground terminals) used to connect a mechanical driving system including, for example, motors (actuators) provided in the camera body 100 and the second interchangeable lens 300 to ground. In other words, the PGND terminals are grounding terminals (GND terminals) which are associated with the driving electric power VBAT.

MIF terminals 3005 and 4005 are terminals used to detect that the second interchangeable lens 300 has been mounted to the camera body 100. The camera control unit 101 detects the level of a voltage which the MIF terminal exhibits, thus detecting that the camera accessory has been mounted to or has been detached from the camera body 100. Then, for example, after detecting mounting of the camera accessory in the above-mentioned detection method, the camera control unit 101 performs control to start supplying of electric power to the power source system terminals and start communication between the camera body 100 and the second interchangeable lens 300 via the conversion adapter 400.

Next, various terminals for communications between the conversion adapter 400 and the second interchangeable lens 300 are described. Furthermore, unlike the above-mentioned first interchangeable lens 200, the second interchangeable lens 300 includes only terminals associated with the first communication unit as an independent communication system.

LCLK terminals 3008 and 4008, which are terminals for the first communication unit, are terminals for communication clock signals which are output from the camera body 100 to the second interchangeable lens 300 and are also terminals used for the camera body 100 to monitor a busy state of the second interchangeable lens 300.

DCL terminals 3006 and 4006, which are terminals for the first communication unit, are terminals for communication data used to perform two-way communication between the camera body 100 and the second interchangeable lens 300, and are interfaces of what is called the CMOS output type. Furthermore, the CMOS output type in the present embodiment is a type having switch outputs at both the high (H) side and the low (L) side which the voltage exhibits. On the other hand, the open type described below is a type having a switch output at only the L side.

DLC terminals 3007 and 4007, which are terminals for the first communication unit, are terminals for communication data which is output from the second interchangeable lens 300 to the camera body 100, and are interfaces of the CMOS output type.

Furthermore, the VDD terminals, the VBAT terminals, the DGND terminals, the PGND terminals, the MIF terminals, the LCLK terminals, the DCL terminals, and the DLC terminals are respectively electrically connected to each other from the side of the mount part 1 to the side of the mount part 2 in the conversion adapter 400.

A connection configuration, in the conversion adapter 400, of each terminal which is not provided in the mount part 2 is described as follows. TYPE terminals 1003 and 2003 provided in the mount part 1 are pull-down-connected to the DGND terminal with a predetermined resistance value described below in the conversion adapter 400.

The DLC2 terminal is a terminal associated with the second communication unit as mentioned above, but is not used as a communication terminal in a case where the second interchangeable lens 300 is mounted to the camera body 100 via the conversion adapter 400. Accordingly, DLC2 terminals 1009 and 2009 are pull-down-connected to the DGND terminal with a predetermined resistance value described below in the conversion adapter 400 as a termination treatment.

DCA terminals 1010 and 2010, which are terminals associated with the third communication unit as mentioned above, are terminals for communication data used to perform two-way communication between the camera body 100 and the conversion adapter 400 in the mount part 1, and are interfaces of what is called the CMOS output type. Furthermore, in the mounts of the conversion adapter 400, there is no interconnection between the DCA terminals from the mount part 1 to the mount part 2.

CS terminals 1011 and 2011, which are terminals for the third communication unit as mentioned above, are signal terminals for communication request between the camera body 100 and the conversion adapter 400, and are interfaces of the open type. Furthermore, in the mounts of the conversion adapter 400, there is no interconnection between the CS terminals from the mount part 1 to the mount part 2.

Here, in a case where the second interchangeable lens 300 has been mounted to the camera body 100 via the conversion adapter 400, the communication voltage for use in the terminals associated with the first communication unit is set to the same voltage as that of the VDD. Moreover, the communication voltage for use in the terminals associated with the second and third communication units is set to about 3.0 V. Thus, in a case where the second interchangeable lens 300 has been mounted to the camera body 100 via the conversion adapter 400, the communication voltage for the first communication unit and the communication voltage for the second and third communication units are different from each other.

<Configuration of Intermediate Accessory 500>

Figure 9:
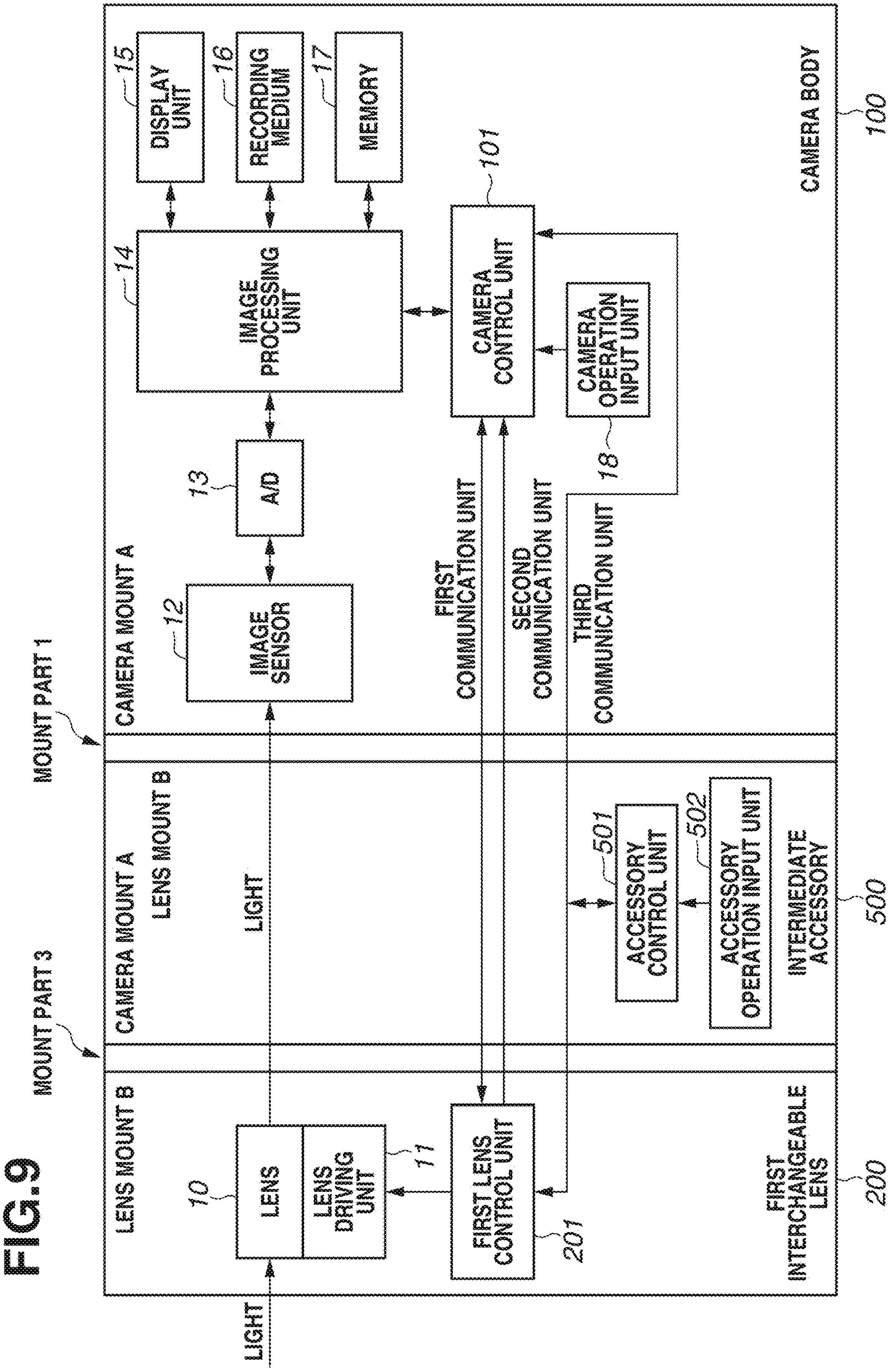
FIG. 9 is a block diagram illustrating, as an example, a state in which the first interchangeable lens is mounted to the camera body via an intermediate accessory, according to the present embodiment.

Next, a case where the first interchangeable lens 200 is connected to the camera body 100 via the intermediate accessory 500 is described with reference to FIG. 9 and FIG. 10. FIG. 9 is a block diagram illustrating, as an example, a state in which the first interchangeable lens 200 is mounted to the camera body 100 via the intermediate accessory 500, according to the present embodiment. Furthermore, as illustrated in FIG. 9, the respective mounts of the intermediate accessory 500 and the first interchangeable lens 200 are collectively referred to as a "mount part 3".

The intermediate accessory 500 includes the lens mount B, which is the same as that of the first interchangeable lens 200 described above, at the side to which the camera body 100 is to be coupled. Moreover, the intermediate accessory 500 includes the camera mount A, which is the same as that of the camera body 100, at the side opposite to the lens mount B. Furthermore, details of the respective mounts are the same as those in the camera body 100 and the first interchangeable lens 200 described above, and are, therefore, omitted from description here.

The intermediate accessory 500 is a camera accessory including an accessory operation input unit 502, which is able to receive an operation input performed by the user, an accessory power source unit 503 (FIG. 10), which is provided for the intermediate accessory 500, and an accessory control unit 501, which includes a CPU for comprehensively controlling an operation of the intermediate accessory 500. The accessory control unit 501 controls, for example, communication performed between the accessory control unit 501 and the camera control unit 101 via the mount part 1, or receives an operation input to the accessory operation input unit 502. Furthermore, in the present embodiment, the intermediate accessory 500 is, for example, an extender including a lens group for varying magnification (not illustrated) or a camera accessory capable of appending some camera functions as operations of both the camera body 100 and the first interchangeable lens 200.

Next, a connection configuration made between the camera body 100 and the first interchangeable lens 200 via the intermediate accessory 500 is described with reference to FIG. 10. FIG. 10, which is composed of FIGS. 10A and 10B, is a diagram illustrating, as an example, connection states between the respective mounts in a case where the first interchangeable lens 200 is mounted to the camera body 100 via the intermediate accessory 500, according to the present embodiment. The configuration of each terminal in the mount part 1 is the same as that described above, and is, therefore, omitted from description here.

Figure 10:
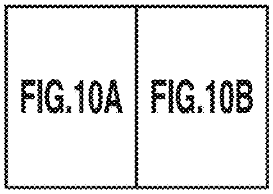
FIG. 10, which is composed of FIGS. 10A and 10B, is a diagram illustrating, as an example, connection states between the respective mounts in a case where the first interchangeable lens is mounted to the camera body via the intermediate accessory, according to the present embodiment.
Figure 10A:
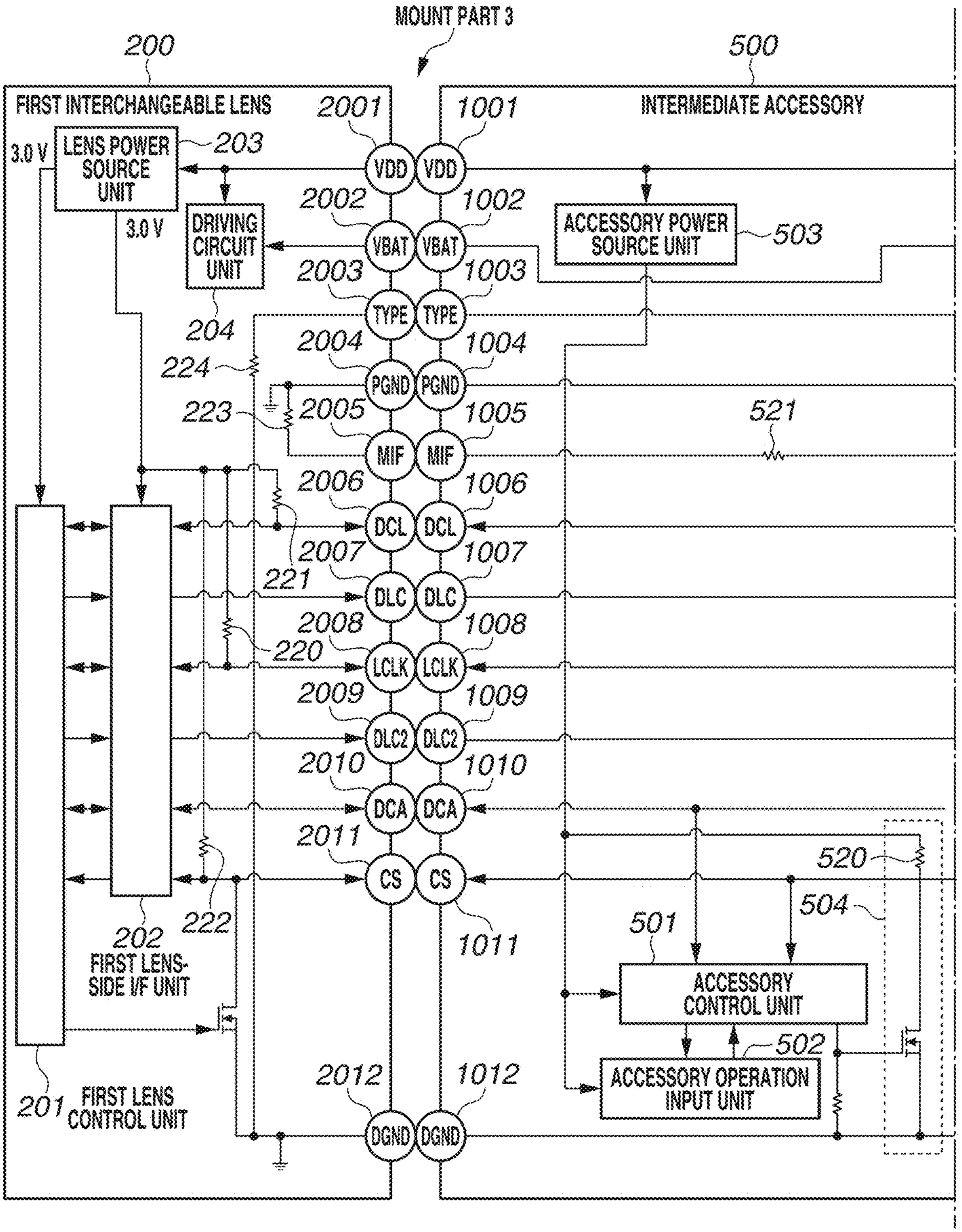
Figure 10B:
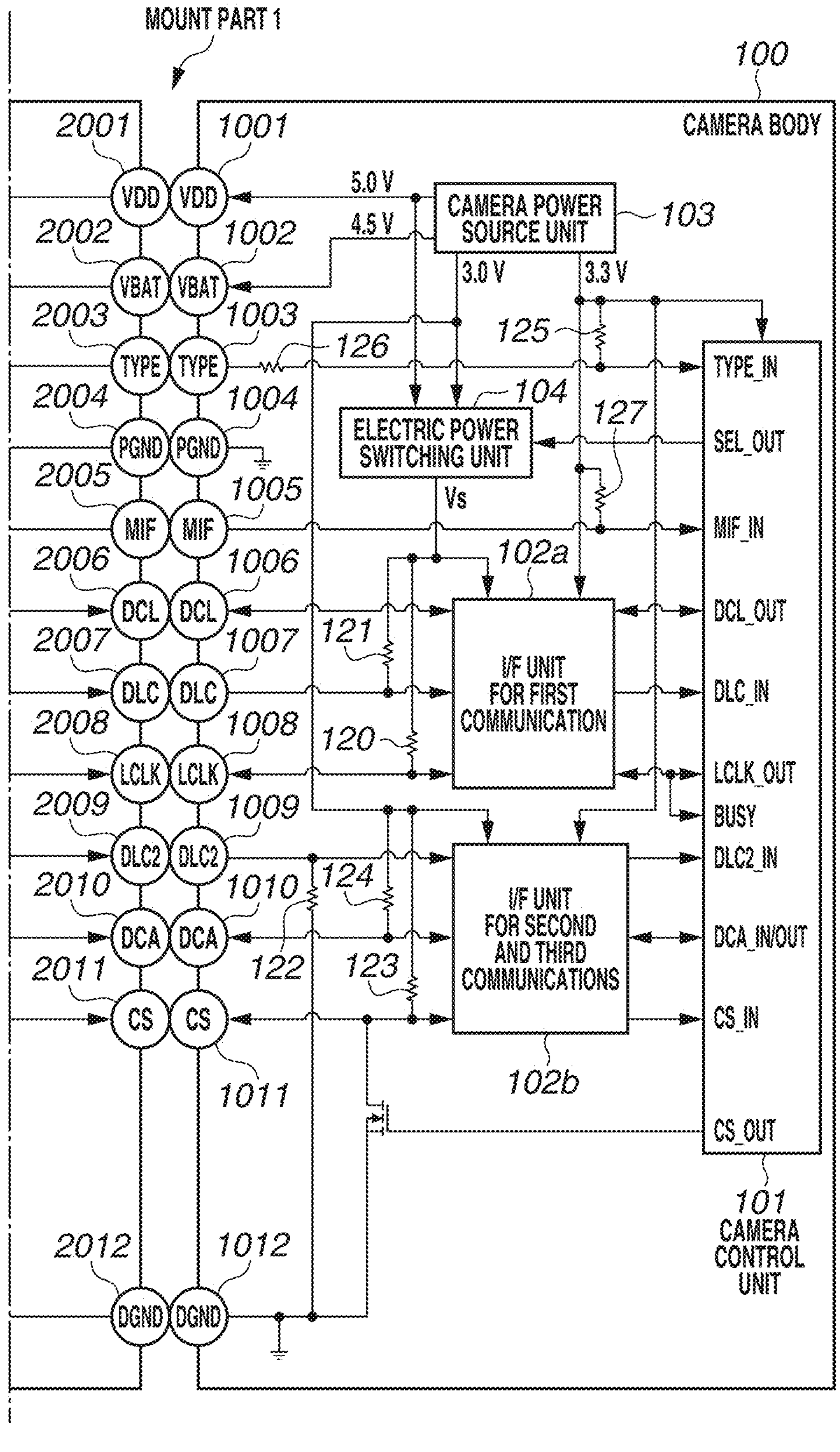

As illustrated in FIG. 10, the mount part 3 includes a plurality of terminals used to electrically connect the intermediate accessory 500 and the first interchangeable lens 200 to each other. Furthermore, the contact pins exposed on the outside of the intermediate accessory 500 as the respective terminals are the same as the above-described contact pins of the camera body 100.

Characteristics of the intermediate accessory 500 with respect to the camera body 100 and the first interchangeable lens 200 described above are described as follows. As illustrated in FIG. 10, the intermediate accessory 500 is able to be connected to the camera body 100 and the first interchangeable lens 200 via the respective terminal groups provided therefor.

VDD terminals 1001 and 2001 of the intermediate accessory 500 are connected to each other in the form of through-wiring between terminals from the mount part 1 to the mount part 3, and are also able to supply VDD (communication control electric power) to the electrical circuits of the intermediate accessory 500.

DGND terminals 1012 and 2012 of the intermediate accessory 500 are connected to each other in the form of through-wiring between terminals from the mount part 1 to the mount part 3, and are also able to ground the electrical circuits of the intermediate accessory 500.

DCA terminals 1010 and 2010 of the intermediate accessory 500, which are terminals for the third communication unit described above, are terminals for communication data used to perform two-way communication between the camera body 100, the first interchangeable lens 200, and the intermediate accessory 500. CS terminals 1011 and 2011 of the intermediate accessory 500, which are terminals for the third communication unit described above, are signal terminals for communication request between the camera body 100, the first interchangeable lens 200, and the intermediate accessory 500.

VBAT terminals, PGND terminals, MIF terminals, TYPE terminals, LCLK terminals, DCL, terminals, DLC terminals, and DLC2 terminals of the intermediate accessory 500 are not specifically described, but are respectively connected to each other in the form of through-wiring between terminals from the mount part 1 to the mount part 3.

Here, in a case where the first interchangeable lens 200 has been mounted to the camera body 100 via the intermediate accessory 500, the communication voltage in each of the terminals for the first, second, and third communication units is set to about 3.0 V as in a case where the first interchangeable lens 200 is directly mounted to the camera body 100.

<Terminal Treatment of Signal Lines in Communication Terminals>

Next, the terminal treatment of signal lines in the respective communication terminals is described with reference to FIG. 3, FIG. 8, and FIG. 10. In the camera mount A, a signal line corresponding to the LCLK terminal is pull-up-connected to the same electric potential as that of the communication voltage for the terminals associated with the first communication unit via a resistor R_LCLK_C 120, which exhibits a predetermined resistance value in the camera mount A. Moreover, in the lens mount B, a signal line corresponding to the LCLK terminal is pull-up-connected to the same electric potential as that of the communication voltage for the terminals associated with the first communication unit via a resistor R_LCLK_L 220, which exhibits a predetermined resistance value in the lens mount B.

In the lens mount B, a signal line corresponding to the DCL terminal is pull-up-connected to the same electric potential as that of the communication voltage for the terminals associated with the first communication unit via a resistor R_DCL_L 221, which exhibits a predetermined resistance value in the lens mount B.

In the camera mount A, a signal line corresponding to the DLC terminal is pull-up-connected to the same electric potential as that of the communication voltage for the terminals associated with the first communication unit via a resistor R_DLC_C 121, which exhibits a predetermined resistance value in the camera mount A.

In the camera mount A, a signal line corresponding to the DLC2 terminal is pull-down-connected to a signal line of the DGND terminal via a resistor R_DLC2_C 122, which exhibits a predetermined resistance value in the camera mount A. Furthermore, in the conversion adapter 400, a signal line corresponding to the DLC2 terminal is pull-down-connected to a signal line of the DGND terminal via a resistor R_DLC2_A 422, which exhibits a predetermined resistance value in the conversion adapter 400.

In the camera mount A, a signal line corresponding to the CS terminal is pull-up-connected to the same electric potential as that of the communication voltage for the terminals associated with the third communication unit via a resistor R_CS_C 123, which exhibits a predetermined resistance value in the camera mount A. Moreover, in the lens mount B, a signal line of the CS terminal is pull-up-connected to the same electric potential as that of the communication voltage for the terminals associated with the third communication unit via a resistor R_CS_L 222, which exhibits a predetermined resistance value in the lens mount B. Moreover, in each of the conversion adapter 400 and the intermediate accessory 500, a signal line of the CS terminal is pull-up-connected to the same electric potential as that of the communication voltage for the terminals associated with the third communication unit via a resistor R_CS_A 420 or a resistor R_CS_A 520, which exhibits a predetermined resistance value in each of the conversion adapter 400 and the intermediate accessory 500.

In the camera mount A, a signal line of the DCA terminal is pull-up-connected to the same electric potential as that of the communication voltage for the terminals associated with the third communication unit via a resistor R_DCA_C 124, which exhibits a predetermined resistance value in the camera mount A.

<Configurations of Communication Interface Units in Camera Body 100>

Next, configurations of an interface (I/F) unit for first communication 102*a* and an I/F unit for second and third communications 102*b*, which function as interface circuits between the camera control unit 101 and the communication terminals provided in the camera body 100, are described with reference to FIG. 3 and FIG. 8.

As illustrated in FIG. 3 and FIG. 8, the I/F unit for first communication 102*a* is provided inside the camera body 100. The I/F unit for first communication 102*a* is connected to each of the DCL terminal, the DLC terminal, and the LCLK terminal, and functions as an interface circuit for the first communication which is performed between the camera body 100 and each interchangeable lens.

Moreover, the I/F unit for second and third communications 102*b* is provided inside the camera body 100. The I/F unit for second and third communications 102*b* is connected to each of the DLC2 terminal, the DCA terminal, and the CS terminal, and functions as an interface circuit for second and third communications which are performed between the camera body 100 and each interchangeable lens. In the subsequent description, the I/F unit for first communication 102*a* and the I/F unit for second and third communications 102*b* are collectively referred to as an "I/F unit 102". Here, while, in the present embodiment, a case where, as illustrated in FIG. 3 and FIG. 8, the camera control unit 101 is driven at a voltage level of 3.3 V and the level of voltage of the camera control unit 101 is 3.3 V is described as an example, the level of voltage can be set to another value.

The I/F unit 102 includes, as one of primary roles, a level shifter function for performing mutual conversion of the voltage exhibited by a terminal provided in the camera mount A and the voltage of the camera control unit 101. With regard to the level shifter function, for example, in a case where the first interchangeable lens 200 has been mounted to the camera body 100, as mentioned above, the interface voltage for the respective terminals associated with the first, second, and third communication units is 3.0 V. On the other hand, the voltage of the camera control unit 101 exhibits 3.3 V, so that a difference occurs between the above-mentioned interface voltage and the voltage of the camera control unit 101. The I/F unit 102 performs voltage conversion for the voltages exhibited by the respective terminals so as to adjust such a difference.

Moreover, for example, in a case where the second interchangeable lens 300 has been connected to the camera body 100 via the conversion adapter 400, the interface voltage for the terminals associated with the first communication unit is the same voltage (5.0 V) as the VDD as mentioned above. Then, the interface voltage for the terminals associated with the second and third communication units is 3.0 V. In this case, the I/F unit 102 also performs voltage conversion for the voltages exhibited by the respective terminals so as to adjust a difference between the two interface voltages. Thus, when the electric power voltage (3.3 V) indicating the same voltage level as that of the voltage of the camera control unit 101 and the electric power voltage (5.0 V or 3.0 V) indicating the same voltage level as that of the voltage exhibited by each terminal are supplied to the I/F unit 102, voltage conversion of signals for the respective terminals is performed.

Furthermore, with regard to the I/F unit for second and third communications 102*b*, since the voltage level exhibited by each terminal provided in the mount is always a fixed value, if the fixed value is the same voltage level as that of the voltage of the camera control unit 101, the above-mentioned level shifter function is not essential.

Moreover, the I/F unit 102 includes, as one of primary roles, a function of switching the LCLK terminal 1008 and the DCL terminal 1006 between outputting of the open drain type and outputting of the CMOS output type in the camera mount A. Details thereof are specifically described as follows.

For example, in an initial state immediately after the first interchangeable lens 200 has been mounted to the camera body 100, the LCLK terminal 1008 and the DCL terminal 1006 of the camera body 100 perform outputting of the open drain type. Furthermore, for example, as illustrated in FIG. 3, the camera control unit 101 monitors the voltage level of the LCLK terminal 1008 with use of the BUSY input terminal of the camera control unit 101. Then, for example, in a case where the camera body 100 is unable to perform communication with the first interchangeable lens 200 (the communication being impossible), the camera control unit 101 outputs the voltage of low level to the LCLK terminal 2008 in the lens mount B, and, if the communication is possible, the camera control unit 101 switches the LCLK terminal 2008 to the input side. At that time, the voltage of high level is output to the LCLK terminal lines in the respective mounts by the resistors R_LCLK_C 120 and R_LCLK_L 220, which are pull-up resistors.

On the other hand, for example, upon detecting switching of the voltage level of the LCLK terminal 1008 to high level, the camera control unit 101 recognizes that the first interchangeable lens 200 has become able to perform communication. After that, the camera control unit 101 selects which of the open drain type and the CMOS output type to use with respect to the LCLK terminal 1008 and the DCL terminal 1006, and changes the LCLK terminal 1008 and the DCL terminal 1006 to the selected output type with use of the I/F unit 102. Here, a communication performed with the I/F unit 102 used for the open drain type is referred to as an "open drain communication", and a communication performed with the I/F unit 102 used for the CMOS output type is referred to as a "CMOS communication".

Upon detecting the voltage of high level from the LCLK terminal 1008 at the time of mounting of the first interchangeable lens 200, the camera control unit 101 switches the LCLK terminal 1008 and the DCL terminal 1006 to the CMOS output type, thus performing the CMOS communication with the first interchangeable lens 200. Moreover, at the time of mounting of the second interchangeable lens 300, the camera control unit 101 keeps the LCLK terminal 1008 and the DCL terminal 1006 to the open drain type, thus performing the open drain communication with the second interchangeable lens 300. After that, when determining that the second interchangeable lens 300 is an interchangeable lens compatible with the CMOS communication, the camera control unit 101 switches the LCLK terminal 1008 and the DCL terminal 1006 to the CMOS output type with use of the I/F unit 102, thus performing the CMOS communication with the second interchangeable lens 300.

Furthermore, the above-mentioned open type output method can be what is called an open collector output method, besides the open drain output method, and the high level output of a voltage can be implemented by providing a pull-up resistor as mentioned above. Moreover, the switching method for output methods is not limited to the above-mentioned method, and only needs to have at least a configuration in which, when any interchangeable lens has been mounted to the camera body 100, the LCLK terminal 1008 and the DCL terminal 1006 perform communication of the open type.

Moreover, the I/F unit 102 includes, one of primary roles, an input and output direction switching function to switch the directionality of an input and an output of the DCL terminal 1006 and the DCA terminal 1010 in the camera mount A. As mentioned above, since the DCL terminal and the DCA terminal are used to perform two-way communication of communication data, input and output directions of signals are switched by the I/F unit 102.

Here, in the present embodiment, a configuration in which the voltage exhibited by each terminal associated with the first communication unit is switched to the same voltage as that of the VDD or 3.0 V according to the type of an accessory which is mounted to the camera body 100 is employed. On the other hand, the voltage exhibited by each terminal associated with the second or third communication unit is not changed according to the type of an accessory which is mounted to the camera body 100, but is always a fixed value (3.0 V).

To the I/F unit for first communication 102*a*, a power source voltage (Vs) which is one of the same voltage as that of the VDU and 3.0 V and a power source voltage (3.3 V) which is at the same potential as that of the voltage exhibited by the camera control unit 101 are supplied from the camera power source unit 103 described below. Moreover, to the I/F unit for second and third communications 102*b*, a power source voltage of 3.0 V and a power source voltage (3.3 V) which is at the same potential as that of the voltage exhibited by the camera control unit 101 are supplied from the camera power source unit 103 described below.

<Configurations of Camera Power Source Unit and Electric Power Switching Unit in Camera Body 100>

Next, a configuration of the camera power source unit 103, which generates various values of electric power in the camera body 100, is described with reference to FIG. 3 and FIG. 8. The camera power source unit 103 generates communication control electric power (VDD) as electric power which is to be supplied to the mounted accessory via the VDD terminal or electric power which is to be supplied to the I/F unit for first communication 102*a* via an electric power switching unit 104 described below. Moreover, the camera power source unit 103 generates driving electric power (VBAT) as electric power which is to be supplied to the mounted accessory via the VBAT terminal. As mentioned above, in the present embodiment, the power source voltage of the VDD is set to 5.0 V, and the power source voltage of the VBAT is set to 4.5 V.

Moreover, the camera power source unit 103 generates electric power of 3.3 V as electric power which is to be supplied to the camera control unit 101 and the I/F unit 102. Moreover, the camera power source unit 103 generates electric power of 3.0 V as electric power which is to be supplied to the I/F unit 102 via the electric power switching unit 104 described below.

Next, details of the electric power switching unit 104, which is configured to switch electric power (the voltage of electric power) to be supplied to the I/F unit for first communication 102*a*, are described. The electric power switching unit 104 is connected to the camera power source unit 103. The electric power switching unit 104 supplies, to the I/F unit for first communication 102*a*, only one of the VDD and electric power of 3.0 V generated by the camera power source unit 103, as electric power Vs for communication interface. Furthermore, switching of electric power voltages is performed according to an instruction from the camera control unit 101.

When determining, via the TYPE terminal 1003, that the type of a camera accessory mounted to the camera body 100 is the first interchangeable lens 200, the camera control unit 101 controls the electric power switching unit 104 in such a manner that the electric power Vs is set to electric power of 3.0 V. On the other hand, when determining that the second interchangeable lens 300 is mounted to the camera body 100 via the conversion adapter 400, the camera control unit 101 controls the electric power switching unit 104 in such a manner that the electric power Vs for communication interface is set to the same voltage as that of the VDD. Additionally, during a period in which mounting of a camera accessory to the camera body 100 is not yet detected and a during a period in which the type of a camera accessory mounted to the camera body 100 is not yet discriminated, the camera control unit 101 controls the electric power switching unit 104 in such a manner that the electric power Vs is set to electric power of 3.0 V. With this configuration, for example, in a case where the first interchangeable lens 200 has been directly mounted to the camera body 100, it is possible to prevent voltages of higher than 3.0 V from being applied to electrical circuits of the first interchangeable lens 200, the rated voltage of which is 3.0 V.

Furthermore, a configuration in which, during a period in which mounting of a camera accessory to the camera body 100 is not yet detected and a during a period in which the type of a camera accessory mounted to the camera body 100 is not yet discriminated, the electric power switching unit 104 does not supply the electric power Vs for communication interface can be employed. Similarly, a configuration in which, even with regard to electric power (3.0 V) to be supplied to the I/F unit for second and third communications **102*b*, the electric power switching unit 104 does not supply the electric power Vs can be employed. With this configuration, since it is possible to prevent a predetermined voltage from being applied to each terminal in the state in which electric power is not supplied from the camera side to the camera accessory side, it is possible to reduce electric current of unintended voltages from flowing through the terminals which do not correspond to each other when the camera accessory is not yet mounted to the camera body 100**.

As described above, in the camera body 100, the camera control unit 101 controlling the I/F unit 102 and the electric power switching unit 104 enables performing each communication with use of voltages appropriate depending on the type of a camera accessory mounted to the camera body 100.

<Configuration of Communication interface Unit in First Interchangeable Lens 200>

Next, a configuration of a first lens-side I/F unit 202, which serves as an interface circuit between various communication terminals and the first lens control unit 201 provided in the first interchangeable lens 200, is described with reference to FIG. 3.

As illustrated in FIG. 3, inside the first interchangeable lens 200, the first lens-side I/F unit 202 is provided as an interface unit for communication in the first interchangeable lens 200. The first lens-side I/F unit 202 serves as an interface circuit used for the camera body 100 and the first interchangeable lens 200 to perform communication via the terminals respectively associated with the first, second, and third communication units.

The first lens-side I/F unit 202 includes, as one of roles, a level shifter function for performing mutual conversion of the voltage of a terminal provided in the lens mount B and the voltage exhibited by the first lens control unit 201. With regard to the level shifter function, for example, in a case where the voltage level exhibited by the first lens control unit 201 and the voltage level exhibited by each terminal are different from each other, depending on a difference between the voltage levels, the first lens-side I/F unit 202 performs voltage conversion for the voltages exhibited by the respective terminals so as to adjust such a difference. Furthermore, in a case where, as illustrated in FIG. 3, the voltage level exhibited by the first lens control unit 201 and the voltage level exhibited by each terminal are the same (3.0 V), the above-mentioned level shifter function is not essential.

Moreover, the first lens-side I/F unit 202 includes, as one of primary roles, a function of switching the LCLK terminal 2008 between inputting and outputting of the open drain type in the lens mount B. Moreover, the first lens-side I/F unit 202 includes, as one of primary roles, a function of switching the DLC terminal 2007 between outputting of the open drain type and outputting of the CMOS output type in the lens mount B.

Furthermore, control of the LCLK terminal 2008 and the DLC terminal 2007 in a case where the first interchangeable lens 200 has been mounted to the camera body 100 is as described above in the description of a communication interface in the camera body 100. Thus, the first lens control unit 201 controls the first lens-side IX unit 202 to switch the output types of the LCLK terminal 2008 and the DLC terminal 2007 according to the voltage level which the LCLK terminal 2008 outputs.

Moreover, the first lens-side I/F unit 202 includes, one of primary roles, an input and output direction switching function to switch the directionality of an input and an output of the DCL terminal 2006 and the DCA terminal 2010. As mentioned above, since the DCL terminal and the DCA terminal are used to perform two-way communication of communication data, input and output directions of signals are switched by the first lens-side I/F unit 202.

<Configuration of Lens Power Source Unit in First Interchangeable Lens 200>

Next, a configuration of a lens power source unit 203, which generates various values of electric power in the first interchangeable lens 200, is described with reference to FIG. 3. In the state in which the first interchangeable lens 200 has been mounted to the camera body 100, the above-mentioned communication control electric power (VDD) is supplied from the camera power source unit 103 to the lens power source unit 203 in the first interchangeable lens 200 via the VDD terminals. In this state, the lens power source unit 203 generates electric power of 3.0 V, as electric power voltages which are supplied to the first lens control unit 201 and the first lens-side I/F unit 202, based on the VDD supplied from the camera body 100.

Moreover, in the state in which the first interchangeable lens 200 has been mounted to the camera body 100, the above-mentioned driving electric power (VBAT) is supplied from the camera power source unit 103 to a driving circuit unit 204 in the first interchangeable lens 200 via the VBAT terminals.

Furthermore, while, in the present embodiment, the levels of voltages to be applied to the first lens control unit 201 and the first lens-side I/F unit 202 are set the same (3.0 V), a configuration in which the voltage level to be applied to the first lens control unit 201 is set to 3.3 V can be employed. In this case, since it is necessary to supply electric power with a voltage level of 3.0 V to be applied to the first lens-side I/F unit 202 and electric power with a voltage level of 3.3 V to be applied to the first lens control unit 201, the lens power source unit 203 generates electric power of 3.0 V and electric power of 3.3 V.

<Configuration of Communication Interface Unit in Second Interchangeable Lens 300>

Next, a configuration of a second lens-side I/F unit 302, which serves as an interface circuit between various communication terminals and the second lens control unit 301 provided in the second interchangeable lens 300, is described with reference to FIG. 8.

As illustrated in FIG. 8, inside the second interchangeable lens 300, the second lens-side PT unit 302 is provided. The second lens-side PT unit 302 is connected to the DCL terminal 3006, the DLC terminal 3007, and the LCLK terminal 3008, and serves as an interface circuit for a first communication which is performed between the camera body 100 and the second interchangeable lens 300.

The second lens-side I/F unit 302 includes, as one of roles, a level shifter function for performing conversion of the voltage exhibited by a terminal provided in the lens mount D and the voltage exhibited by the second lens control unit 301.

With regard to the level shifter function, for example, a case where the voltage level exhibited by each terminal is the same voltage as that of the VDD and the voltage exhibited by the second lens control unit 301 is 3.3 V is supposed. In this case, to adjust a difference between the two voltages, the second lens-side I/F unit 302 performs voltage conversion for the voltages exhibited by the respective terminals so as to adjust such a difference. Furthermore, in a case where the voltage level exhibited b second lens control unit 301 and the voltage level exhibited by each terminal are the same, the above-mentioned level shifter function is not essential.

Moreover, the second lens-side I/F unit 302 includes, as one of primary roles, a function of switching the LCLK terminal 3008 between inputting and outputting of the open drain type in the lens mount D. Moreover, the second lens-side OF unit 302 includes, as one of primary roles, a function of switching the DLC terminal 3007 between outputting of the open drain type and outputting of the CMOS output type in the lens mount D.

Furthermore, control of the LCLK terminal 3008 and the DLC terminal 3007 in a case where the second interchangeable lens 300 has been mounted to the camera body 100 via the conversion adapter 400 is as described above in the description of a communication interface in the first interchangeable lens 200. Thus, the second lens control unit 301 controls the second lens-side I/F unit 302 to switch the output types of the LCLK terminal 3008 and the DLC terminal 3007 according to the voltage level which the LCLK terminal 3008 outputs.

<Configuration of Lens Power Source Unit in Second Interchangeable Lens 300>

Next, a configuration of a lens power source unit 303, which generates various values of electric power in the second interchangeable lens 300, is described with reference to FIG. 8. In the state in which the second interchangeable lens 300 has been mounted to the camera body 100 via the conversion adapter 400, the above-mentioned communication control electric power (VDD) is supplied from the camera power source unit 103 to the lens power source unit 303 in the second interchangeable lens 300 via the VDD terminals. In this state, the lens power source unit 303 generates electric power of 3.3 V, as electric power voltages which are supplied to the second lens control unit 301 and the second lens-side I/F unit 302, based on the VDD supplied from the camera body 100.

Moreover, in the state in which the second interchangeable lens 300 has been mounted to the camera body 100 via the conversion adapter 400, the above-mentioned driving electric power (VBAT) is supplied from the camera power source unit 103 to a driving circuit unit 304 in the second interchangeable lens 300 via the VBAT terminals.

<Internal Configuration of Conversion Adapter 400>

Next, an internal configuration and operation of a circuitry included in the conversion adapter 400 are described with reference to FIG. 8. In the state in which the conversion adapter 400 has been mounted to the camera body 100, the above-mentioned communication control electric power (VDD) is supplied from the camera power source unit 103 to the adapter power source unit 403 in the conversion adapter 400 via the VDD terminals. In this state, the adapter power source unit 403 generates electric power which is supplied to the adapter control unit 401, which includes an adapter CPU, and the adapter operation input unit 402, based on the VDD supplied from the camera body 100.

The adapter operation input unit 402 is able to receive an operation input by the user to perform, for example, setting concerning manual focusing and setting concerning the aperture diameter of the diaphragm, and includes, as an operation member which is able to be manually operated by the user, for example, a ring member which is able to be rotated in the circumferential direction of the conversion adapter 400.

The adapter control unit 401 performs control of an open interface unit 404, which is formed from an N-channel type transistor, to perform assertion or negation of a communication request of the CS terminal 2011 provided in the lens mount B of the conversion adapter 400. Moreover, the adapter control unit 401, to which the voltage level of the CS terminal 2011 is input, monitors the voltage level of the CS terminal 2011.

Operation information input by the adapter operation input unit 402 is reflected in various settings of the camera body 100 through the third communication which is performed via the terminals associated with the third communication unit between the adapter control unit 401 and the camera control unit 101. Specifically, upon detecting operation information input to the adapter operation input unit 402, the adapter control unit 401 controls the open interface unit 404 to transmit a communication request to the camera control unit 101 via the CS terminal 2011, which is associated with the third communication unit. Moreover, in this case, the adapter control unit 401 transmits the detected operation information to the camera control unit 101 via the DCA terminal 2010, which is associated with the third communication unit.

<Internal Configuration of Intermediate Accessory 500>

Next, an internal configuration and operation of a circuitry included in the intermediate accessory 500 are described with reference to FIG. 10. In the state in which the intermediate accessory 500 has been mounted to the camera body 100, the above-mentioned communication control electric power (VDD) is supplied from the camera power source unit 103 to the accessory power source unit 503 in the intermediate accessory 500 via the VDD terminals. In this state, the accessory power source unit 503 generates electric power which is supplied to the accessory control unit 501, which includes an accessory CPU, and the accessory operation input unit 502, based on the VDD supplied from the camera body 100.

The accessory operation input unit 502 is able to receive an operation input by the user to perform, for example, setting concerning manual focusing and setting concerning the aperture diameter of the diaphragm, and includes, as an operation member which is able to be manually operated by the user, for example, a ring member which is able to be rotated in the circumferential direction of the intermediate accessory 500.

Furthermore, as with the above-mentioned conversion adapter 400, the intermediate accessory 500 also includes an open interface unit 504, which is formed from an N-channel type transistor. The open interface unit 504 performs approximately the same operation as that of the above-mentioned open interface unit 404 although being aimed at a different controlled object, and is, therefore, omitted from description.

Operation information input by the accessory operation input unit 502 is reflected in various settings of the camera body 100 through the third communication which is performed via the terminals associated with the third communication unit between the accessory control unit 501 and the camera control unit 101 or the first lens control unit 201. Specifically, upon detecting operation information input to the accessory operation input unit 502, the accessory control unit 501 controls the open interface unit 504 to transmit a communication request to the camera control unit 101 via the CS terminal 2011, which is associated with the third communication unit. Moreover, in this case, the accessory control unit 501 transmits the detected operation information to the camera control unit 101 via the DCA terminal 2010, which is associated with the third communication unit.

<Discrimination Method for Camera Accessory>

Next, a method for discriminating, at the camera body 100, the type of a camera accessory mounted to the camera body 100 is described with reference to FIGS. 11A, 11B, 11C, 11D, and 11E and Table 1, which is set forth below. More specifically, a method in which, in the camera body 100, the camera control unit 101 discriminates the type of a camera accessory mounted to the camera body 100 based on the level of a voltage exhibited by the TYPE terminal 1003 is described.

TABLE 1

| Mounted accessory | Error 1 | First interchangeable lens 100 | Reserved |
|---|---|---|---|
| TYPE_IN terminal | 0 × 0000 −0 × 007F | 0 × 0080 −0 × 017F | 0 × 0180 −0 × 027F |
| Communication voltage | Not perform communication | 3.0 V | Not perform communication |
| **Mounted accessory** | **Conversion adapter 400** | **Error 2** | |
| TYPE_IN terminal | 0 × 0280 −0 × 037F | 0 × 0380 −0 × 03FF | |
| Communication voltage | VDD (5.0 V) | Not perform communication | |

As mentioned above, Table 1 is a table representing a relationship between the input signal to the TYPE terminal and the communication voltage in a case where each type of camera accessory has been mounted to the camera body 100 (including the case of, for example, error). Furthermore, in the present embodiment, information (table data) indicating the relationship between voltage levels exhibited by the TYPE_IN terminal and accessories to be mounted such as that shown in Table 1 is previously stored in a memory (not illustrated) provided in the camera control unit 101. Furthermore, a configuration in which the table data is recorded on any memory region as long as such a memory region is a recording unit provided inside the camera body 100 can be employed.

In a case where the first interchangeable lens 200 is mounted to the camera body 100, the TYPE terminal 1003 is pull-up-connected to electric power exhibiting a voltage level of 3.3 V via a resistor R_TYPE_C 125. Moreover, in this case, the TYPE terminal 1003 is pull-down-connected to the DGND terminal via a resistor R_TYPE_L 224. In this case, a voltage obtained by electric power of 3.3 V being divided by respective resistance values of the resistor R_TYPE_C 125 and the resistor R_TYPE_L 224 at the TYPE terminal 1003 is input to the camera control unit 101. In the present embodiment, the respective resistance values exhibited by the above-mentioned resistors are set according to the proportion thereof to a resistance value exhibited by another resistor connected to a terminal likely to be short-circuited, in consideration of a case where a short circuit occurs between terminals.

Moreover, in a case where the conversion adapter 400 is mounted to the camera body 100, the TYPE terminal 1003 is pull-up-connected to electric power exhibiting a voltage level of 3.3 V via the resistor R_TYPE_C 125 and is pull-down-connected to the DGND terminal via a resistor R_TYPE_A 421. In this case, a voltage obtained by electric power of 3.3 V being divided by respective resistance values of the resistor R_TYPE_C 125 and the resistor R_TYPE_A 421 is input to the camera control unit 101.

Here, the camera control unit 101 includes an analog-to-digital (AD) converter and a TYPE_IN terminal serving as an input port for the AD converter. The TYPE terminal 1003 is connected to the TYPE_IN terminal. Moreover, for purposes of illustration, the resolution of the AD converter is assumed to be 10 bits (divided into 1024 parts: 0x0000-0x03FF). Additionally, a resistor (R_TYPE_S 126) exhibiting a predetermined resistance value (in the present embodiment, 1 kΩ) provided to protect the TYPE_IN terminal is connected between the TYPE terminal 1003 and the TYPE_IN terminal.

Moreover, for purposes of illustration, predetermined resistance values exhibited by the respective resistors are assumed to be as follows as an example. The resistance value of the resistor R_TYPE_C 125, which represents a pull-up resistance value in the camera body 100, is 100 kΩ. The resistance value of the resistor R_TYPE_L 224, which represents a pull-down resistance value in the first interchangeable lens 200, is 33 kΩ. The resistance value of the resistor R_TYPE_A 421, which represents a pull-down resistance value in the conversion adapter 400, is 300 kΩ.

The camera control unit 101 discriminates the type of a camera accessory mounted to the camera body 100 according to a voltage level which is input to the TYPE_IN terminal. Specifically, the camera control unit 101 performs AD conversion of the voltage level input to the TYPE_IN terminal. Then, the camera control unit 101 compares the voltage value obtained by the AD conversion with a threshold value (reference value) corresponding to the type of a lens, which is previously retained by a memory (not illustrated) of the camera control unit 101, thus discriminating the type of a camera accessory.

Figure 11A:
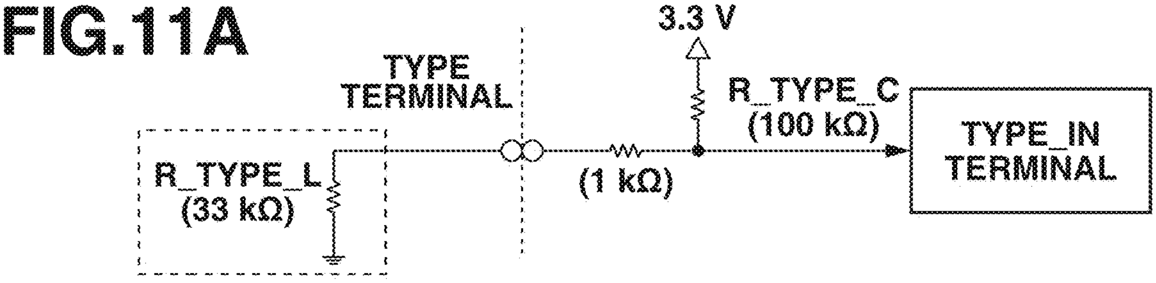
FIGS. 11A, 11B, 11C, 11D, and 11E are diagrams illustrating, as an example, connection states between a TYPE_IN terminal of the camera body and the respective camera accessories, according to the present embodiment.
Figure 11B:
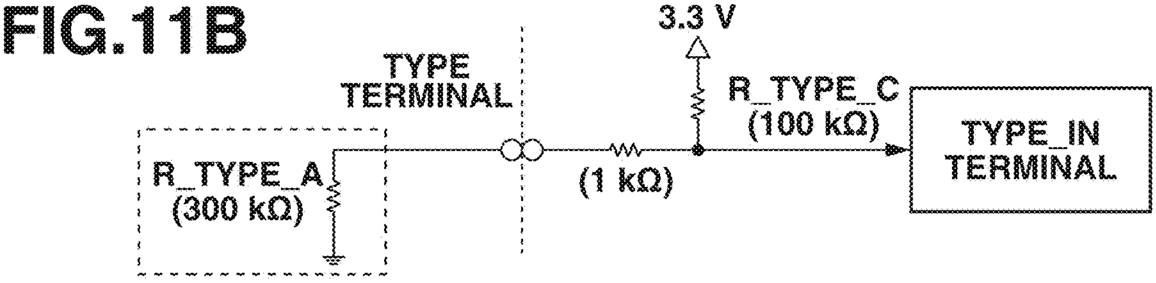
Figure 11C:
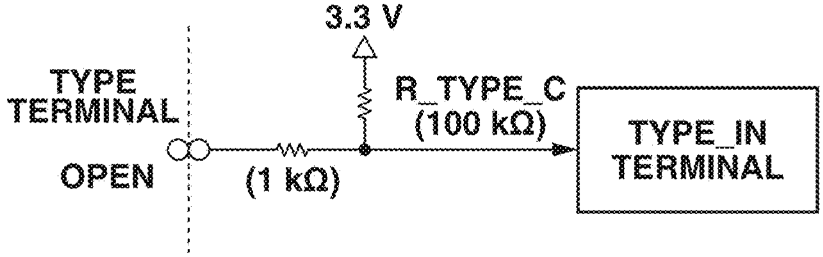
Figure 11D:
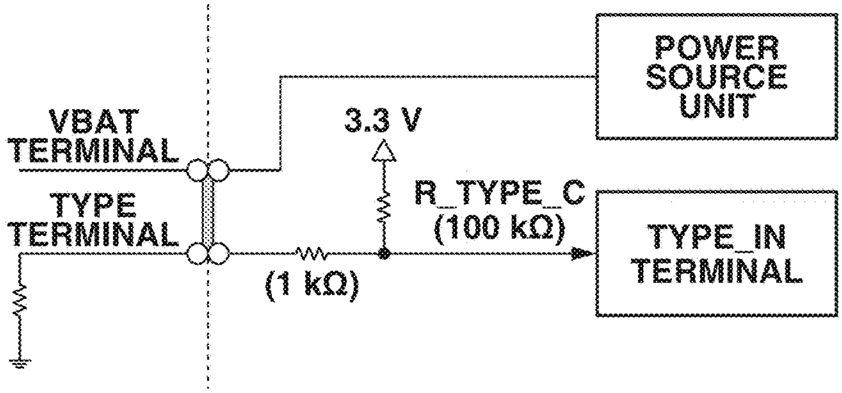
Figure 11E:
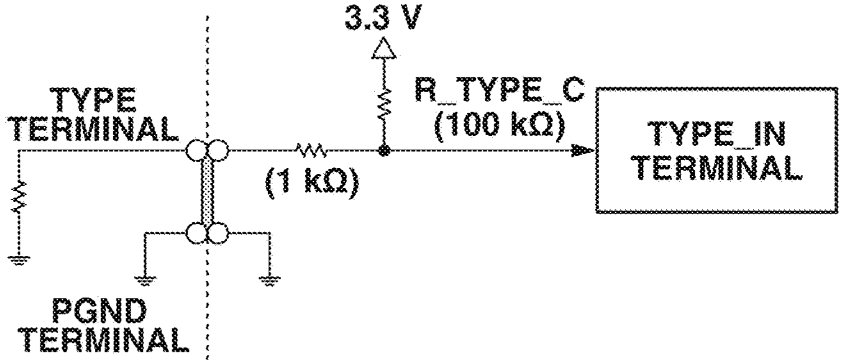

Specific discrimination methods for the respective camera accessories are described as follows. FIGS. 11A to 11E are diagrams illustrating, as an example, connection states between the TYPE_IN terminal of the camera body 100 and the respective camera accessories, according to the present embodiment. FIG. 11A illustrates a case where the first interchangeable lens 200 is mounted to the camera body 100, and FIG. 11B illustrates a case where the conversion adapter 400 is mounted to the camera body 100. FIG. 11C illustrates a case where the TYPE terminals respectively provided in the camera body 100 and a camera accessory are not correctly in connection with each other due to, for example, a loose contact. FIG. 11D illustrates a case where the TYRE terminal is short-circuited with the VBAT terminal adjacent thereto due to, for example, a conductive foreign substance adhering between the terminals. FIG. 11E illustrates a case where the TYPE terminal is short-circuited with the PGND terminal adjacent thereto due to, for example, a conductive foreign substance adhering between the terminals.

As illustrated in FIG. 11A, in a case where the first interchangeable lens 200 has been mounted to the camera body 100, the voltage level (obtained after AD conversion) which is input to the TYPE_IN terminal of the camera control unit 101 becomes approximately "0x0103". The voltage level which is input to the TYPE_IN terminal is determined based on the proportion (voltage dividing ratio) of the pull-up resistance (R_TYPE_C 125) 100 kΩ of the camera body 100 to the protective resistance (R_TYPE_S 126) 1 kΩ and the pull-down resistance 33 kΩ of the first interchangeable lens 200.

The camera control unit 101 compares the table data (shown in Table 1) stored in the memory and the voltage level which is input to the TYPE_IN terminal with each other. For example, in a case where the voltage level (obtained after AD conversion) which is input to the TYPE_IN terminal is "0x0103", such a voltage level is included in the voltage level range of "0x0080-0x017F", which indicates that the first interchangeable lens 200 is mounted to the camera body 100, such as that shown in Table 1. In this case, the camera control unit 101 determines that the first interchangeable lens 200 has been mounted to the camera body 100.

Moreover, as illustrated in FIG. 11B, in a case where the conversion adapter 400 has been mounted to the camera body 100, the voltage level (obtained after AD conversion) which is input to the TYPE_IN terminal of the camera control unit 101 becomes approximately "0x0300". Furthermore, in the case illustrated in FIG. 11B, the voltage level which is input to the TYPE_IN terminal is determined based on the proportion (voltage dividing ratio) of the pull-up resistance 100 kΩ provided in the camera body 100 to the protective resistance 1 kΩ and the pull-down resistance 300 kΩ provided in the conversion adapter 400.

In this case, since the voltage level (obtained after AD conversion) which is input to the TYPE_IN terminal is "0x0300", such a voltage level is included in the voltage level range of "0x0280-0x037F", which indicates that the conversion adapter 400 is mounted to the camera body 100, such as that shown in Table 1. Accordingly, the camera control unit 101 determines that the conversion adapter 400 has been mounted to the camera body 100.

Next, as illustrated in FIG. 11C, in a case where the TYPE terminals respectively provided in the camera body 100 and a camera accessory have a loose contact, the voltage level which is input to the TYPE_IN terminal of the camera control unit 101 becomes approximately "0x03FF". In this case, the voltage level which is input to the TYPE_IN terminal is determined based on only the pull-up resistance 100 kΩ provided in the camera body 100.

In the above-mentioned case, the voltage level which is input to the TYPE_IN terminal is a voltage which is associated with neither the first interchangeable lens 200 nor the conversion adapter 400. In this case, since the voltage level which is input to the TYPE_IN terminal corresponds to Error 1 shown in Table 1, the camera control unit 101 is unable to discriminate the camera accessory mounted to the camera body 100. Furthermore, the state illustrated in FIG. 11C corresponds to, for example, a case where, although the respective MIF terminals of the camera body 100 and the camera accessory are correctly connected to each other, the TYPE terminals are not in contact with each other.

Next, as illustrated in FIG. 11D, in a case where the TYPE terminal is short-circuited with a terminal adjacent thereto due to, for example, a conductive foreign substance adhering between the TYPE terminal and the VBAT terminal adjacent thereto, a signal line for the VBAT terminal would be connected to the TYPE terminal. Here, in a case where discriminating the type of a camera accessory mounted to the camera body 100 is performed before supplying of electric power to the VBAT terminal, the result of discrimination of the type of a camera accessory differs depending on the state of VBAT electric power.

For example, in a case where supplying of VBAT electric power is turned off and the signal line for VBAT electric power is at an electric potential equal to that of the signal line for the PGND terminal, the signal line for the TYPE terminal becomes at the same potential as that of the signal line for the PGND terminal. In this case, the voltage level which is input to the TYPE_IN terminal is determined based on the proportion (voltage dividing ratio) of the pull-up resistance (R_TYPE_C 125) 100 kΩ provided in the camera body 100 to the protective resistance (R_TYPE_S 126) 1 kΩ, so that the value thereof becomes approximately "0x000A". In this case, since the voltage level which is input to the TYPE_IN terminal corresponds to Error 1 shown in Table 1, the camera control unit 101 is unable to discriminate the camera accessory mounted to the camera body 100.

Moreover, for example, in a case where supplying of VBAT electric power is turned off and the signal line for VBAT electric power is floating, there is no influence of a short circuit between the TYPE terminal and the VBAT terminal, so that the camera control unit 101 is able to discriminate the type of a camera accessory as mentioned above. After that, at a point of time when, with the VBAT terminals connected to each other, VBAT electric power is supplied to the VBAT terminal, a voltage equivalent to that of VBAT electric power is applied to the TYPE terminal. In this case, since the VBAT terminal exhibits a voltage higher in level than the electric power voltage of the TYPE_IN terminal, a current of the unintended voltage level may flow into the TYPE_IN terminal via a diode (not illustrated) provided in the TYPE_IN terminal.

Moreover, a case where, in the state in which the TYPE terminal and the VBAT terminal located adjacent to each other are not short-circuited, the camera accessory mounted to the camera body 100 is detached from the camera body 100 is described. When, in the state in which the camera accessory is mounted to the camera body 100, electric power is supplied from the camera body 100 to the VBAT terminal, electric charge is accumulated in a capacitor (not illustrated) connected to the VBAT terminal line in the camera accessory. When, in this state, the camera accessory is detached from the camera body 100, the VBAT terminal in the camera accessory and the TYPE terminal in the camera body 100 come into contact with each other. At that time, a voltage exhibited by the capacitor connected to the VBAT terminal in the camera accessory is applied to the TYPE terminal in the camera body 100. In this case, since a voltage equivalent to that of VBAT electric power is also applied to the TYPE terminal in the camera body 100, a current of the unintended voltage level may flow into the TYPE_IN terminal via a diode (not illustrated) provided in the TYPE_IN terminal.

Therefore, in the camera body 100 according to the present embodiment, the protective resistor R_TYPE_S 126 (1 kΩ) is provided in series with the signal line for the TYPE terminal. With this configuration, it is possible to reduce a current of the unintended voltage level from flowing into the TYPE_IN terminal (electric power for the TYPE_IN terminal) and to prevent or reduce the occurrence of failure of each unit connected to the TYPE_IN terminal. However, if only this configuration is employed, sneaking of current into the camera power source unit 103 (3.3 V in FIG. 10), which is a pull-up destination power source for the resistor R_TYPE_C 125, may occur. Therefore, in the present embodiment, the TYPE_IN terminal of the camera control unit 101 is configured to be able to optionally switch between an input state and an output state. Then, the input and output states of the TYPE_IN terminal include an input state which is taken in the case of discriminating the type of a camera accessory and a low output state (low-level output state) which is taken in the other cases. With this configuration, in the cases other than the case of discriminating the type of a camera accessory, since the voltage level applied to the resistor R_TYPE_C 125 becomes equivalent to a low level and the impedance thereof becomes higher than the impedance of the TYPE_IN terminal, it is possible to prevent sneaking of current into the camera power source unit 103. Thus, a current value which flows in from the VBAT terminal of the camera accessory is restricted by the protective resistor R_TYPE_S 126. Additionally, the flowing-in current is sunk by the camera control unit 101 via the TYPE_IN terminal being in the low output state. With this configuration, it is possible to prevent sneaking of current into the camera power source unit 103.

Figure 23:
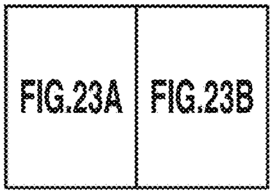
FIG. 23, which is composed of FIGS. 23A and 23B, is a block diagram illustrating, as an example, an internal configuration of the camera body, according to a modification example of the present invention.
Figure 23A:
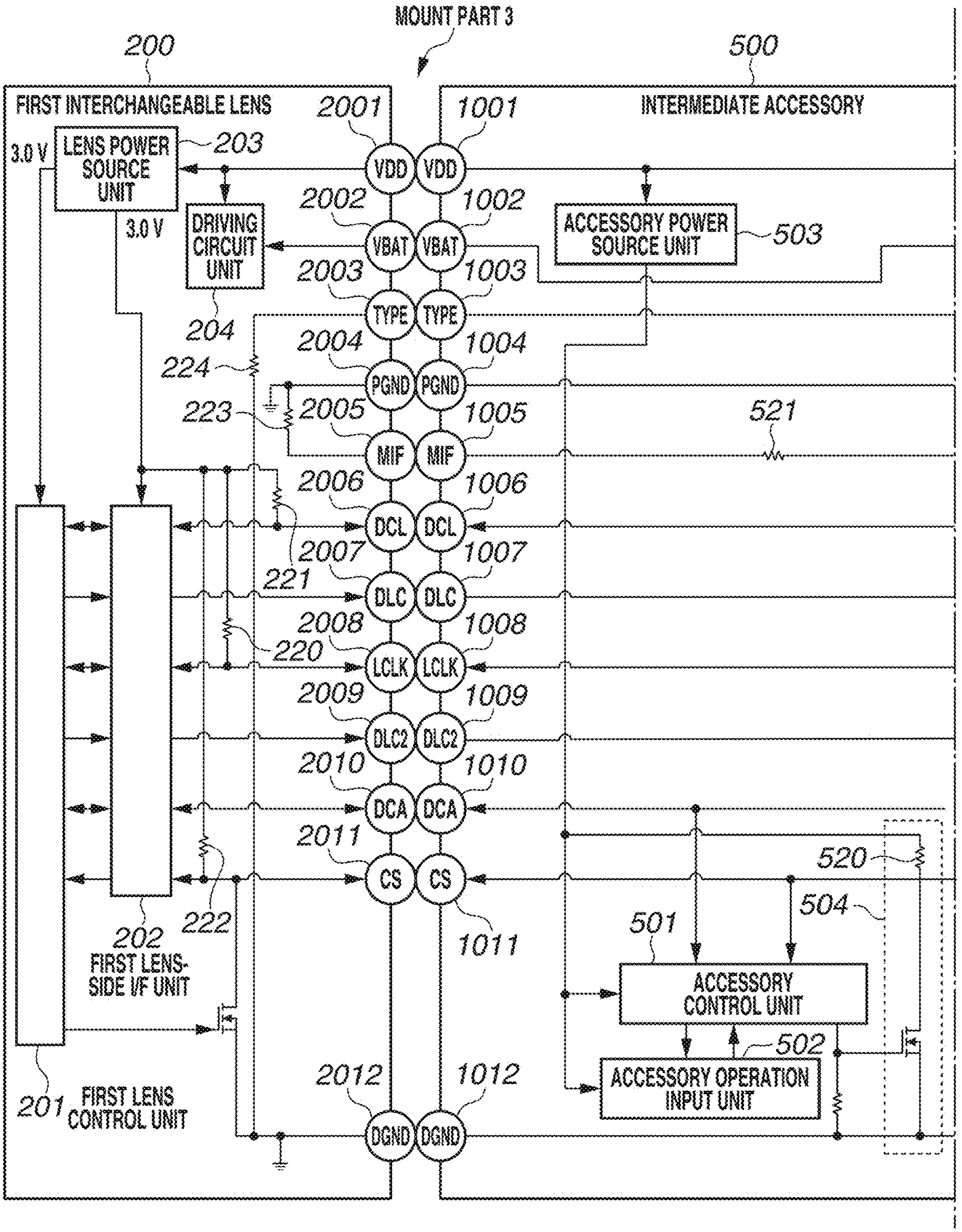
Figure 23B:
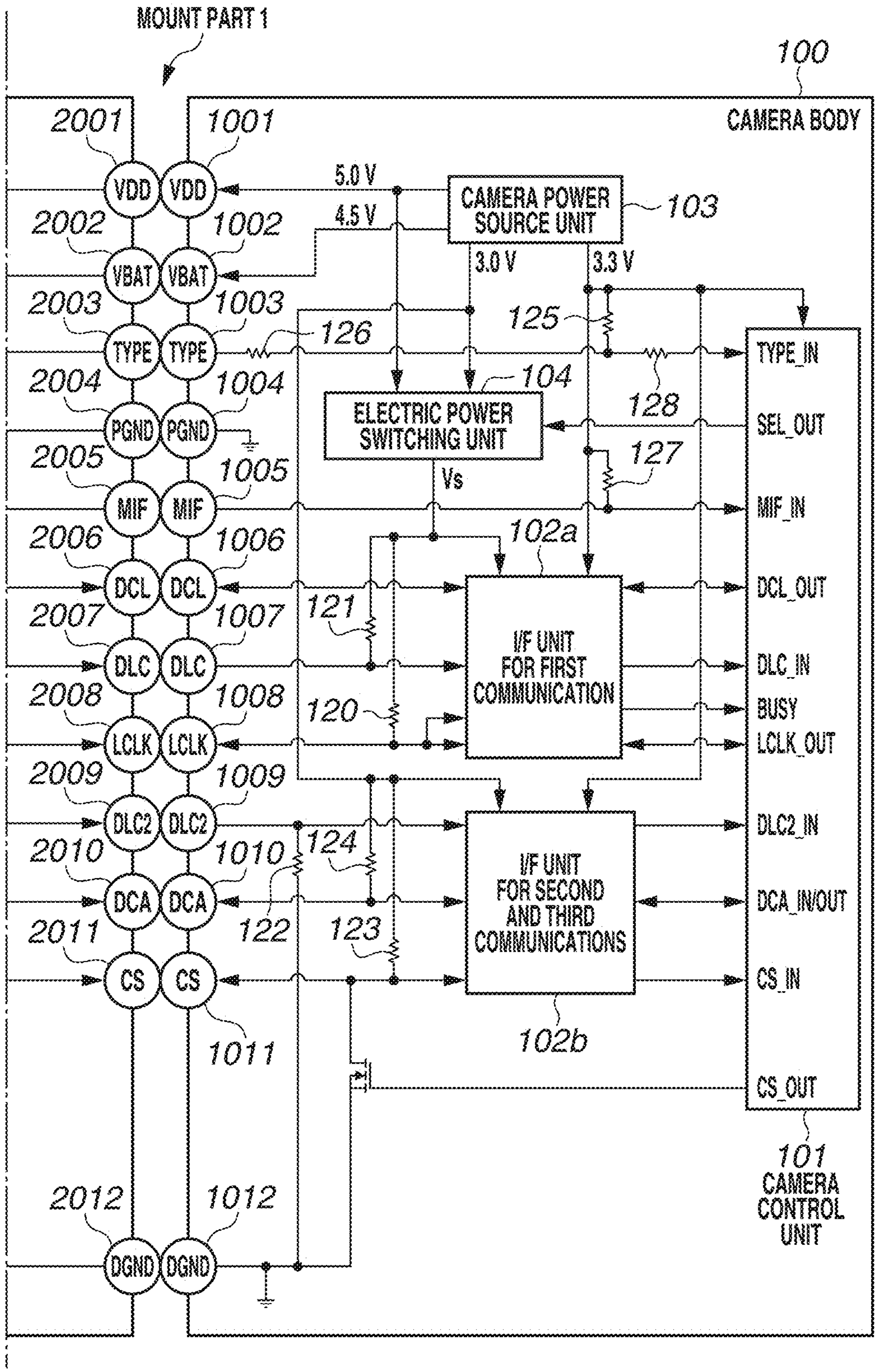

Furthermore, while, in the present embodiment, the resistance value of the protective resistor R_TYPE_S 126 is set to 1 kΩ in conformity with the current value which is able to be input to the TYPE_IN terminal of the camera control unit 101 and the voltage level used for discriminating the type of a camera accessory, the present embodiment is not limited to this. In other words, the resistance value of the protective resistor R_TYPE_S 126 only needs to be set to an optional value in conformity with the current value which is able to be input to the TYPE_IN terminal of the camera control unit 101 and the voltage level used for discriminating the type of a camera accessory. Moreover, in a case where the current value which is able to be input to the TYPE_IN terminal of the camera control unit 101 or the voltage level used for discriminating the type of a camera accessory is different from that employed in the above-described embodiment, a configuration in which, without changing the resistance value of the protective resistor R_TYPE_S 126, an additional resistor is provided can be employed. This configuration is specifically described as follows. FIG. 23, which is composed of FIGS. 23A and 23B, is a block diagram illustrating, as an example, an internal configuration of the camera body 100 according to a modification example of the present invention. In comparison with FIG. 10, a resistor 128 is additionally provided in FIG. 23. The resistance value of the resistor 128 is set to such a value that the upper limit of the current value which is able to be input to the TYPE_IN terminal is not exceeded, the voltage applied to the connection line for the resistor R_TYPE_C 125 is lower than the pull-up destination power source voltage, and the voltage of the TYPE_IN terminal is within a range available for appropriately discriminating the type of a camera accessory. Then, the resistance value of the resistor 128 is determined, in such a way as to satisfy the above-mentioned conditions, in conformity with the resistance values of the resistor R_TYPE_C 125 and the protective resistor R_TYPE_S 126.

Furthermore, while, as mentioned above, to discriminate the type of a camera accessory, it is necessary to change the TYPE_IN terminal to the input state, such a change only needs to be performed during a period in which VBAT electric power (4.5 V) which is output from the camera power source unit 103 is turned off. For example, in the case of mounting a camera accessory to the camera body 100, the TYPE_IN terminal only needs to be changed from the low output state to the input state during a period after the completion of mounting of the camera accessory is detected via the MIF_IN terminal and before VBAT electric power is supplied to the camera accessory.

Moreover, suppose, for example, a case where attachment and detachment of the camera accessory to and from the camera body 100 have been quickly repeated. In this case, if the time elapsing after VBAT electric power for the camera body 100 is tuned off is short, electric charge accumulated in a capacitor in the VBAT terminal line for the camera accessory may not have completely decreased. Therefore, when attachment and detachment of the camera accessory to and from the camera body 100 are repeated within a short time, the TYPE_IN terminal may be switched to the input state and the impedance of the TYPE_IN terminal may become high. Then, in this case, sneaking of current into the camera power source unit 103 via the resistor R_TYPE_C 125 may occur. Therefore, in the present embodiment, a configuration in which, in a case where VBAT electric power has been switched from turning-on to turning-off, discriminating the type of a camera accessory is not performed before a predetermined time elapses is employed. Furthermore, the predetermined time is at least a time longer than or equal to a time required for the voltage exhibited by the VBAT terminal line to become smaller than the voltage (3.3 V) of the pull-up destination power source for the resistor R_TYPE_C 125.

In a case where the camera accessory has been mounted to the camera body 100, the camera control unit 101 determines whether the predetermined time has elapsed, in response to detecting that the voltage level of the MIF_IN terminal has changed to the low output state. Then, in response to the predetermined time having elapsed, the camera control unit 101 changes the TYPE_IN terminal to the input state and then discriminates the type of the camera accessory. Then, after discriminating the type of the camera accessory, the camera control unit 101 returns the TYPE_IN terminal to the low output state and turns on VBAT electric power. Furthermore, in a case where, next, the camera accessory has been detached from the camera body 100, the camera control unit 101 turns off VBAT electric power in response to detecting that the MIF_IN terminal has become at high level.

Furthermore, while, in the above description, a configuration in which such a condition that the voltage exhibited by the VBAT terminal line becomes lower than the voltage of the pull-up destination power source is indirectly determined by detecting that a predetermined time has elapsed after the MIF_IN terminal has changed to the low output state is employed, the present embodiment is not limited to this. For example, a configuration in which directly detecting the voltage of the VBAT terminal line is used to determine that the detected voltage of the VBAT terminal line becomes lower than the voltage of the pull-up destination power source for the resistor R_TYPE_C 125 can be employed.

Moreover, a configuration in which, at a point of time when VBAT electric power has been supplied to the VBAT terminal, the camera control unit 101 detects the voltage level input to the TYPE_IN terminal again and re-determines the type of a camera accessory can be employed. In this case, in the state such as that illustrated in FIG. 11D, since a voltage corresponding to the electric power voltage for the VBAT terminal is applied to the TYPE terminal, the voltage level input to the TYPE_IN terminal becomes approximately "0x03FF". In this case, the camera control unit 101 is unable to discriminate a camera accessory mounted to the camera body 100, but is able to prevent a current of the unintended voltage level from flowing into the TYPE_IN terminal.

On the other hand, in a case where, before discriminating the type of a camera accessory is performed, supplying of electric power to the VBAT terminal is performed, the voltage level which is input to the TYPE_IN terminal in the state in which the electric power voltage exhibited by the VBAT terminal is applied to the TYPE terminal is AD-converted. In this case, the voltage level (obtained after AD conversion) which is input to the TYPE_IN terminal becomes approximately "0x03FF". In this case, since the voltage level which is input to the TYPE_IN terminal corresponds to Error 1 shown in Table 1, the camera control unit 101 is unable to discriminate the camera accessory mounted to the camera body 100.

Next, as illustrated in FIG. 11E, in a case where the TYPE terminal is shorn circuited with a terminal adjacent thereto due to, for example, a conductive foreign substance adhering between the TYPE terminal and the PGND terminal adjacent thereto, a signal line for the PGND terminal would be connected to the TYPE terminal. In this case, since the PGND terminal is a ground terminal, the voltage which is input to the TYPE_IN terminal is determined based on the proportion (voltage dividing ratio) of the pull-up resistance 100 kΩ provided in the camera body 100 to the protective resistance 1 kΩ, so that the value thereof becomes approximately "0x000A". In this case, the camera control unit 101 is also unable to discriminate a camera accessory mounted to the camera body 100.

As described above, in a case where the TYPE terminal is short-circuited with a terminal adjacent thereto, the voltage which is input to the TYPE_IN terminal becomes a value close to the voltage level exhibited by the PGND terminal or a value close to the level of electric power voltage exhibited by the VBAT terminal. In such a case, the camera control unit 101 is unable to discriminate which type of camera accessory has been mounted to the camera body 100, and is, therefore, unable to perform or issue an instruction to perform operations appropriate for each type of camera accessory.

Therefore, in the camera body 100 according to the present embodiment, in a case where a value close to the voltage level exhibited by the PGND terminal is input to the TYPE_IN terminal of the camera control unit 101, the camera control unit 101 performs control not to perform communication with the camera accessory. In the present embodiment, in a case where the voltage level which is input to the TYPE_IN terminal is included in the range of "0x0000-0x007F", the camera control unit 101 determines that an error state in which there is an abnormality of the connection state of the TYPE terminal occurs, and thus does not perform communication with the camera accessory.

Moreover, in a case where the value of the electric power voltage level exhibited by the VBAT terminal has been input to the TYPE_IN terminal, the camera control unit 101 performs control not to perform communication with the camera accessory. In the present embodiment, in a case where the voltage level which is input to the TYPE_IN terminal is included in the range of "0x0380-0x03FF", the camera control unit 101 determines that an error state in which there is an abnormality of the connection state of the TYPE terminal occurs, and thus does not perform communication with the camera accessory.

This configuration enables the camera body 100 according to the present embodiment to prevent a voltage level exceeding the rated voltage from being applied to a camera accessory in the state in which the type of the camera accessory mounted to the camera body 100 is erroneously discriminated.

<Operation Performed when Camera Accessory is Mounted to Camera Body 100>

Figure 12:
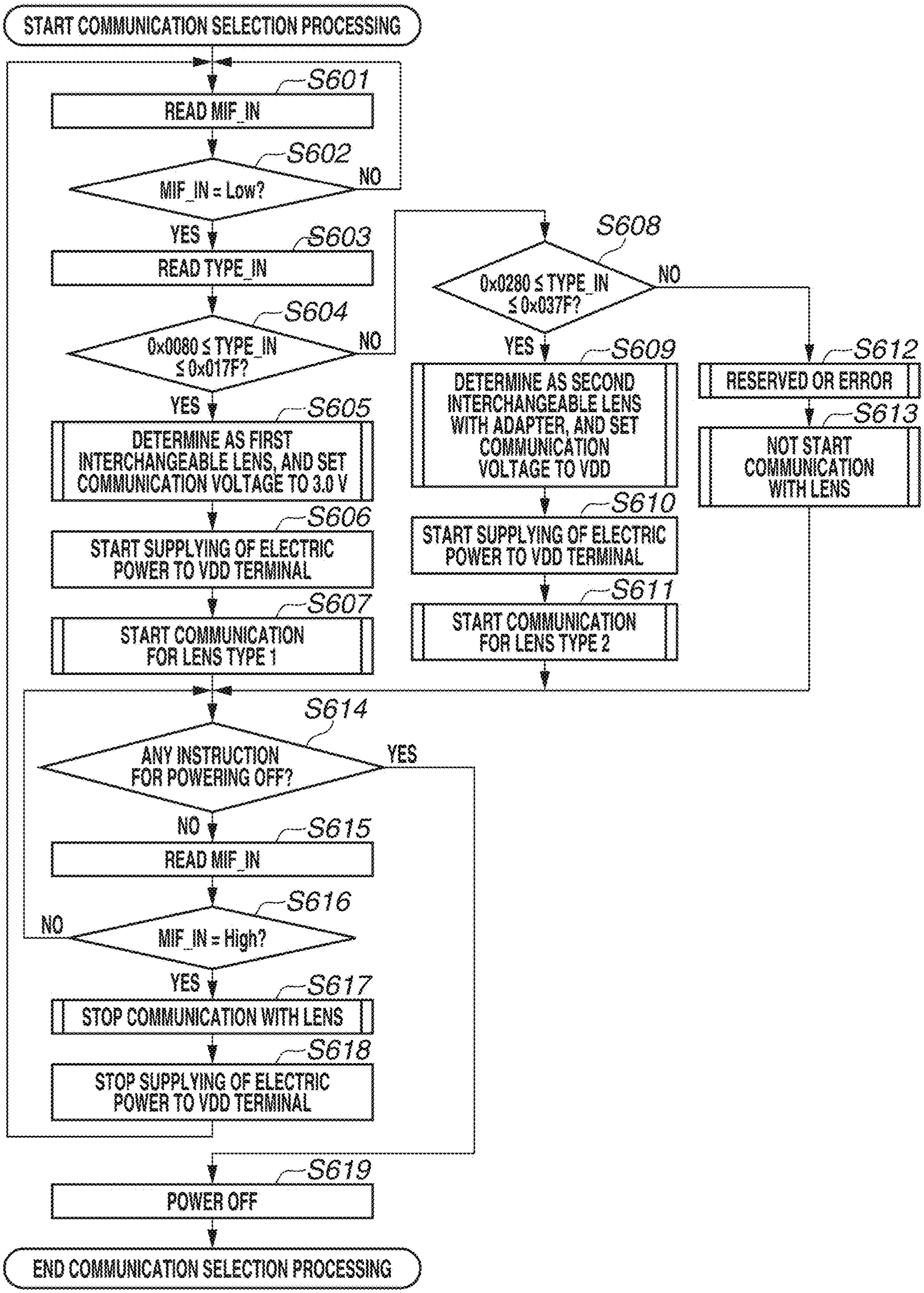
FIG. 12 is a flowchart illustrating, as an example, an operation which is performed until a first communication is started, when any one of the camera accessories is mounted to the camera body.

Next, communication selection processing, which represents processing performed until the above-mentioned first communication is started, is described as an operation performed when a camera accessory is mounted to the camera body 100, with reference to FIG. 12. FIG. 12 is a flowchart illustrating, as an example, an operation which is performed until the first communication is started, when any one of camera accessories is mounted to the camera body 100. Furthermore, in the present embodiment, a configuration in which a program corresponding to the flowchart illustrated in FIG. 12 is previously stored in a memory (not illustrated) provided in the camera control unit 101 and the camera control unit 101 executes the program read out from the memory is employed. Accordingly, an operation in each step subsequently described is assumed to be performed by the camera control unit 101. Furthermore, instead of an operation corresponding to a predetermined program being performed, a configuration in which various units constituting the camera body 100 and the camera accessory perform or issue instructions to perform operations corresponding to the respective steps can also be employed. Furthermore, the camera control unit 101 in the present embodiment functions as a detection unit configured to detect the voltage level exhibited by each terminal and a control unit configured to control communication performed via each communication terminal.

First, communication selection processing is started in response to an instruction being issued to power on the camera body 100 by an operation performed on, for example, a power switch (not illustrated) provided on the camera body 100. Then, in step S601, the camera control unit 101 reads the voltage level of the MIF_IN terminal, and stores information about the state of the MIF_IN terminal that is based on the read voltage level in a random access memory (RAM) region (not illustrated) in the above-mentioned memory.

Next, in step S602, when determining that the MIF_IN terminal exhibits high level based on the information about the state of the MIF_IN terminal stored in the RAM region (NO in step S602), the camera control unit 101 determines that no camera accessory is mounted to the camera body 100 and then returns the processing to step S601. Moreover, when determining that the MIF_IN terminal exhibits low level (YES in step S602), the camera control unit 101 determines that a camera accessory is mounted to the camera body 100.

Next, in step S603, the camera control unit 101 reads, after performing AD conversion, the voltage level which is input to the TYPE_IN terminal, and stores, in the above-mentioned RAM region, information about the state of the TYPE_IN terminal that is based on the read voltage level.

Next, in step S604, the camera control unit 101 determines whether the voltage level which is input to the TYPE_IN terminal, as the state of the TYPE_IN terminal read out from the RAM region, is greater than or equal to "0x0080" and less than or equal to "0x017F". Then, if it is determined that the voltage level which is input to the TYPE_IN terminal is greater than or equal to "0x0080" and less than or equal to "0x017F" (YES in step S604), the camera control unit 101 advances the processing to step S605, and if the above-mentioned condition is not satisfied (NO in step S604), the camera control unit 101 advances the processing to step S608.

Next, in step S605, the camera control unit 101 determines that the camera accessory mounted to the camera body 100 is the first interchangeable lens 200 (lens type 1) and controls the electric power switching unit 104 to set the electric power Vs for communication interface to 3.0 V.

Next, in step S606, the camera control unit 101 starts supplying of electric power from the camera power source unit 103 to the VDU terminal.

Next, in step S607, the camera control unit 101 sets a communication voltage of 3.0 V and starts the first communication using the terminals associated with the first communication unit, and then advances the processing to step S614.

In step S608, the camera control unit 101 determines whether the voltage level which is input to the TYPE_IN terminal, as the state of the TYPE_IN terminal read out from the RAM region, is greater than or equal to "0x0280" and less than or equal to "0x037F". Then, if it is determined that the voltage level which is input to the TYPE_IN terminal is greater than or equal to "0x0280" and less than or equal to "0x037F" (YES in step S608), the camera control unit 101 advances the processing to step S609, and if the above-mentioned condition is not satisfied (NO in step S608), the camera control unit 101 advances the processing to step S612.

Next, in step S609, the camera control unit 101 determines that the camera accessory mounted to the camera body 100 is the second interchangeable lens 300 (lens type 2) mounted via the conversion adapter 400 and controls the electric power switching unit 104 to set the electric power Vs to the VDD (5.0 V).

Next, in step S610, the camera control unit 101 starts supplying of electric power from the camera power source unit 103 to the VDD terminal.

Next, in step S611, the camera control unit 101 sets a communication voltage of 5.0 V and starts the first communication using the terminals associated with the first communication unit, and then advances the processing to step S614.

Next, in step S612, the camera control unit 101 determines that the camera accessory mounted to the camera body 100 is a camera accessory which is not compatible with the camera body 100 (Reserved) or that a predetermined terminal exhibits an abnormality (Error).

Then, in step S613, the camera control unit 101 does not start communication with the camera accessory and controls various units of the camera body 100 to perform processing for providing warning display about, for example, error on the display unit 15, and then advances the processing to step S614.

In step S614, the camera control unit 101 determines whether an instruction to power off the camera body 100 has been issued by an operation performed on, for example, a power switch (not illustrated). If, in step S614, it is determined that an instruction to power off the camera body 100 has been issued (YES in step S614), the camera control unit 101 advances the processing to step S619, in which the camera control unit 101 powers off the camera body 100 and then ends the communication selection processing. Moreover, if, in step S614, it is determined that no instruction to power off the camera body 100 has been issued (NO in step S614), the camera control unit 101 advances the processing to step S615.

Next, in step S615, the camera control unit 101 reads the voltage level of the MIF_IN terminal again, and stores, in the above-mentioned. RAM region, information about the state of the MIF_IN terminal that is based on the read voltage level. Furthermore, in processing in step S615, the camera control unit 101 can be configured to update (overwrite) the information about the state of the MIF_IN terminal read in the above-mentioned processing in step S601, or can be configured to separately store the read information in another storage region.

Next, in step S016, the camera control unit 101 determines whether the MIF_IN terminal exhibits high level, based on the information about the state of the MIF_IN terminal stored in the RAM region. If in step S616, it is determined that the MIF_IN terminal exhibits high level (YES in step S616), the camera control unit 101 determines that the camera accessory has been demounted from the camera body 100 and then advances the processing to step S617. If, in step S616, it is determined that the MIF_IN terminal does not exhibit high level (i.e., exhibits low level) (NO in step S616), the camera control unit 101 determines that the camera accessory remains mounted to the camera body 100 and then returns the processing to step S614.

In step S617, the camera control unit 101 stops communication with the camera accessory. Then, in step S618, the camera control unit 101 stops supplying of electric power from the camera power source unit 103 to the VDD terminal, and then s the processing to step S601. In the subsequent operations, the camera control unit 101 repeatedly performs the above-mentioned processing operations.

Furthermore, although not illustrated in FIG. 12, the camera control unit 101 determines the presence or absence of supplying of driving electric power (VBAT) using the VBAT terminals from the camera body 100 to the camera accessory at predetermined timing, and performs supplying of the VBAT based on a result of the determination.

Here, VBAT electric power which is supplied to an interchangeable lens is described. As mentioned above, for example, the first interchangeable lens 200 the first interchangeable lens 200 to be mounted via the intermediate accessory 500, or the second interchangeable lens 300 to be mounted via the conversion adapter 400 is able to be mounted to the camera body 100. Here, in a case where the first interchangeable lens 200 is mounted to the camera body 100, the first lens control unit 201 is able to determine and control an electric power distribution for driving members incorporated in the first interchangeable lens 200 within a predetermined fixed electric power value. Specifically, the first lens control unit 201 determines an electric power distribution for at least one actuator provided for driving, for example, lens groups, such as a zoom lens, a shift lens, and a focus lens, and a diaphragm (each not illustrated) included in the image capturing lens 10, and controls driving thereof. In this case, the camera control unit 101 of the camera body 100 performs communication with the first lens control unit 201 before the actuator of the first interchangeable lens 200 is driven, and communicates, to the first lens control unit 201, electric power information about electric power that is to be supplied to the first interchangeable lens 200. The above-mentioned operation performed between the camera body 100 and the camera accessory is referred to as "mode 2". On the other hand, in a case where the second interchangeable lens 300 is mounted to the camera body 100, the second lens control unit 301 controls driving of, for example, various lens groups and a diaphragm based on instructions communicated from the camera control unit 101. Thus, unlike the mode 2, not the interchangeable lens but the camera body 100 (i.e., the camera control unit 101) determines an electric power distribution for driving, for example, an actuator included in the interchangeable lens. Such an operation performed between the camera body 100 and the camera accessory is referred to as "mode 1".

Here, the above-mentioned electric power information is information about electric power supplying of which to the camera accessory via the VBAT terminals is ensured even when the camera body 100 is performing another operation (for example, driving of, for example, a member (shutter) incorporated therein). Then, the electric power information can be information about a specific electric power value [W], or can be information specifying one electric power value out of a predetermined plurality of electric power values (hereinafter referred to as "electric power mode". FIG. 24 is a diagram illustrating, as an example, electric power modes which are able to be used to perform drive control of the first interchangeable lens 200 with use of the mode 2, according to the present embodiment. As illustrated in FIG. 24, the camera control unit 101 selects, from among four electric power modes, one electric power mode based on information obtained by communication performed with the first interchangeable lens 200, and communicates the selected electric power mode to the first lens control unit 201. Then, the first lens control unit 201 drives and controls the actuator in such a manner that electric power to be supplied to the first interchangeable lens 200 falls within the upper limit value of electric power indicated by the communicated electric power mode, which is ensured as being able to be supplied.

Figure 25:
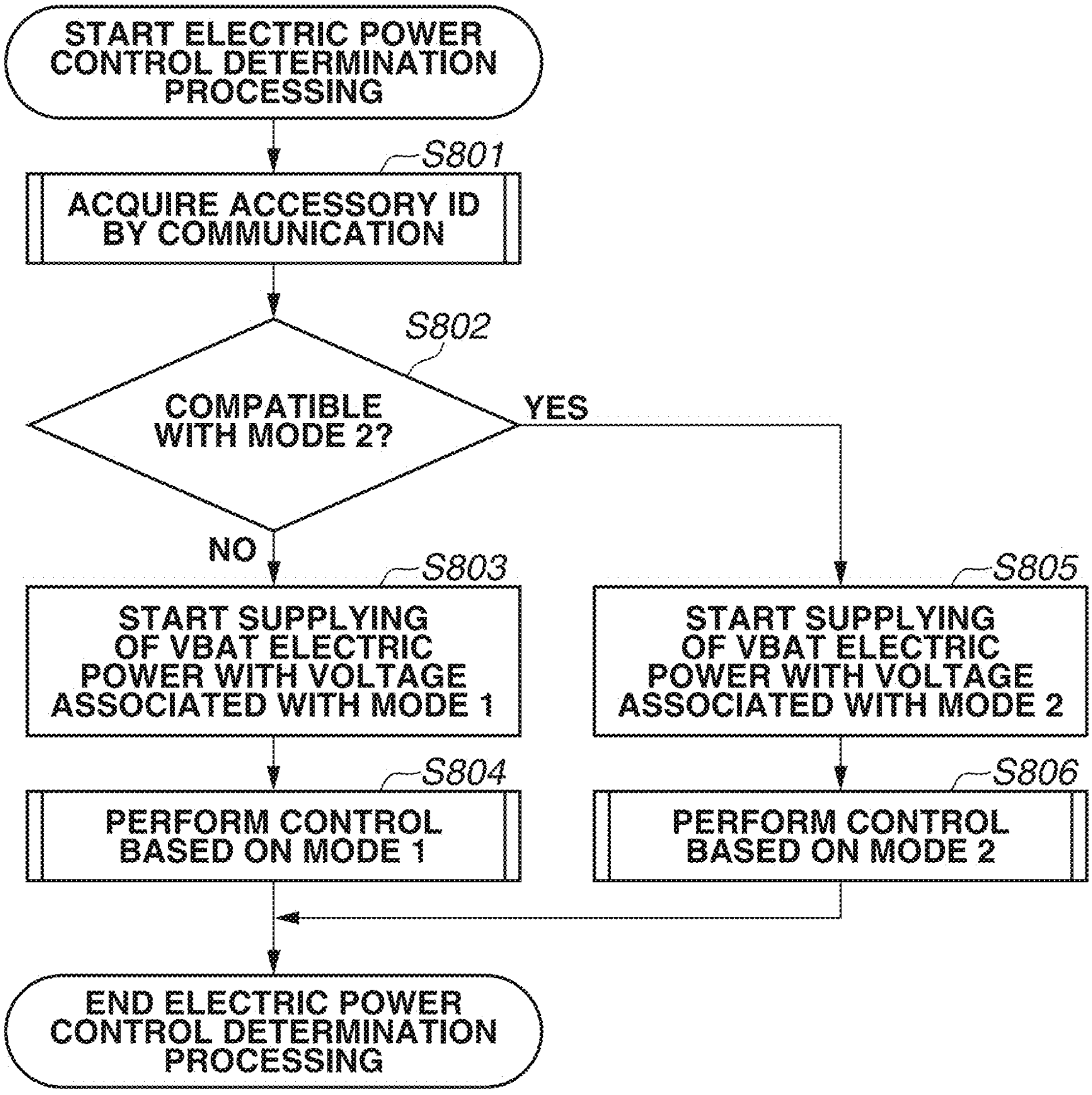
FIG. 25 is a flowchart illustrating, as an example, electric power control determination processing for driving electric power between the camera body and the camera accessory, according to the present embodiment.

FIG. 25 is a flowchart illustrating, as an example, electric power control determination processing for driving electric power between the camera body 100 and the camera accessory, according to the present embodiment. Furthermore, processing in steps S801 to S806 illustrated in FIG. 25 is processing performed between any one of steps S607, S611, and S613 and step S614 illustrated in FIG. 12 described above. In step S801, the camera control unit 101 performs communication with the camera accessory mounted thereto, and acquires attribute information about the camera accessory, which is what is called an accessory identifier (ID). The accessory ID contains information for discriminating whether a control method for an internal member such as an actuator provided in the camera accessory is compatible with the above-mentioned mode 2. Furthermore, the accessory ID contains, in addition to the above-mentioned information, for example, a serial number for identifying an individual camera accessory and optical correction information about an optical member included in the camera accessory. Moreover, in the electric power control determination processing, the information to be acquired in step S801 only needs to be information at least indicating whether the camera accessory is compatible with control that is performed based on the mode 2.

Next, in step S802, the camera control unit 101 determines, based on the accessory ID acquired in step S801, whether the camera accessory mounted to the camera body 100 is compatible with control that is performed based on the mode 2. In other words, in step S802, the camera control unit 101 determines with which of the mode 1 and the mode 2 the camera accessory mounted to the camera body 100 is compatible.

If it is determined that the camera accessory is not compatible with control that is performed based on the mode 2 (NO in step S802), then in step S803, the camera control unit 101 sets the voltage of VBAT electric power, which is to be supplied to the VBAT terminal, to an optional voltage suited for control that is performed based on the mode 1, and starts supplying of the VBAT electric power. Then, in step S804, the camera control unit 101 starts drive control of the camera accessory based on the mode 1.

If it is determined that the camera accessory is compatible with control that is performed based on the mode 2 (YES in step S802), then in step S805, the camera control unit 101 sets the voltage of VBAT electric power, which is to be supplied to the VBAT terminal, to an optional voltage suited for control that is performed based on the mode 2, and starts supplying of the VBAT electric power. Then, in step S806, the camera control unit 101 starts drive control of the camera accessory based on the mode 2. With this configuration, for example, in a case where the first interchangeable lens 200 is mounted to the camera body 100, the first lens control unit 201 is able to freely perform drive control of an actuator included in the first interchangeable lens 200 in an unwasteful and efficient manner based on the electric power information supplied from the camera body 100. Moreover, with this configuration, since the camera body 100 does not need to perform drive control of the actuator included in the first interchangeable lens 200 each time the actuator included in the first interchangeable lens 200 is to be driven, it is possible to reduce processing load on the camera body 100.

<Details of First, Second, and Third Communications>

Next, various communications which are performed between the camera body 100 and the camera accessory mounted to the camera body 100 are described. First, the first communication is described. As mentioned above, the first communication is one of communication systems which are performed between the camera body 100 and the camera accessory mounted to the camera body 100. Then, the first communication is a clock synchronization type or start-stop synchronous type communication system which is performed with use of the LCLK terminal, the DCL terminal, and the DLC terminal associated with the first communication unit.

In the present embodiment, both the first interchangeable lens 200 and the second interchangeable lens 300 are compatible with the first communication. However, as mentioned above, the communication voltage associated with the first communication differs between the first interchangeable lens 200 and the second interchangeable lens 300.

For example, the first communication is used for transmission of driving instructions to the camera accessory, such as instructions for driving of a focus lens, driving of a zoom lens, and driving of a diaphragm. In the camera accessory having received such driving instructions, operations corresponding to the driving instructions are performed. Moreover, the first communication is used for the camera accessory to transmit, to the camera body 100, information about the state of the camera accessory itself (state information), such as the position of a focus lens, the focal length, and the aperture diameter of a diaphragm (aperture value), which is to be communicated to the camera body 100.

Next, the second communication is described. As mentioned above, the second communication is one of communication systems which are performed between the camera body 100 and the first interchangeable lens 200, and is an asynchronous type communication system which is performed with use of the DLC2 terminal associated with the second communication unit. Furthermore, since the second interchangeable lens 300 does not include any terminal associated with the second communication unit, such as the DLC2 terminal, the second communication is not performed between the camera body 100 and the second interchangeable lens 300.

In the second communication, the first interchangeable lens 200 serves as a communication master unit (master) and transmits, to the camera body 100, a predetermined amount of optical data including, for example, the position of a focus lens, the position of a zoom lens, an aperture value, and the state of an image stabilization lens in the first interchangeable lens 200. Then, in the second communication, the camera body 100 serves as a communication slave unit (slave). Furthermore, instructions for the types and sequence of pieces of data to be transmitted from the first interchangeable lens 200 to the camera body 100 are transmitted from the camera body 100 to the first interchangeable lens 200 by the above-mentioned first communication.

Figure 13:
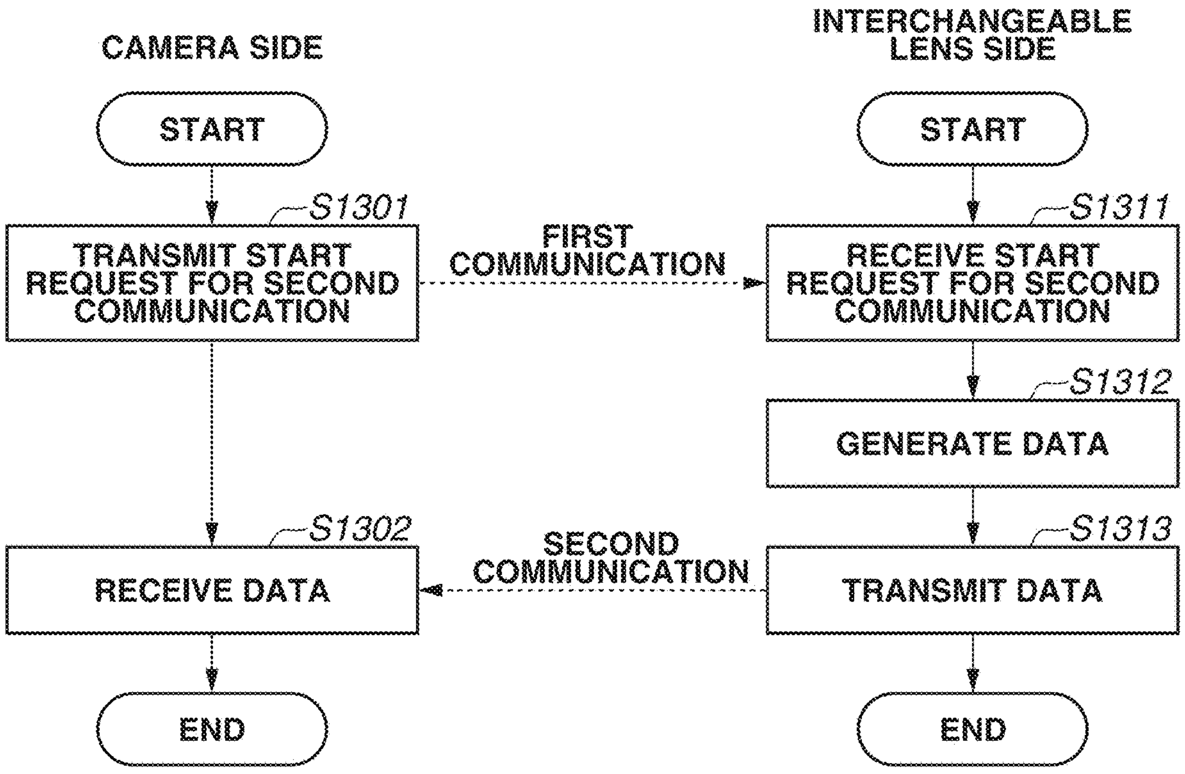
FIG. 13 is a flowchart illustrating, as an example, operations concerning a second communication, according to the present embodiment.

Here, operations performed by the camera side and the accessory side when the second communication is performed are described with reference to FIG. 13. FIG. 13 is a flowchart illustrating, as an example, operations concerning the second communication, according to the present embodiment. Furthermore, in the present embodiment, a configuration in which a program corresponding to the flowchart illustrated in FIG. 13 is previously stored in a memory (not illustrated) and the camera control unit 101 and the first lens control unit 201 execute the program read out from the memory is employed. Accordingly, an operation in each step subsequently described is assumed to be performed by the camera control unit 101 or the first lens control unit 201. Furthermore, instead of an operation corresponding to a predetermined program being performed, a configuration in which various units constituting the camera body 100 and the first interchangeable lens 200 perform or issue instructions to perform operations corresponding to the respective steps can also be employed.

The second communication illustrated in FIG. 13 is started at timing when image capturing control of a subject performed in the camera body 100 is started. First, in step S1301, in the camera body 100, the camera control unit 101 transmits a start request for the second communication to the first interchangeable lens 200 with use of the first communication. Furthermore, the start request, which is transmitted in step S1301, includes a registration communication command in which the types of pieces of data intended to be acquired from the first interchangeable lens 200 by the second communication and the sequence of receiving these pieces of data are previously set.

Next, in step S1311, in the first interchangeable lens 200, the first lens control unit 201 receives the start request for the second communication transmitted from the camera body 100, and then advances the processing to step S1312. Then, in step S1312, in the first interchangeable lens 200, the first lens control unit 201 generates various pieces of data that are based on the registration communication command included in the start request, in the specified sequence.

Next, in step S1313, in the first interchangeable lens 200, the first lens control unit 201 transmits the generated various pieces of data to the camera body 100 with use of the second communication. Thus, in step S1313, various pieces of data generated in the first interchangeable lens 200 are transmitted to the camera body 100 with use of the DLC2 terminal 2009 of the first interchangeable lens 200 and the DLC2 terminal 1009 of the camera body 100.

Next, in step S1302, in the camera body 100, the camera control unit 101 sequentially receives various pieces of data transmitted from the first interchangeable lens 200 with use of the second communication, and then ends the second communication in response to reception of the specified various pieces of data being completed. Furthermore, in the present embodiment, the camera control unit 101 and the first lens control unit 201 repeatedly perform the flow illustrated in FIG. 13 each time image capturing control of a subject is started.

In the above-described way, while, in the case of performing the second communication, the start request is transmitted with use of the first communication, a communication of the communication system different from and independent from the first communication is able to be performed with use of terminals associated with the second communication unit different from the terminals associated with the first communication unit. With this configuration, between the camera body 100 and the first interchangeable lens 200, the camera control unit 101 and the first lens control unit 201 are able to perform communication of various pieces of data (for example, optical data) as the second communication without hindering communication performed in the first communication (for example, a control request for the actuator). Furthermore, since, as mentioned above, the start request for the second communication is transmitted from the camera body 100 to the first interchangeable lens 200 with use of the first communication, the first communication being established is a necessary condition for performing the second communication.

Next, the third communication is described. As mentioned above, the third communication is one of communication systems which are performed between the camera body 100 and the first interchangeable lens 200, the conversion adapter 400, and the intermediate accessory 500. Furthermore, the third communication is an asynchronous type communication system which is performed with use of the DCA terminal and the CS terminal associated with the third communication unit. Moreover, since, as mentioned above, the second interchangeable lens 300 does not include any terminal associated with the third communication unit, the third communication is not performed between the camera body 100 and the second interchangeable lens 300.

In the third communication, the camera body 100 serves as a communication master unit (master), and each of the first interchangeable lens 200, the conversion adapter 400, and the intermediate accessory 500 mounted directly or indirectly to the camera body 100 serves as a communication slave unit (slave).

Furthermore, while, in the above-described example, as illustrated in FIG. 6 or FIG. 9, a case where one conversion adapter 400 or one intermediate accessory 500 is provided between the camera body 100 and a predetermined interchangeable lens has been described, the present embodiment is not limited to this. For example, a configuration in which a total of two or more conversion adapters 400 and intermediate accessories 500 are provided between the camera body 100 and a predetermined interchangeable lens can be employed. Accordingly, in the third communication, a plurality of slaves may be connected in series to one master for communication Therefore, the third communication allows switching between a broadcast communication mode, which concurrently transmits signals from the camera body 100 to a plurality of camera accessories (slaves), and a peer-to-peer (P2P) mode, which specifies a particular camera accessory and performs communication with the particular camera accessory.

Figure 14:
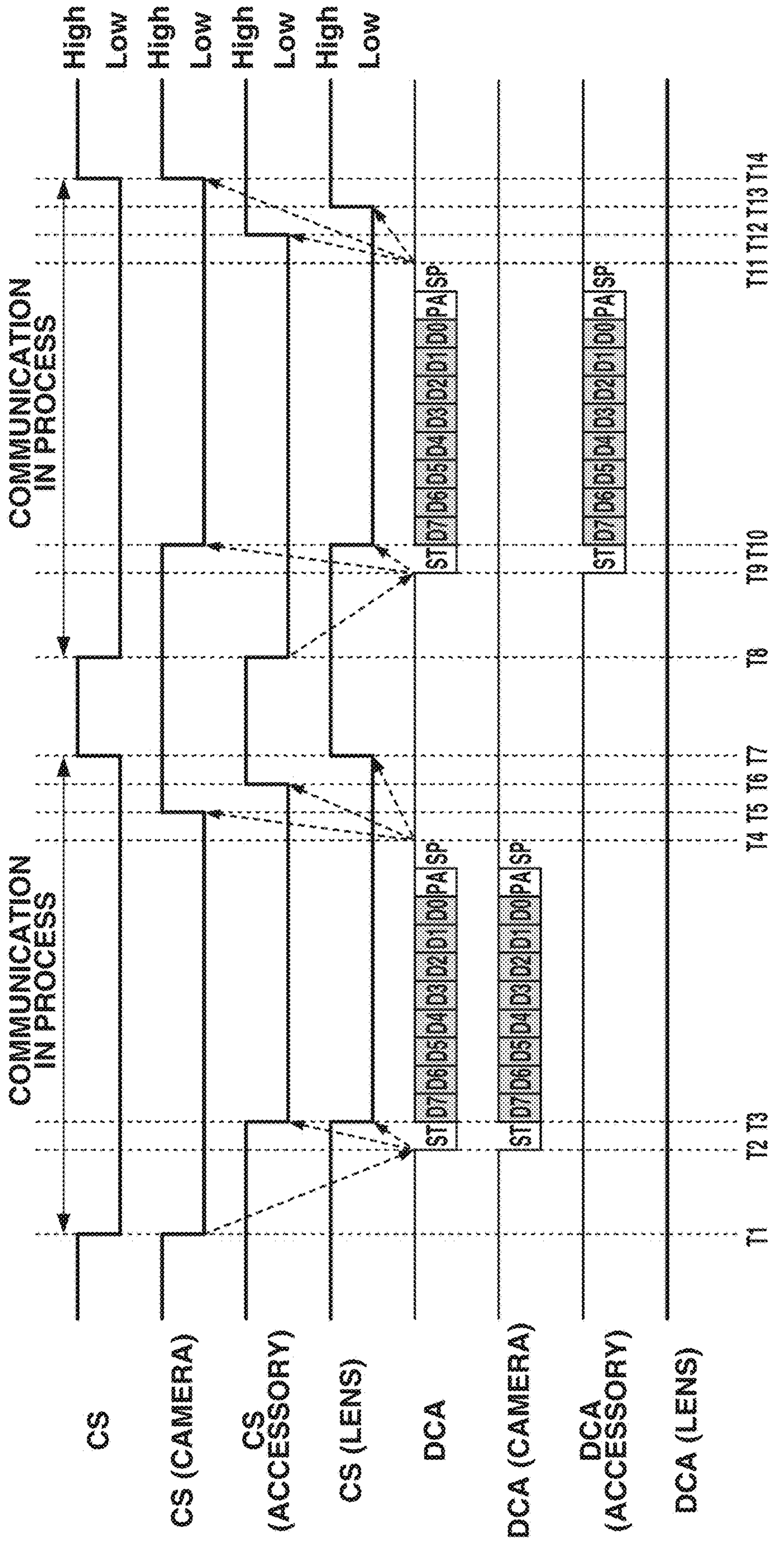
FIG. 14 is a timing chart illustrating, as an example, broadcast communication in a third communication, according to the present embodiment.

With regard to the broadcast communication mode and the P2P mode in the third communication, the DCA terminal functions as a terminal for communication data which is able to be used for two-way communication. On the other hand, the CS terminal differs in function thereof between the broadcast communication mode and the P2P mode. With regard to details thereof, first, the broadcast communication is described with reference to FIG. 14. FIG. 14 is a timing chart illustrating, as an example, the broadcast communication in the third communication, according to the present embodiment. Furthermore, FIG. 14 illustrates operation timing in a case where the first interchangeable lens 200 is mounted to the camera body 100 via the intermediate accessory 500.

Furthermore, in FIG. 14, with regard to the broadcast communication in the third communication, communication signals transmitted via the CS terminal are represented as "CS (camera)", "CS (lens)", and "CS (accessory)". Moreover, communication signals transmitted via the DCA terminal are represented as "DCA (camera)", "DCA (lens)", and "DCA (accessory)". Moreover, "CS" and "DCA" in FIG. 14 represent signal waveforms which the CS terminal and the DCA terminal of each of the camera body 100, the intermediate accessory 500, and the first interchangeable lens 200 exhibit at predetermined communication control timing. In the subsequent description, a case where, in response to broadcast communication being performed from the camera control unit 101 to the first lens control unit 201 and the accessory control unit 501, broadcast communication is performed from the accessory control unit 501 to the camera control unit 101 and the first lens control unit 201 is described.

In the following description, a signal line connected to the CS terminal is referred to as a "signal line CS", and a signal line connected to the DCA terminal is referred to as a "signal line DCA". At timing T1 illustrated in FIG. 14, a low output is started from the camera control unit 101 to the signal line CS. This operation is an operation to communicate starting of broadcast communication from the camera control unit 101, serving as a communication master, to the first lens control unit 201 and the accessory control unit 501, serving as communication slaves.

Next, at timing T2 illustrated in FIG. 14, the camera control unit 101 outputs data targeted for transmission to the signal line DCA. Then, at timing T3 illustrated in FIG. 14, the first lens control unit 201 and the accessory control unit 501 detect a start bit ST input to the signal line DCA, and start a low output to the signal line CS. Furthermore, since, at timing T1, a low output to the signal line CS has already been performed by the camera control unit 101, the signal level of the signal line CS in the camera body 100 does not change at timing T3.

Next, after, at timing T4 illustrated in FIG. 14, outputting of a stop bit SP, which is the last of data to be transmitted, is completed, at timing T5 illustrated in FIG. 14, the camera control unit 101 cancels a low output to the signal line CS. On the other hand, upon receiving data up to the stop bit SP, the first lens control unit 201 and the accessory control unit 501 perform analysis of the received data and internal processing about the received data. Upon completion of the internal processing and completion of preparations for receiving next data, the accessory control unit 501 and the first lens control unit 201 cancel a low output to the signal line CS at timing T6 and timing T7 illustrated in FIG. 14, respectively.

Furthermore, the times required for analysis of the received data and internal processing about the received data differ depending on the processing capacities of CPUs provided in the respective control units. Accordingly, to continuously perform communication, each control unit needs to recognize timing at which, in the other control unit, the internal processing about the received data has been completed.

In the present embodiment, as mentioned above, the CS terminal is used to perform outputting of the open drain type. Therefore, the signal level of the signal line CS becomes high when all of the camera control unit 101, the first lens control unit 201, and the accessory control unit 501 have cancelled a low output to the signal line CS. Thus, each control unit (CPU) involved in broadcast communication confirms that the signal level of the signal line CS has become high, thus determining that, in each of the other control units (CPUs), preparations for performing next communication have been completed. With this configuration, the camera body 100 and a predetermined camera accessory are able to continuously perform appropriate communication.

Next, at timing T8 illustrated in FIG. 14, the accessory control unit 501 confirms that a high output of the signal line CS has been cancelled. After that, the accessory control unit 501 starts a low output to the signal line CS to communicate starting of broadcast communication to the camera control unit 101 and the first lens control unit 201.

Next, at timing T9 illustrated in FIG. 14, the accessory control unit 501 outputs data targeted for transmission to the signal line DCA.

On the other hand, the camera control unit 101 and the first lens control unit 201 detect a start bit ST input from the signal line DCA, and, at timing T10 illustrated in FIG. 14, start a low output to the signal line CS. Furthermore, since, at timing T8, a low output to the signal line CS has already been performed by the accessory control unit 501, the signal level of the signal line CS in the intermediate accessory 500 does not change at timing T10.

Next, at timing T11 illustrated in FIG. 14, the accessory control unit 501 ends an output up to the stop bit SP, and then at timing T12, cancels a low output to the signal line CS. On the other hand, the camera control unit 101 and the first lens control unit 201 receive data up to the stop bit SP input from the signal line DCA. After that, the camera control unit 101 and the first lens control unit 201 perform analysis of the received data and internal processing about the received data, and the first lens control unit 201 and the camera control unit 101 cancel a low output to the signal line CS at timing T13 and timing T14, respectively, at which preparations for receiving next data have been completed.

In the above-described way, with regard to the third communication in the present embodiment, in the broadcast communication mode, the signal line CS serves as a signal line for communicating a signal indicating the broadcast communication being started and being in process (being processed).

Figure 15:
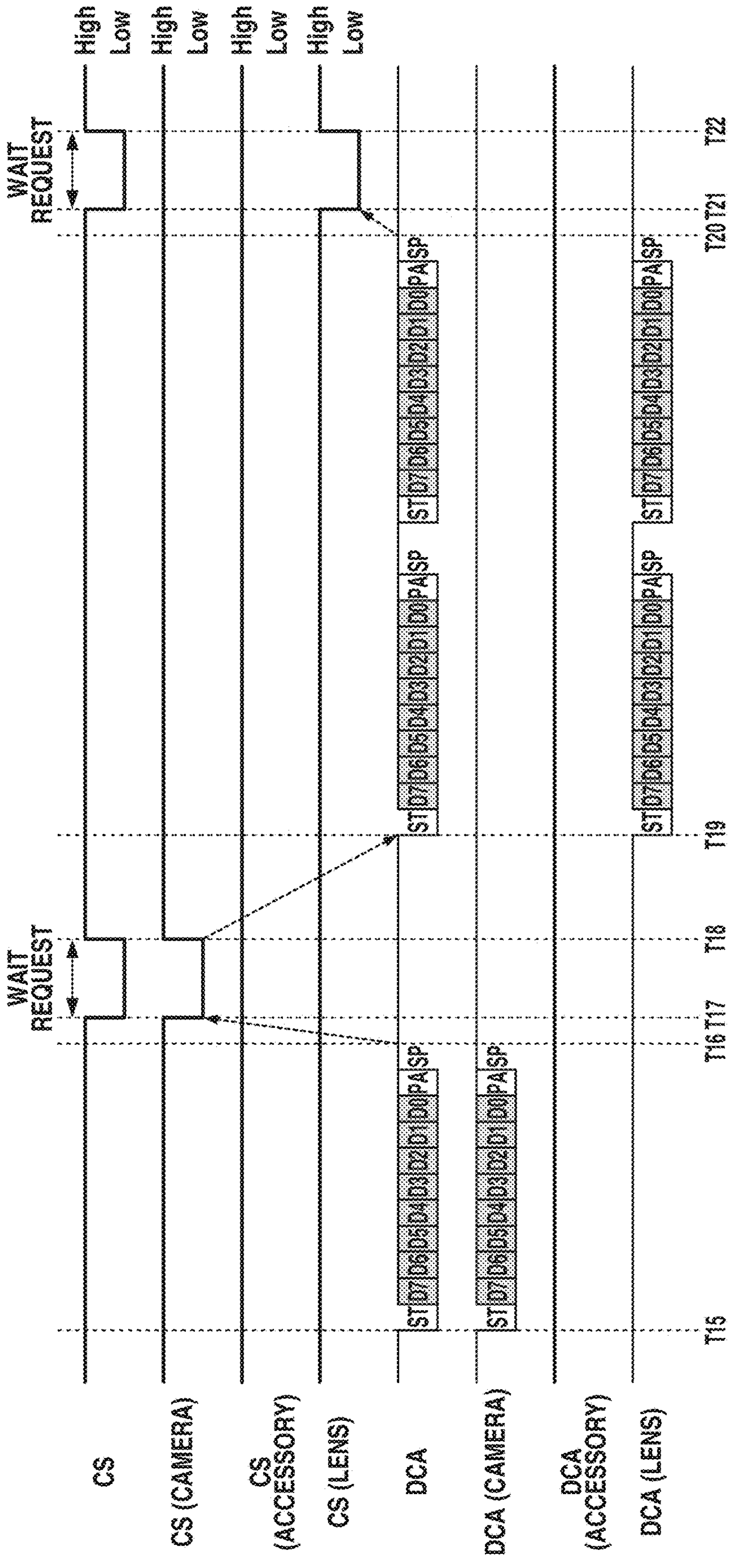
FIG. 15 is a timing chart illustrating, as an example, peer-to-peer (P2P) communication in the third communication, according to the present embodiment.

Next, the function of the CS terminal in the P2P mode in the third communication is described with reference to FIG. 15. FIG. 15 is a timing chart illustrating, as an example, P2P communication in the third communication, according to the present embodiment. Furthermore, FIG. 15 illustrates operation timing in a case where the first interchangeable lens 200 is mounted to the camera body 100 via the intermediate accessory 500. Moreover, signal lines and signal waveforms illustrated in FIG. 15 are approximately the same as those in the broadcast communication mode described with reference to FIG. 14, and are, therefore, omitted from description.

In the subsequent description, a case where the camera control unit 101 transmits one-byte data to the first lens control unit 201 and, in response to the one-byte data, the first lens control unit 201 transmits two-byte data to the camera control unit 101 is described.

In the following description, a signal line connected to the CS terminal is referred to as a "signal line CS", and a signal line connected to the DCA terminal is referred to as a "signal line DCA". At timing T15 illustrated in FIG. 15, the camera control unit 101 transmits, to the first lens control unit 201, an instruction to cause the first lens control unit 201 to transmit specific data with use of the signal line DCA.

Next, at timing T16 illustrated in FIG. 15, the camera control unit 101 completes an output up to the stop bit SP in the signal line DCA at the camera side, and then at timing T17, starts a low output to the signal line CS. Then, the camera control unit 101 makes preparations for receiving data, while outputting low level to e signal line CS, and, at timing T18, when the preparations are completed, cancels a low output to the signal line CS.

On the other hand, after detecting a low signal on the signal line CS output from the camera control unit 101, the first lens control unit 201 analyzes an instruction received from the camera control unit 101 and then performs internal processing concerning the instruction. After that, the first lens control unit 201 confirms cancellation of a low output to the signal line CS at the camera side, and then at timing T19 illustrated in FIG. 15, the first lens control unit 201 transmits data corresponding to the instruction received from the camera control unit 101 with use of the signal line DCA.

Next, at timing T20 illustrated in FIG. 15, the first lens control unit 201 ends an output up to the stop bit SP of the second byte, and then at timing T21, starts a low output to the signal line CS at the lens side. After that, the first lens control unit 201 makes preparations for receiving next data, and then at timing T22 illustrated in FIG. 15, cancels a low output to the signal line CS. Furthermore, in the description made with reference to FIG. 15, the accessory control unit 501, which is not selected as a communication partner for the P2P communication, is not involved in various operations in the signal line CS and the signal line DCA.

In the above-described way, with regard to the third communication in the present embodiment, in the P2P mode, the signal line CS serves as a signal line for communicating ending of transmission of data from the transmitting side and a wait request concerning data transmission.

As described above, in the third communication according to the present embodiment, the function of the CS terminal is configured to differ between the broadcast communication mode and the P2P mode. With this configuration, it is possible to implement communications in both the broadcast communication mode and the P2P mode with use of only a total of two signal lines, i.e., the signal line CS and signal line DCA for the CS terminal and DCA terminal.

Additionally, transmission and reception of various pieces of data using the third communication are used with use of the DCA terminal, the output type of which is the CMOS output type. With this configuration, even if the output type of the CS terminal is configured to be the open drain type, it is possible to implement high-speed communication.

<Arrangement Sequence of Terminals>

In the subsequent description, details of the arrangement of terminals located at the camera mount A and the lens mount B according to the present embodiment are described based on the above-described circuit configurations and operations of the camera body 100 and the respective camera accessories.

First, the location of the MIF terminal is described. Here, suppose a case where the MIF terminal 1005 in the camera mount A is located at a position in which the MIF terminal 1005 slides on other terminals (contact surfaces) excluding the MIF terminal 2005 located in the lens mount B or the MIF terminals complete their interconnection prior to the DGND terminals and the PGND terminals. In this case, in the state in which the lens mount B is not completely mounted to the camera mount A, electric power is not yet supplied from the camera body 100 to the camera accessory. Accordingly, if, as the terminals provided in the lens mount B slide on the terminals in the camera mount A, the MIF terminal 1005 comes into contact with a terminal other than the MIF terminal 2005, the voltage level exhibited by the MIF terminal 1005 may instantaneously become low.

In this case, in spite of a state in which the respective corresponding terminals in both mounts are not completely connected to each other, the camera body 100 may erroneously detect that a camera accessory has been mounted to the camera body 100. Accordingly, supplying of electric power may be started in the state in which the camera accessory is not completely mounted to the camera body 100, so that, since supplying of electric power and ground connection do not become electrically stable, a false operation or a failure may occur in the camera body 100 and the camera accessory. This issue also applies to a case where the MIF terminals are interconnected prior to the ground terminals being interconnected.

With respect to the above-mentioned issue, in the present embodiment, the MIF terminals 1005 and 2005 in the camera mount A and the lens mount B are located at the far side in the lens mounting direction on the camera mount lower step and the lens mount upper step, respectively. Thus, in the present embodiment, the terminals are arranged in such a manner that, during attachment and detachment between the mounts, the MIF terminal 1005 in the camera mount A does not slide on any terminal other than the MIF terminal 2005 in the lens mount B. With this configuration, it is possible to prevent the camera body 100 from erroneously detecting that a camera accessory has been mounted thereto. Moreover, with this configuration, in the state in which the power source system terminals have been surely interconnected and the ground terminals have been surely interconnected, supplying of electric power from the camera body 100 to the camera accessory is performed. Accordingly, the camera body 100 and the respective camera accessories are able to reduce the occurrence of a false operation or failure in the camera body 100 and the respective camera accessories.

Next, the location of the DCL terminal, the DLC terminal, and the LCLK terminal associated with the first communication unit is described. As mentioned above, driving control and acquisition of state information between the camera body 100 and, for example, the first interchangeable lens 200 or the second interchangeable lens 300 are performed with use of the first communication. In other words, transmission and reception of main data required for an image capturing operation for a subject performed by the camera body 100 are performed with use of the first communication. Even if the terminals associated with the second and third communication units become worn due to the terminals sliding on each other and the electrical connection between the terminals associated with the second and third communication units become unstable, as long as the first communication is correctly performed, it is possible to perform main driving control of the camera accessory for the image capturing operation. Accordingly, the terminals associated with the first communication unit are more important terminals in performing an image capturing operation than the terminals associated with the second and third communication units.

Therefore, in the camera mount A in the present embodiment, the terminals associated with the first communication unit are located at positions in which the number of times of sliding (the number of times of contact) between the terminals is smaller than that of the terminals associated with the second and third communication units. Specifically, in the camera mount A in the present embodiment, the DCL terminal, the DLC terminal, and the LCLK terminal associated with the first communication unit are located at the farther side in the lens mounting direction than the DLC2 terminal, the DCA terminal, and the CS terminal. Moreover, in the camera mount A, the DCL terminal, the DLC terminal, and the LCLK terminal associated with the first communication unit are located at positions in which the number of times of sliding (the number of times of contact) between the terminals is smaller next to that of the MIF terminal. Accordingly, the location of the terminals in the lens mount B is a reversal of the location of the terminals in the camera mount A.

With this configuration, it is possible to make the durability against sliding (contact) between terminals corresponding to the number of times of attachment and detachment of a camera accessory to and from the camera body 100 higher in the terminals associated with the first communication unit than in the terminals associated with the second and third communication units. Accordingly, the camera body 100 and the respective camera accessories are able to reduce a communication fault caused by abrasion of contact pins and contact surfaces corresponding to the DCL terminal, the DLC terminal, and the LCLK terminal associated with the first communication unit, thus improving communication reliability between both sides.

Figure 16A:
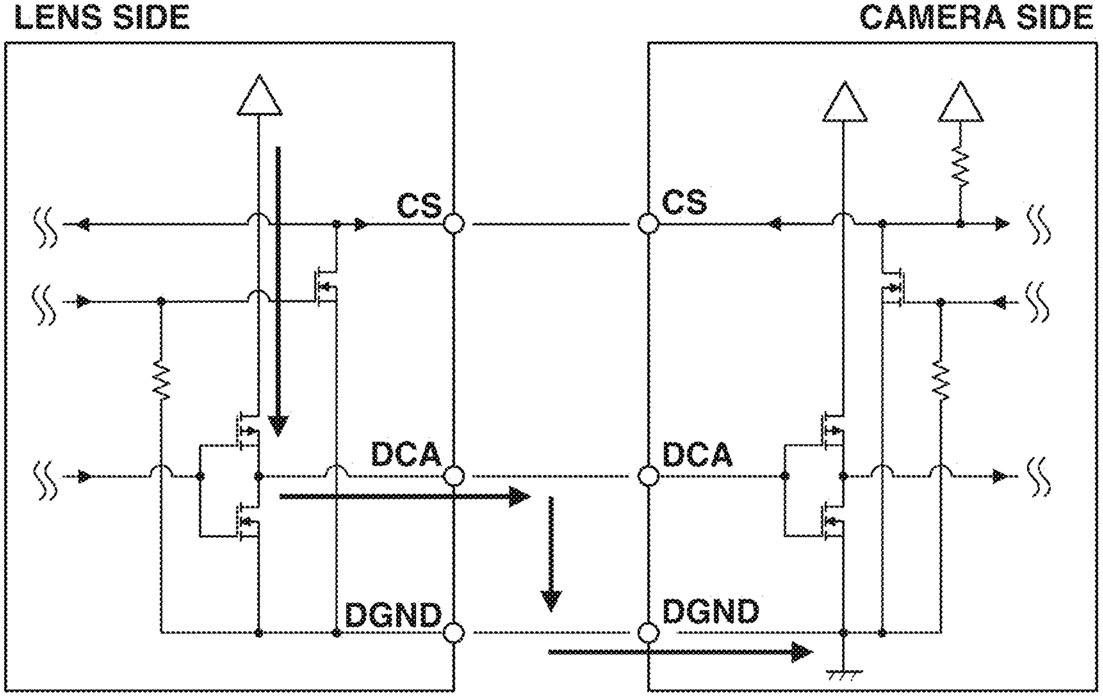
FIGS. 16A and 16B are diagrams illustrating, as an example, internal configurations of a CS terminal, a DCA terminal, and a DGND terminal in the camera mount A and the lens mount B, according to the present embodiment.
Figure 16B:
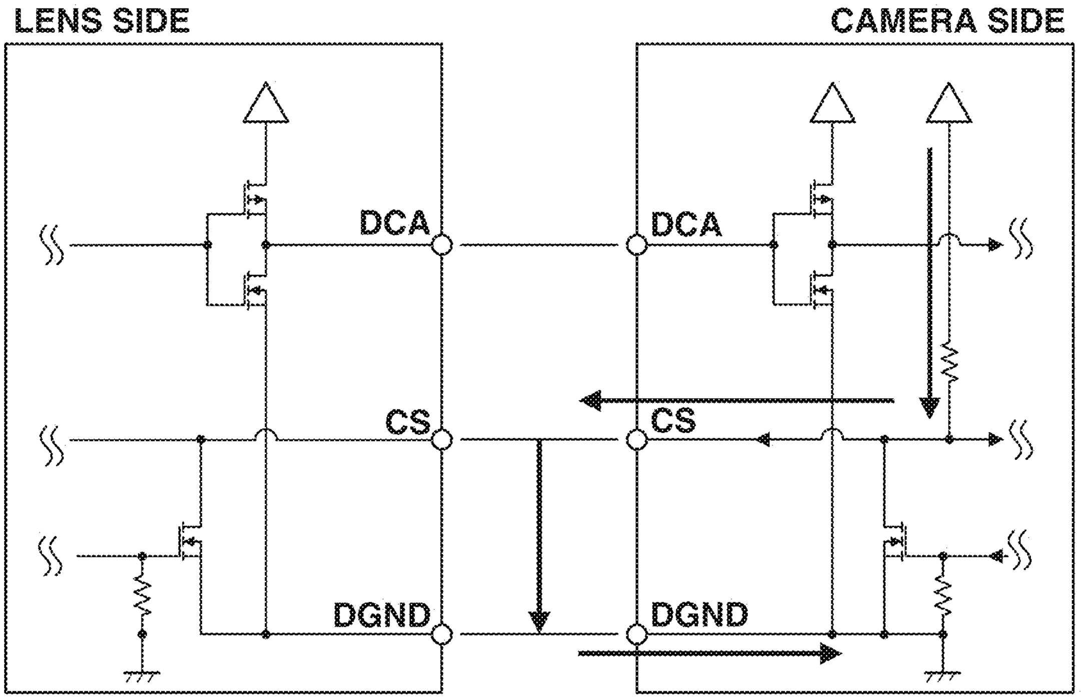

Next, the location of the DGND terminal, the DCA terminal, and the CS terminal is described with reference to FIGS. 16A and 16B. FIGS. 16A and 16B are diagrams illustrating, as an example, internal configurations of the CS terminal, the DCA terminal, and the DGND terminal in the camera mount A and the lens mount B, according to the present embodiment. FIG. 16A illustrates a case where, unlike the arrangement sequence of terminals described in the present embodiment, for example, the DCA terminal is located adjacent to the DGND terminal, and FIG. 16B illustrates the arrangement sequence of terminals described in the present embodiment.

As mentioned above, since the DCA terminal is a CMOS output type terminal, as illustrated in FIG. 16A, if a short circuit occurs between the DCA terminal and the DGND terminal, a relatively large current may flow in directions indicated by arrows in FIG. 16A. Specifically, if the voltage level exhibited by the DCA terminal is made high in the state in which, for example, a conductive foreign substance adheres between the DCA terminal and the DGND terminal, the DCA terminal of the CMOS output type may be short-circuited with the DGND terminal. In this case, an unintended large current may flow to the DGND terminal in the camera body 100 along the path indicated by arrows illustrated in FIG. 16A. Then, in this case, a failure may occur in electrical circuits of the camera body 100.

On the other hand, in the present embodiment, as illustrated in FIG. 16B, the DGND terminal is located adjacent to the CS terminal. As mentioned above, the CS terminal is a terminal used to perform open-type output. Accordingly, even in a case where a short circuit occurs between the DGND terminal and the CS terminal due to, for example, a conductive foreign substance adhering between the DGND terminal and the CS terminal, only a minute current flows to the DGND terminal along a path indicated by arrows illustrated in FIG. 16B. Specifically, since the CS terminal is a terminal exhibiting an open type output, even when the DGND terminal and the CS terminal are short-circuited with each other, only a minute current with a low voltage level flows from the camera-side power source to the camera-side DGND terminal via a pull-up resistor. Accordingly, with the above-described configuration employed, the camera body 100 and the respective camera accessories in the present embodiment are able to prevent a failure from occurring in electrical circuits of the camera body 100 due to a large current flowing to the ground via the camera-side DGND terminal.

Figure 17A:
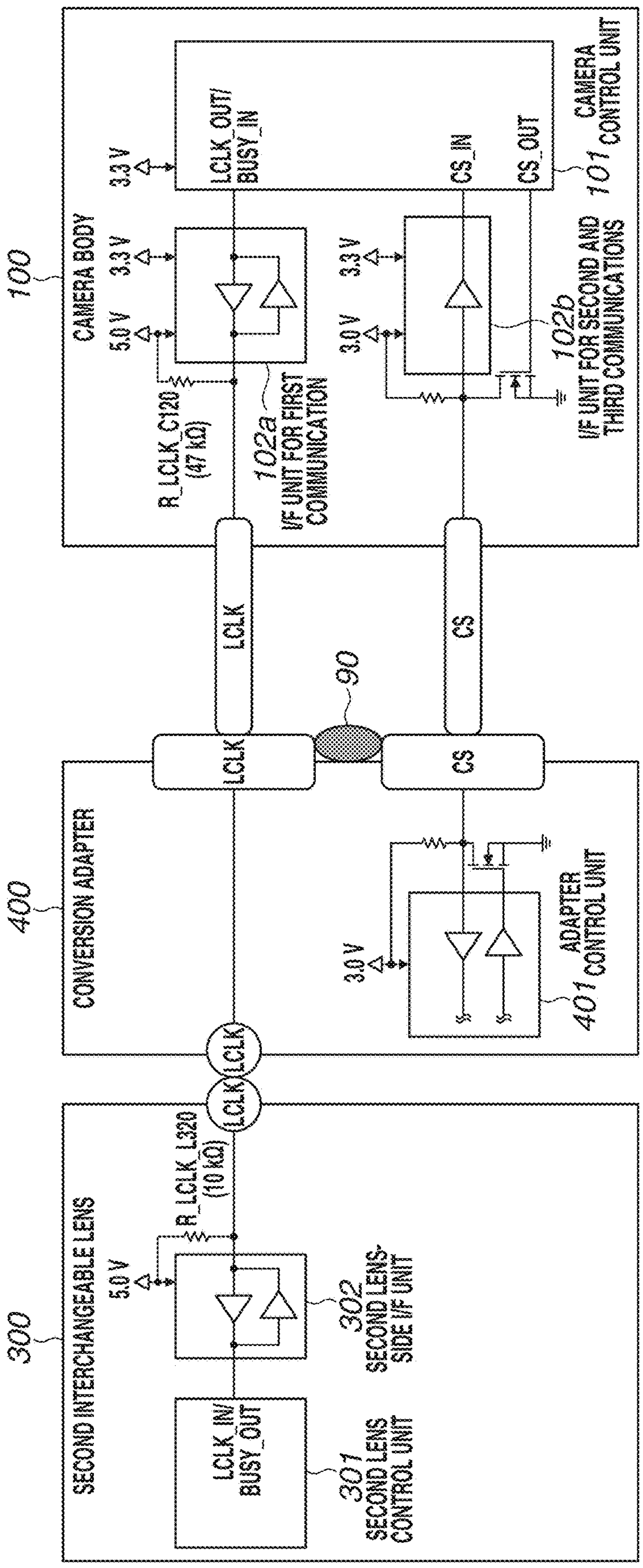
FIGS. 17A, 17B, 17C, and 17D are diagrams illustrating, as an example, influences occurring in electrical circuits according to differences of terminals each of which is located adjacent to an LCLK terminal, according to the present embodiment.
Figure 17B:
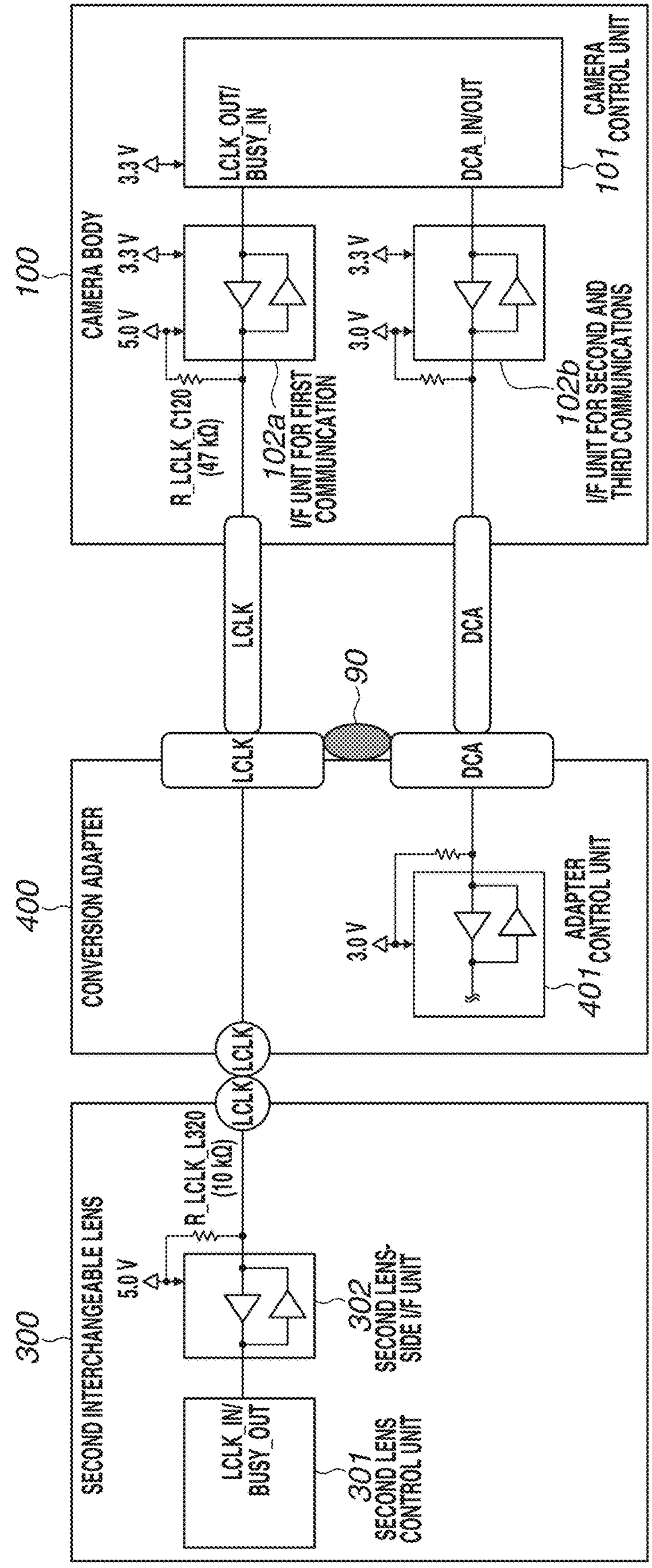
Figure 17C:
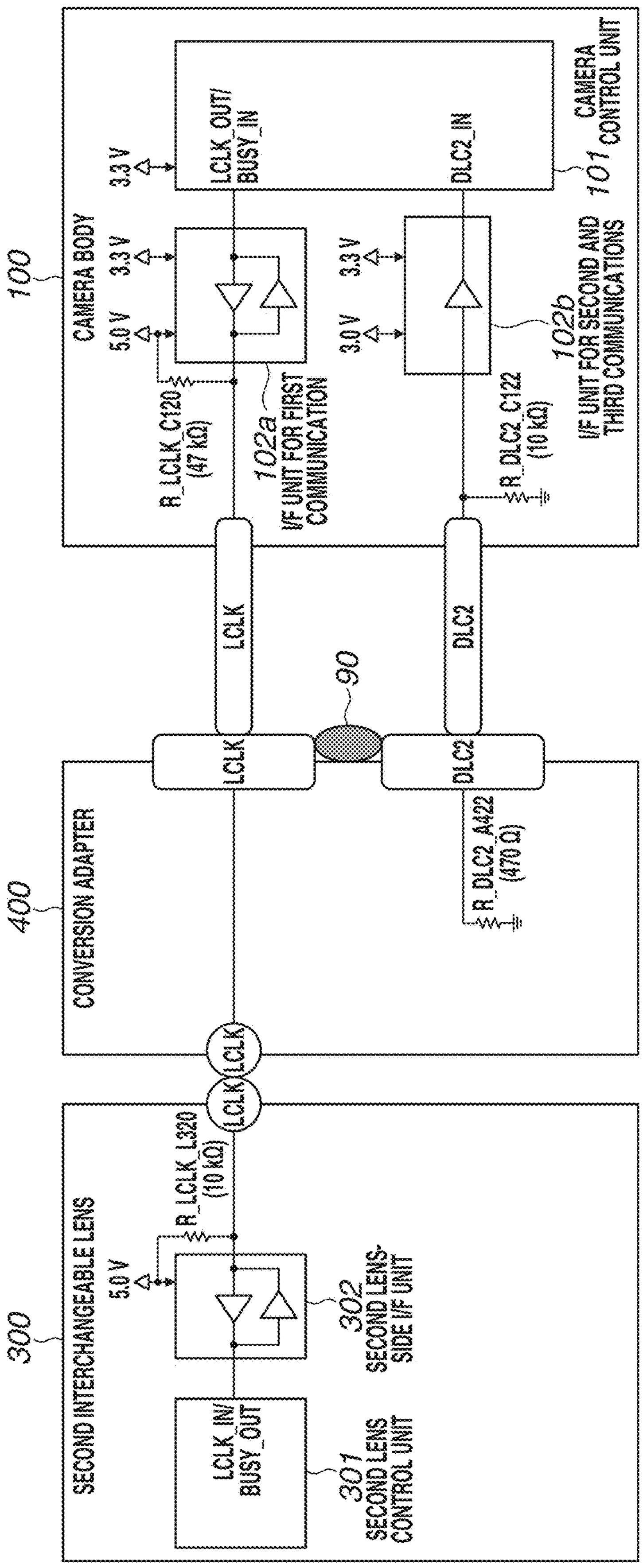
Figure 17D:
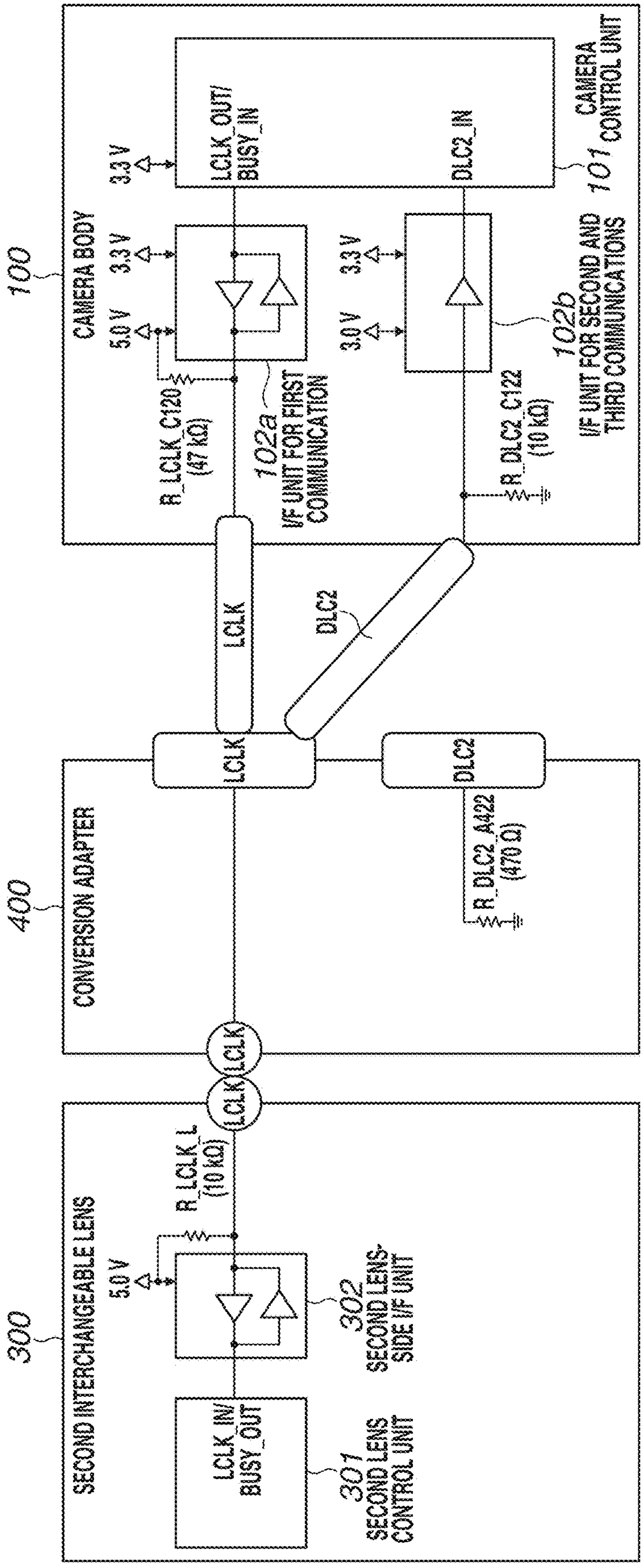

Next, the location of the DLC2 terminal and the LCLK terminal is described with reference to FIGS. 17A, 17B, 17C, and 17D. FIGS. 17A to 17D are diagrams illustrating, as an example, influences occurring in electrical circuits according to differences of terminals each of which is located adjacent to the LCLK terminal, according to the present embodiment. FIG. 17A illustrates a case where, tentatively, the CS terminal is located adjacent to the LCLK terminal. FIG. 17B illustrates a case where, tentatively, the DCA terminal is located adjacent to the LCLK terminal. FIG. 17C illustrates a case where, when the DLC2 terminal is located adjacent to the LCLK terminal, a foreign substance is present between the two terminals. FIG. 17D illustrates a case where, when the DLC2 terminal is located adjacent to the LCLK terminal, the bent terminal comes into contact with the adjacent terminal. Furthermore, each of FIGS. 17A to 17D illustrates a case where the second interchangeable lens 300 is mounted to the camera body 100 via the conversion adapter 400.

For example, suppose a case where, as illustrated in FIG. 17A, in each of the camera body 100 and the conversion adapter 400, the CS terminal is located adjacent to the LCLK terminal. Furthermore, FIG. 17A illustrates a case where a conductive foreign substance 90 is present between the LCLK terminal and the CS terminal in the conversion adapter 400 and a short circuit occurs between the two terminals due to the two terminals being made conductive with each other.

Suppose a case where the second interchangeable lens 300 has been mounted to the camera body 100 via the conversion adapter 400. In this case, as illustrated in FIG. 17A, the signal line for the LCLK terminal is pull-up-connected to the VDD (5.0 V) via the resistor R_LCLK_C 120 in the camera body 100 and the resistor R_LCLK_L 320 in the second interchangeable lens 300. On the other hand, the signal line for the CS terminal is pull-up-connected to the voltage level of 3.0 V via a resistance (resistor) provided in the camera body 100 and a resistance (resistor) provided in the conversion adapter 400.

In this case, as the LCLK terminal and the CS terminal are short-circuited with each other, a voltage of 3.0 V or higher is applied from the signal line for the LCLK terminal to the signal line for the CS terminal via the resistor R_LCLK_C 120 and the resistor R_LCLK_L 320. Usually, both the I/F unit for second and third communications 102*b* and the adapter control unit 401 operate with electric power of power source voltage 3.0 V. However, as mentioned above, if the two terminals are short-circuited with each other, a voltage higher than the upper limit voltage is applied to elements such as the I/F unit for second and third communications 102*b* and the adapter control unit 401, so that failures may occur in electrical circuits in the conversion adapter 400 and the camera body 100.

Here, the upper limit voltage is a rated voltage and refers to a voltage which does not cause any failure in electrical circuits connected to the respective terminals. Alternatively, the upper limit voltage is an operating voltage and refers to a voltage which allows electrical circuits connected to the respective terminals to operate in a normal manner.

Next, for example, suppose a case where, as illustrated in FIG. 17B, in each of the camera body 100 and the conversion adapter 400, the DCA terminal is located adjacent to the LCLK terminal. Furthermore, FIG. 17B illustrates a case where a conductive foreign substance 90 is present between the LCLK terminal and the DCA terminal in the conversion adapter 400 and a short circuit occurs between the two terminals due to the two terminals being made conductive with each other.

Suppose a case where the second interchangeable lens 300 has been mounted to the camera body 100 via the conversion adapter 400. In this case, as illustrated in FIG. 17B, the signal line for the LCLK terminal is pull-up-connected to the VDD (5.0 V) via the resistor R_LCLK_C 120 in the camera body 100 and the resistor R_LCLK_L 320 in the second interchangeable lens 300. On the other hand, the signal line for the DCA terminal is pull-up-connected to the voltage level of 3.0 V via a resistance (resistor) provided in the camera body 100 and a resistance (resistor) provided in the conversion adapter 400.

In this case, as the LCLK terminal and the DCA terminal are short-circuited with each other, a voltage of 3.0 V or higher is applied from the signal line for the LCLK terminal to the signal line for the DCA terminal via the resistor R_LCLK_C 120 and the resistor R_LCLK_L 320. Usually, both the I/F unit for second and third communications 102*b* and the adapter control unit 401 operate with electric power of power source voltage 3.0 V. However, as mentioned above, if the two terminals are short-circuited with each other, a voltage higher than the upper limit voltage is applied to elements such as the I/F unit for second and third communications 102*b* and the adapter control unit 401, so that failures may occur in electrical circuits in the conversion adapter 400 and the camera body 100.

For the above-mentioned reason, it is not desirable that each of the CS terminal and the DCA terminal be set as a terminal associated with the second and third communication units which is adjacent to the LCLK terminal associated with the first communication unit at the near side in the lens mounting direction.

In the subsequent description, a case where the DLC2 terminal is located adjacent to the LCLK terminal as a configuration of the present embodiment is described. Suppose a case where, as illustrated in FIG. 17C, when the LCLK terminal and the DLC2 terminal are located adjacent to each other, a short circuit occurs between the two terminals due to a conductive foreign substance 90 being present between the two terminals. In this case, as mentioned above, since the second interchangeable lens 300 is not provided with a terminal associated with the second communication unit (DLC2 terminal), the second communication is not performed even when the second interchangeable lens 300 is mounted to the camera body 100 via the conversion adapter 400. Thus, in a case where the second interchangeable lens 300 is mounted to the camera body 100 via the conversion adapter 400, the DLC2 terminal, which is associated with the second communication unit, is not used between the camera body 100 and the second interchangeable lens 300.

Accordingly, in a case where the second interchangeable lens 300 is mounted to the camera body 100 via the conversion adapter 400, even if the LCLK terminal and the DLC2 terminal are short-circuited with each other, no failure occurs in electrical circuits in the conversion adapter 400, such as the adapter control unit 401. Moreover, even if the LCLK terminal and the DLC2 terminal are short-circuited with each other, voltages to be applied to the two terminals can be restricted to voltages lower than or equal to the respective upper limit voltages by voltage division using resistances that are based on the respective resistors provided in the second interchangeable lens 300, the conversion adapter 400, and the camera body 100. Details of this are described below. Thus, it is favorable that a terminal associated with the second communication unit (DLC2 terminal) is located adjacent to a terminal associated with the first communication unit. With this configuration, the camera body 100 and the conversion adapter 400 in the present embodiment are able to prevent any failure in each electrical circuit provided in the conversion adapter 400 and the camera body 100.

Furthermore, in a case where the first interchangeable lens 200 is mounted to the camera body 100, the communication voltages for the first communication unit and the second communication unit are the same (3.0 V). In this case, even if the LCLK terminal and the DLC2 terminal are short-circuited with each other, as mentioned above, a voltage higher than the upper limit voltage is not applied to elements, such as the I/F unit 102, in the camera body 100.

Moreover, in a case where the first interchangeable lens 200 is mounted to the camera body 100, there is a case where the second communication and the third communication are concurrently used independently from each other. In this case, even if the DLC2 terminal, which is associated with the second communication unit, is short-circuited with the DCA terminal, which is associated with the third communication unit, since the communication voltages for the second communication unit and the third communication unit are the same (3.0 V), a voltage higher than the upper limit value is not applied to the I/F unit for second and third communications 102*b*.

As described above, it is desirable that a terminal associated with the second communication unit (the DLC2 terminal) be located next to a terminal associated with the first communication unit and a terminal associated with the third communication unit (the CS terminal or the DCA terminal) be located next to the terminal associated with the second communication unit in the opposite direction. In other words, it is desirable that a terminal associated with the third communication unit be located in such a manner that, at the side opposite to the LCLK terminal associated with the first communication unit, which is adjacent to one side of the DLC2 terminal associated with the second communication unit, across the DLC2 terminal, the terminal associated with the third communication unit is adjacent to the DLC2 terminal. With this configuration, even in a case where any interchangeable lens is mounted directly or indirectly to the camera body 100, it is possible to prevent any failure from occurring in electrical circuits in the camera body 100 and the conversion adapter 400.

Here, details of voltages to be applied to the respective interface units in the camera body 100 are described. Furthermore, here, suppose a case where the second interchangeable lens 300 is mounted to the camera body 100 via the conversion adapter 400. In this case, the signal line for the LCLK terminal is pull-up-connected to the VDD (5.0 V) via the resistor R_LCLK_C 120 in the camera body 100 and the resistor R_LCLK_L 320 in the second interchangeable lens 300. On the other hand, the DLC2 terminal is pull-down-connected to the signal line for the DGND terminal via the resistor R_DLC2_C 122 provided in the camera body 100 and the resistor R_DLC2_A 422 provided in the conversion adapter 400.

Here, a combined resistance of the resistor R_LCLK_C 120 and the resistor R_LCLK_L 320 is denoted by R_LCLK, and a combined resistance of the resistor R_DLC2_C 122 and the resistor R_DLC2_A 422 is denoted by R_DLC2. Moreover, a voltage to be applied to the signal lines for the LCLK terminal and the DLC2 terminal in a case where the two terminals are short-circuited with each other as mentioned above is denoted by V_ST1. The combined resistance R_LCLK, the combined resistance R_DLC2, and the applied voltage V_ST1 are calculated by the following formulae (1), (2), and (3), respectively.

$$R\_LCLK=1/((1/R\_LCLK\_C120)+(1/R\_LCLK\_L320)) \quad (1)$$

$$R\_DLC2=1/((1/R\_DLC2\_C122)+(1/R\_DLC2\_A422)) \quad (2)$$

$$V\_ST1=5.0\times(R\_DLC2/(R\_LCLK+R\_DLC2)) \quad (3)$$

For example, in a case where R_LCLK is set to 10 kΩ and R_DLC2 is set to 100 kΩ, since the applied voltage V_ST1 becomes approximately equal to 4.5 V based on formulae (1), (2), and (3), a voltage exceeding the upper limit voltage (3.0 V) of the I/F unit for second and third communications 102*b* would be applied.

Therefore, in the present embodiment, for example, R_LCLK is set to 10 kΩ and R_DLC2 is set to 10 kΩ, so that the applied voltage V_ST1 is adjusted to become equal to 2.5 V, which is lower than or equal to the upper limit voltage (3.0 V) of the unit for second and third communications 102*b*. To make the applied voltage V_ST1 lower than or equal to the upper limit voltage of the I/F unit for second and third communications 102*b*, the following formula (4) only needs to be satisfied.

$$(R\_DLC2/(R\_LCLK+R\_DLC2))\leq(3.0/VDD) \quad (4)$$

Setting the resistance values of the resistors R_LCLK_C 120, R_LCLK_L 320, R_DLC2_C 122, and R_DLC2_A 422 in such a way as to satisfy the above formula (4) enables protecting the I/F unit for second and third communications 102*b* against excess voltages.

Here, in the present embodiment, as mentioned above, the camera control unit 101 detects that, immediately after a predetermined interchangeable lens is mounted, the LCLK terminal has switched from low level to high level. Moreover, in a case where the mounted interchangeable lens is the second interchangeable lens 300, the camera control unit 101 performs communication of the open drain output type with the second interchangeable lens 300 and determines, based on such communication, whether the second interchangeable lens 300 is compatible with communication of the CMOS output type. Then, if it is determined that the second interchangeable lens 300 is compatible with communication of the CMOS output type, the camera control unit 101 switches the output type of each of the LCLK terminal and the DCL terminal to the CMOS output type.

Here, in a case where the output type of each of the LCLK terminal and the DCL terminal has been switched to the CMOS output type, the voltage exhibited by the LCLK terminal 1008 becomes a power supply voltage (5.0 V), which is output from the I/F unit for first communication 102*a* without via the resistor R_LCLK_C 120.

Assume that the low input threshold value (VIL_LCLK) of the input terminal for the LCLK signal of the I/F unit for first communication 102*a* is 0.5 V and R_LCLK is equal to 10 kΩ, R_DLC2_A422 is equal to 470Ω, and R_DLC2_C122 is equal to 10 kΩ. In this case, since the applied voltage V_ST1 becomes approximately equal to 0.2 V based on formulae (1), (2), and (3), which is lower than the low level input threshold value of the I/F unit for first communication 102*a*, the camera control unit 101 determines that communication with the interchangeable lens is impossible, and thus performs control not to start communication with the interchangeable lens.

With this configuration, since, in the camera body 100, the output type of the LCLK terminal is never switched to the CMOS output type, it is possible to prevent a voltage higher than the upper limit voltage from being applied to elements such as the I/F unit for second and third communications 102*b*. To prevent the output type of the LCLK terminal from switching to the CMOS output type in the camera body 100, the following formula (5) only needs to be satisfied.

$$(R\_DLC2/(R\_LCLK+R\_DLC2))\leq VIL\_LCLK \quad (5)$$

Setting the resistance values of the resistors R_LCLK_C 120, R_LCLK_L 320, R_DLC2_C 122, and R_DLC2_A 422 in such a way as to satisfy the above formula (5) enables protecting the I/F unit for second and third communications 102*b* against excess voltages.

However, even in a case where the above formula (5) is satisfied, if the resistance value of the resistor R_DLC2_C 122 is small, during the second communication using the DLC2 terminal, it is necessary to set the terminal current of the first lens-side I/F unit 202 to a large value. For example, a case where the resistance value of the resistor R_DLC2_A 422 is set to 10 kΩ and the resistance value of the resistor R_DLC2_C 122 is set to 470Ω is applicable. On the other hand, in the present embodiment, in consideration of the second communication, the values of the respective resistors are set in such a manner that the resistance value of the resistor R_DLC2_A 422, which is 470Ω, is set smaller than the resistance value of the resistor R_DLC2_C 122, which is 10 kΩ.

Next, for example, suppose a case where, as illustrated in FIG. 17D, when the LCLK terminal and the DLC2 terminal are located adjacent to each other, a connection pin of the DLC2 terminal 1009 provided in the camera body 100 is bent and a short circuit occurs between the bent connection pin and the adjacent LCLK terminal. Furthermore, the terminal treatment of signal lines for the LCLK terminal and the DLC2 terminal is the same as that described above, and is, therefore, omitted from description.

Here, a voltage to be applied to the signal lines for the LCLK terminal 1008 and the DLC2 terminal 1009 in the camera body 100 in a case such as that illustrated in FIG. 17D is denoted by V_ST2. In this case, the applied voltage V_ST2 is calculated by the following formula (6).

$$V\_ST2=5.0\times R\_DLC2\_C122/(R\_LCLK+R\_DLC2\_C122) \quad (6)$$

For example, if it is assumed that R_LCLK is 10Ω and R_DLC2_C122 is 100 kΩ, since the applied voltage V_ST2 becomes approximately equal to 4.5 V based on formulae (1)

and (6), a voltage exceeding the upper limit voltage (3.0 V) of the I/F unit for second and third communications 102*b* would be applied. In this case, as mentioned above, a failure may occur in electrical circuits in the camera body 100, such as the I/F unit for second and third communications 102*b*.

Therefore, in the present embodiment, for example, R_LCLK is set to 10 kΩ and R_DLC2_C122 is set to 10 kΩ, so that the applied voltage V_ST2 is adjusted to become equal to 2.5 V, which is lower than or equal to the upper limit voltage (3.0 V) of the I/F unit for second and third communications 102*b*. To make the applied voltage lower than or equal to the upper limit voltage of the I/F unit for second and third communications 102*b*, the following formula (7) only needs to be satisfied. Furthermore, the high level input threshold value of the input terminal for the DLC2 signal of the I/F unit for second and third communications 102*b* is denoted by VIH_DLC2.

$$VIH\_DLC2 \leq R\_DLC2/(R\_LCLK+R\_DLC2) \leq (3.0/VDD) \tag{7}$$

Setting the resistance values of the resistors R_LCLK_C 120, R_LCLK_L 320, and R_DLC2_C 122 in such a way as to satisfy the above formula (7) enables protecting the I/F unit for second and third communications 102*b* against excess voltages.

Here, in a case where the second interchangeable lens 300 is mounted to the camera body 100 via the conversion adapter 400, the DLC2 terminal is pull-down-connected to the DGND signal line via the resistance (resistor) R_DLC2_A 422 provided in the conversion adapter 400. In this case, it is expected that a voltage with low level is input to the DLC2 input terminal (DLC2_IN) provided in the camera control unit 101.

Assume that the high level input threshold value VIH_DLC2 of the input terminal for the DLC2 signal is 2.3 V and R_LCLK is equal to 10 kΩ and R_DLC2_C122 is equal to 10 kΩ. In this case, since the applied voltage V_ST2 becomes approximately equal to 2.5 V based on formula (6), which exceeds the voltage level of the threshold value VIH_DLC2, the camera control unit 101 would determine that the DLC2 terminal exhibits a high-level voltage output. Accordingly, since not a low-level voltage, which is expected to be input, but a high-level voltage is input to the DLC2 input terminal (DLC2_IN), in this case, the camera control unit 101 is able to detect the presence of an abnormality in the terminal (perform error detection). Furthermore, in this case, the LCLK terminal 1008 is kept in the output state of the open drain type, and, moreover, a warning display which prompts the user to check the state of terminals provided in the respective mounts is provided (error processing is performed).

With this configuration, even in a case where the LCLK terminal and the DLC2 terminal have been short-circuited with each other due to a terminal being broken, the LCLK terminal 1008 of the camera body 100 does not switch to a terminal of the CMOS output type, so that it is possible to protect the I/F unit for second and third communications 102*b* against excessive voltages.

Furthermore, if the communication voltages for the second and third communication units are configured to be switched in such a way as to becomes the same voltage as that for the first communication unit depending on an interchangeable lens to be mounted, it is possible to prevent a failure from occurring in electrical circuits due to a short circuit occurring between terminals. However, to reduce power consumption concerning communication and to increase the speed of communication, the communication voltages for the second and third communication units are set in conformity with the lowest voltage out of the communication voltages for the first communication unit.

While an embodiment of the present invention has been described above, the present invention is not limited to such an embodiment but can be modified or altered in various fashions within the scope of the gist thereof. For example, while, in the above-described embodiment, a case where a digital camera is used as an example of a camera body 100 serving as an imaging apparatus has been described, a configuration in which an imaging apparatus other than digital cameras, such as a digital video camera (digital camcorder) or a security camera (monitoring camera), is used can also be employed.

Moreover, while, in the above-described embodiment, a case where an interchangeable lens, a conversion adapter, or an intermediate accessory is used as an example of a camera accessory, which is used to implement the present invention, has been described, the present embodiment is not limited to this. For example, as the camera accessory, an apparatus or device other than the above-mentioned ones can also be used as long as that is able to be coupled (mounted) directly or indirectly to the camera mount A of the camera body 100. Thus, the configuration of the above-described embodiment can be applied to any mount device including a mount. Specifically, the configuration of the above-described embodiment can be applied to any mount device including the above-mentioned plurality of terminals and a control unit (processor) including input ports to which the plurality of terminals is connected.

Moreover, while, in the above-described embodiment, as illustrated in FIGS. 4A and 4B, a direction in which to relatively rotate the lens mount B clockwise with respect to the camera mount A when the camera body 100 is viewed from the side which a subject faces during image capturing is set as the mounting direction, the present embodiment is not limited to this. For example, a direction in which to relatively rotate the lens mount B counterclockwise with respect to the camera mount A when the camera body 100 is viewed from the side which a subject faces during image capturing can be set as the mounting direction. In this case, at least the above-mentioned arrangement sequence of terminals located at the respective mounts only needs to be reversed.

Moreover, while, in the above-described embodiment, the lens mounting direction (accessory mounting direction) is defined based on the camera mount A and the location of each terminal in each mount has been described, the location relationship between terminals reverses in a case where the lens mounting direction is defined based on the lens mount B. For example, in a case where the lens mounting direction is defined based on the lens mount B, since the VDD terminal 2001 first comes into contact with any terminal located on the camera mount A, the side at which the VDD terminal 2001 is located is defined as the near side in the lens mounting direction. Alternatively, the location of each terminal can be defined by the relative mounting direction (rotational direction) between the camera mount A and the lens mount B. In this case, the side at which the VDD terminal, which last comes into contact with a terminal provided on the lens mount B out of the terminals of the camera mount A, is located is defined as the far side, and the side at which the VDD terminal, which first comes into contact with a terminal provided on the camera mount A out of the terminals of the lens mount B, is located is defined as the near side. Moreover, the side at which the DGND terminal, which first comes into contact with a terminal provided on the lens mount B out of the terminals of the camera mount A, is located is defined as the near side, and the side at which the DGND terminal, which last comes into contact with a terminal provided on the camera mount A out of the terminals of the lens mount B, is located is defined as the far side.

Furthermore, the above-mentioned farthest side and nearest side in the mounting direction for the lens mount represent positions in the range in which the mutually corresponding terminals are present in both the camera mount and lens mount when a camera accessory is mounted to the camera body 100. Accordingly, for example, in a case where, in a mount of a camera accessory which is able to be mounted to the camera body 100, there is a terminal a terminal corresponding to which is not present in the camera body 100, it does not matter with the position in which such a terminal is located. Furthermore, even in an imaging apparatus which allows each camera accessory described in the above embodiment to be mounted thereto, similarly, in a case where there is a terminal a terminal corresponding to which is not present in the camera accessory, it does not matter with the position in which such a terminal is located.

Moreover, while, in the above-described embodiment, a case where each terminal provided on the mount in the imaging apparatus is a contact pin and each terminal provided on the mount in the accessory is a contact surface has been described, the present embodiment is not limited to this. For example, a configuration in which contact surfaces are provided on the mount in the imaging apparatus and contact pins corresponding to the respective contact surfaces are provided on the mount in the accessory so that the respective corresponding contact surfaces and contact pins are able to be electrically connected to each other can be employed. In this case, the respective features of the camera mount and the accessory mount described in the above embodiment are also able to be implemented in the corresponding accessory mount and lens mount.

With regard to the imaging apparatus and the accessory according to the above-described embodiment, for example, in a case where each terminal provided on the camera mount is a contact surface, a configuration in which the width of each contact surface provided on the camera mount in the circumferential direction of the mount is adjusted as appropriate can also be employed. Moreover, in a case where each terminal provided on the accessory mount is a contact pin, a configuration in which an inter-pin pitch between the contact pins provided on the accessory mount is adjusted as appropriate can also be employed.

Moreover, while, in the above-described embodiment, a case where a computer program corresponding to the flow illustrated in FIG. 12 and FIG. 13 is previously stored in a memory (not illustrated) and the camera control unit 101 executes the program has been described, the present embodiment is not limited to this. For example, the program can be any form of program, such as object code, a program to be executed by an interpreter, or script data to be supplied to an operating system (OS), as long as the program includes a program function. Moreover, a recording medium equivalent to a memory for supplying the program can be, for example, a magnetic recording medium, such as a hard disk or a magnetic tape, an optical recording medium, or a magnetooptical recording medium.

Moreover, while, in the above-described embodiment, a configuration in which an apparatus including one of the camera mount A and the lens mount (accessory mount) B is actually rotated with respect to an apparatus including the other mount so that the apparatuses are bayonet-coupled to each other has been described, the present embodiment is not limited to this. For example, a configuration in which the camera mount A and the lens mount B are configured to be rotated relative to each other so that the mounts are bayonet-coupled to each other can also be employed. In the subsequent direction, a modification example of the present invention employing such a configuration is specifically described with reference to FIG. 20 to FIGS. 22A, 22B, and 22C.

Figure 20:
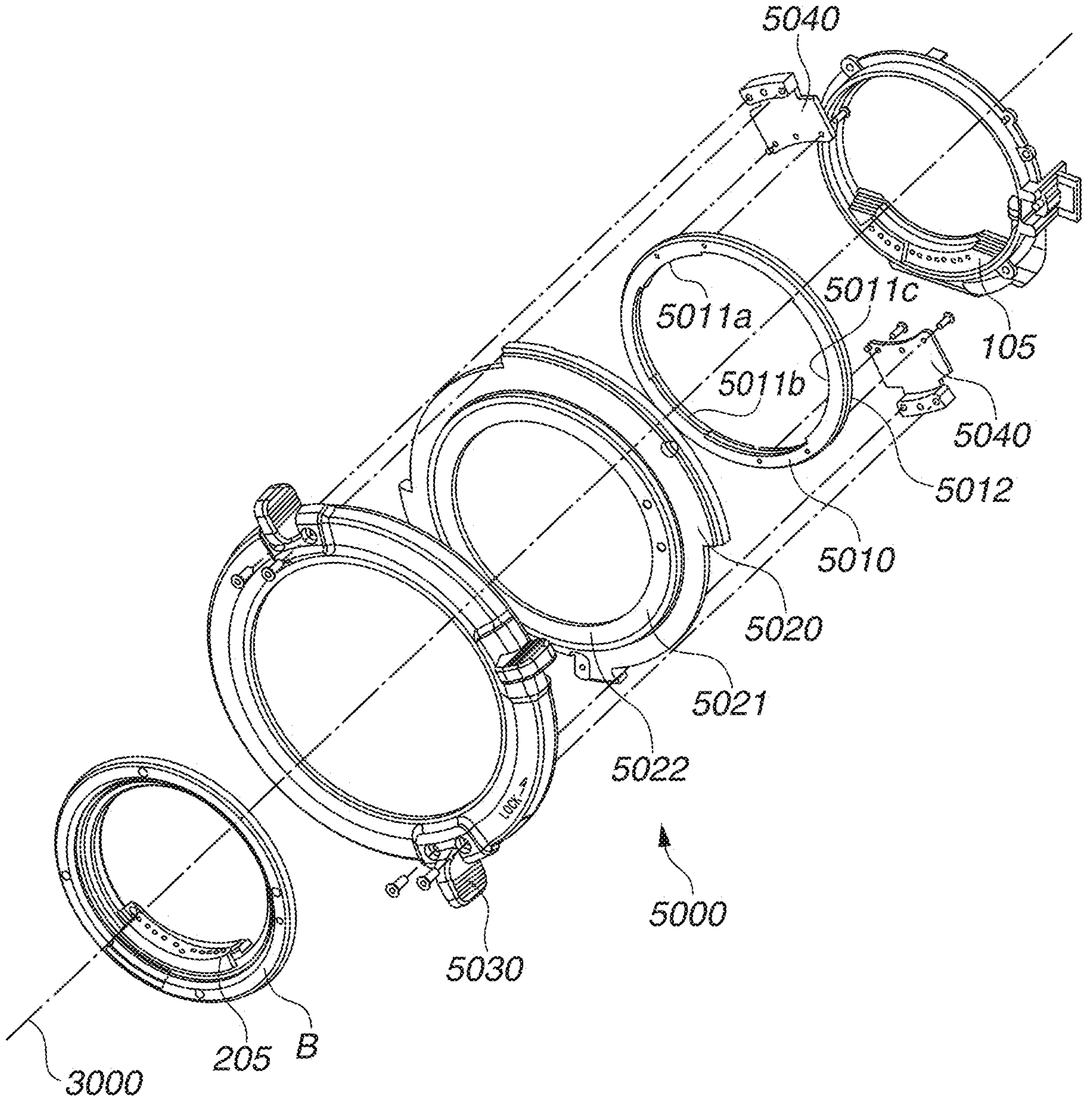
FIG. 20 is an exploded perspective view of a mount mechanism, according to a modification example of the present invention.
Figure 21A:
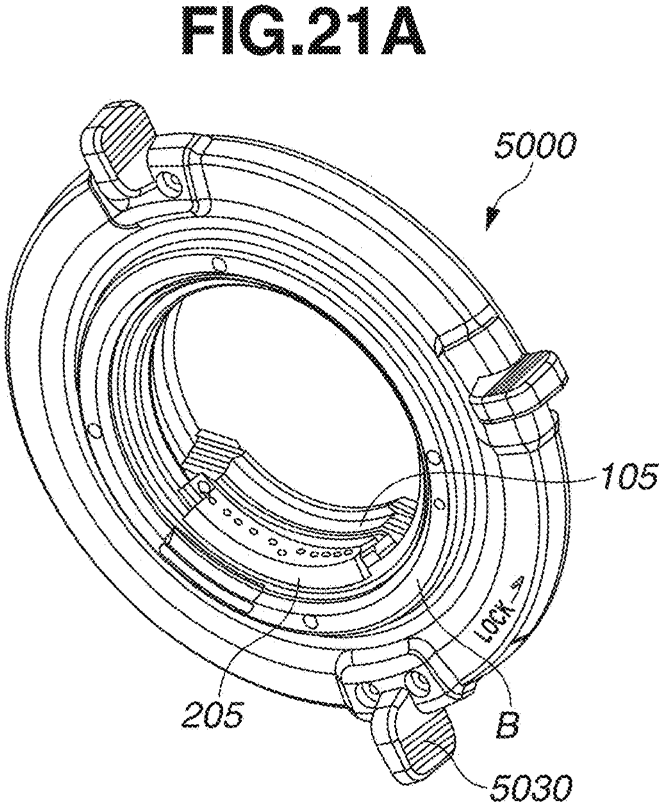
FIGS. 21A, 21B, and 21C are diagrams illustrating, as an example, a non-coupled state of the mount mechanism, according to the modification example.
Figure 21B:
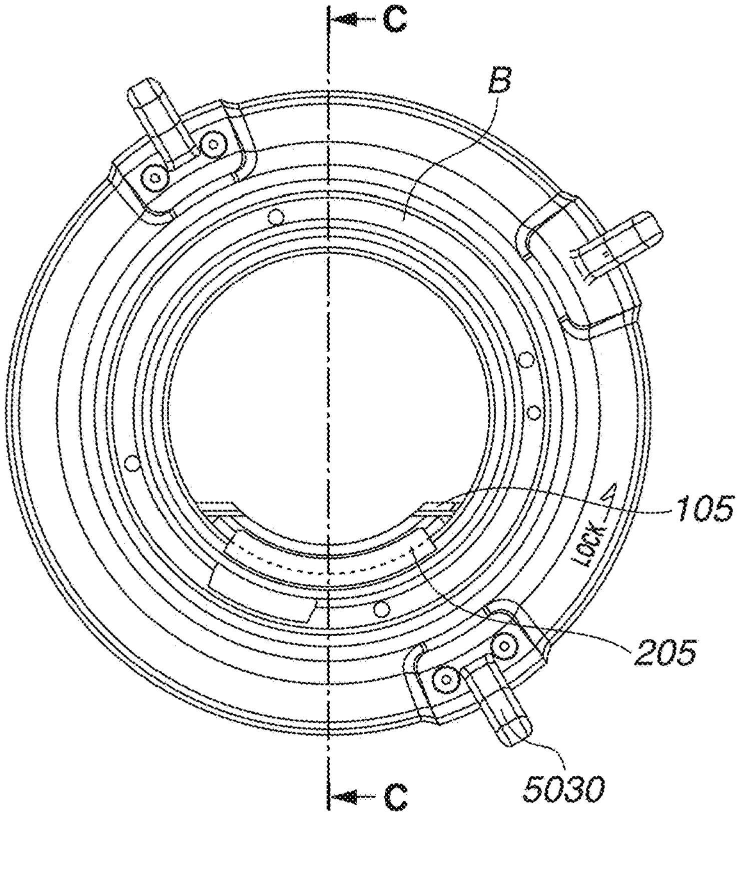
Figure 21C:
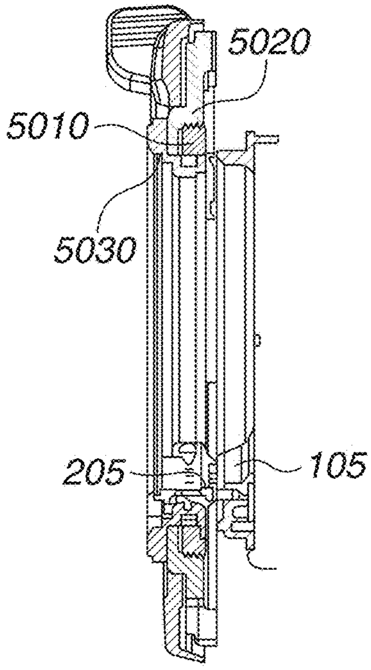
Figure 22A:
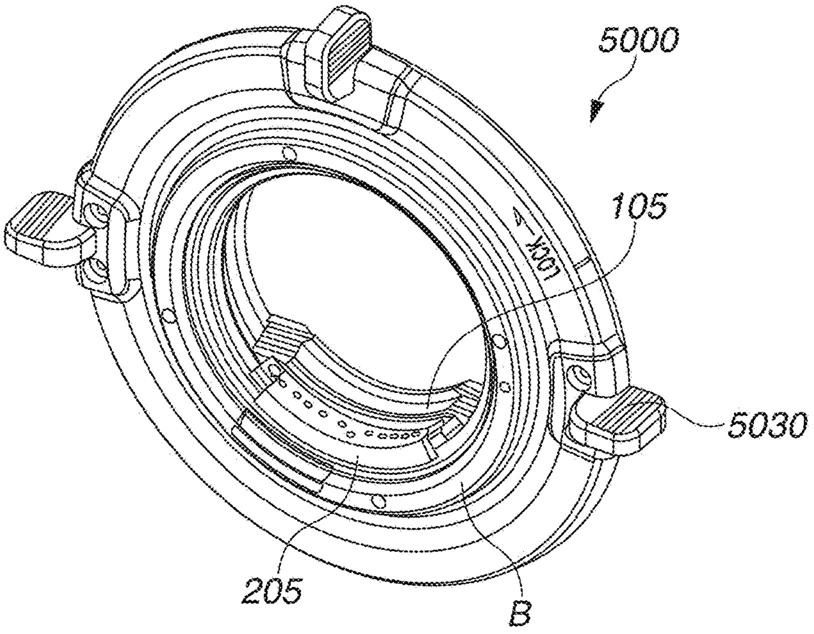
FIGS. 22A, 22B, and 22C are diagrams illustrating, as an example, a coupled state of the mount mechanism, according to the modification example.
Figure 22B:
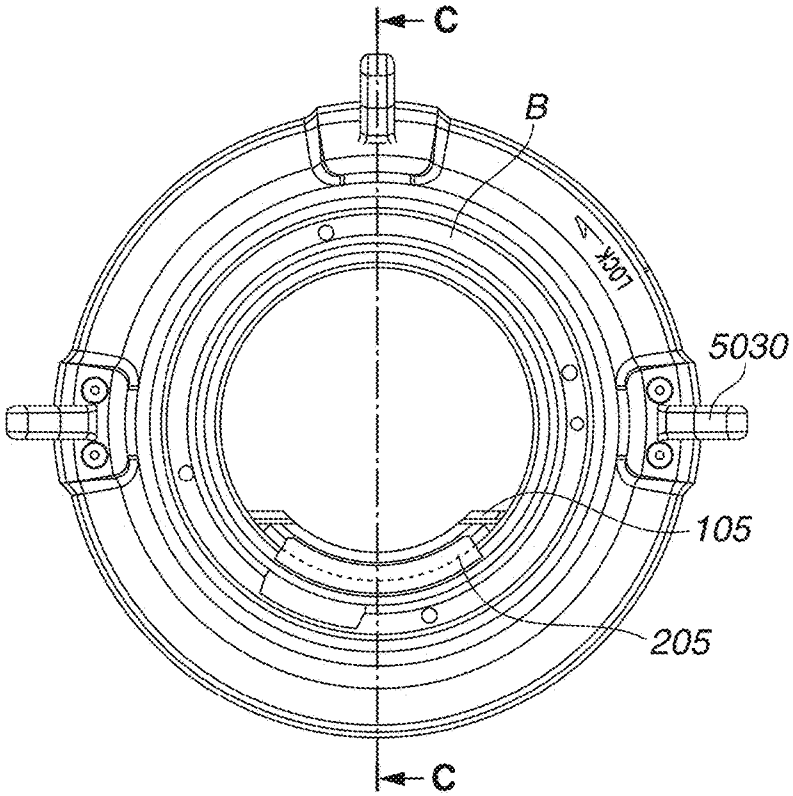
Figure 22C:
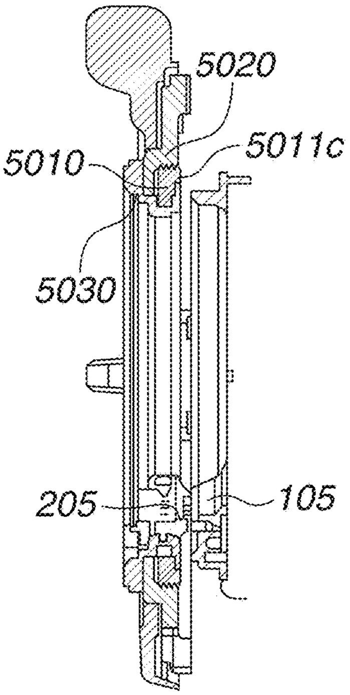

FIG. 20 is an exploded perspective view of a mount mechanism 5000 according to the modification example. FIGS. 21A, 21B, and 21C are diagrams illustrating, as an example, a non-coupled state of the mount mechanism 5000, according to the modification example. FIGS. 22A to 22C are diagrams illustrating, as an example, a coupled state of the mount mechanism 5000, according to the modification example. Furthermore, in FIG. 20 to FIGS. 22A to 22C, for ease of description, a movable mount portion 5010 of the mount mechanism 5000 and a lens mount B, which is able to be bayonet-coupled to the movable mount portion 5010, are concurrently illustrated. Moreover, the same members as those in the above-described embodiment are assigned the respective same reference numerals and are omitted from description here.

As illustrated in FIG. 20, the mount mechanism 5000 in the present modification example includes various members arranged in order from the side to which the lens mount B is attached and with an optical axis 3000 serving as a central axis of the mount mechanism 5000, i.e., an operation member 5030, a stationary mount portion 5020, a movable mount portion 5010, and a contact holding member 105. The operation member 5030 is a ring-shaped operation unit which is rotatable around the central axis, and is fixed to the movable mount portion 5010 by arm portions 5040 via screws. Furthermore, in the present modification example, the operation member 5030 and the movable mount portion 5010 are fixed to each other at a total of two positions with use of two arm portions 5040 located along a direction perpendicular to the central axis. With this configuration, in response to the operation member 5030 being operated to rotate, the movable mount portion 5010 also rotates integrally therewith around the central axis.

The movable mount portion 5010 includes movable mount tab portions 5011*a*, 5011*b*, and 5011*c*, which are able to be respectively bayonet-coupled to a plurality of tabs (bayonet tabs) provided in the lens mount B. Moreover, the movable mount portion 5010 further includes a screw portion 5012 threaded around the central axis, and, in conjunction with the rotation of the movable mount portion 5010 around the central axis, the screwed state of the screw portion 5012 with a screw portion 5022 of the stationary mount portion 5020 described below changes.

The stationary mount portion 502*s* includes a camera mount surface 5021, which is configured to come into contact with the mount surface of the lens mount B, and the screw portion 5022, which is screwed with the screw portion 5012 of the movable mount portion 5010 described above. Unlike the above-mentioned movable mount portion 5010, the stationary mount portion 5020 does not rotate around the central axis in response to the operation member 5030 being operated to rotate.

Next, a bayonet coupling method for the mount mechanism according to the present modification example is described with reference to FIGS. 21A to 21C and FIGS. 22A to 22C. Furthermore, the tabs provided in the lens mount B become engageable with the movable mount tab portions 5011*a* to 5011*c* of the movable mount portion 5010 while being inserted into the opening portion of the operation member 5030 and the opening portion of the stationary mount portion 5020. The state illustrated in FIGS. 21A to 21C is a state in which the operation member 5030 is in a non-locked position. In this state, while the mount contact surface of the lens mount B and the camera mount surface (contact surface) 5021 of the stationary mount portion 5020 are in contact with each other, the respective tab portions of the lens mount B and the movable mount portion 5010 do not engage with each other (do not overlap each other) as viewed from the central axis. FIG. 21C is a sectional view taken along line C-C illustrated in FIG. 21B. FIGS. 22A to 22C illustrate a state of the mount mechanism 5000 obtained after the operation member 5030 is operated to rotate from the state illustrated in 21A to 21C.

The state illustrated in FIGS. 22A to 22C is a state in which the operation member 5030 is in a locked position. In this state, as viewed from the central axis, the respective tab portions of the lens mount B and the movable mount portion 5010 overlap each other in a direction parallel to the mount central axis and thus engage with each other. Then, in this state, in conjunction with the operation member 5030 being operated to rotate, the screwed state of the screw portion 5022 of the stationary mount portion 5020 with the screw portion 5012 of the movable mount portion 5010 changes, and the movable mount portion 5010 moves toward the imaging apparatus side in a direction parallel to the central axis of the mount mechanism 5000. FIG. 22C is a sectional view taken along line C-C illustrated in FIG. 22B. As illustrated in FIG. 21C and FIG. 22C, in response to the mount mechanism 5000 changing from the non-locked state to the locked state, the movable mount portion 5010 moves in a direction to move away from the stationary mount portion 5020 in a direction parallel to the mount central axis (i.e., the optical axis). With this configuration, the respective movable mount tab portions 5011*a* to 5011*c* which are in the state of being engaged with the bayonet tabs provided in the lens mount B move toward the imaging apparatus side.

As described above, in the mount mechanism 5000 according to the present modification example, as the movable mount portion, which includes tabs engageable with tabs of the lens mount, rotates around the mount central axis, the movable mount portion moves with respect to the stationary mount portion in a direction parallel to the mount central axis. With this configuration, the mount mechanism 5000 according to the present modification example is able to reduce a clearance gap (backlash) occurring between the lens mount and the camera-side mount in a coupling state of the two mounts. Moreover, since, when the camera accessory is attached to and detached from the imaging apparatus, the respective terminals provided in the camera mount A and the lens mount B do not slide on each other, there is an advantage in the durability of terminals with respect to attachment and detachment of the camera accessory to and from the imaging apparatus.

Furthermore, while, in the above-described modification example, a configuration in which the mount mechanism 5000 is provided in the imaging apparatus has been described, the present modification example can be applied to a configuration in which, for example, the mount mechanism 5000 is provided in the camera accessory such as an interchangeable lens.

Moreover, the present invention can also be implemented by performing processing for supplying a program which implements the functions of the above-described embodiment to a system or apparatus via a network or a storage medium and causing one or more processors included in a computer of the system or apparatus to read out and execute the program. Moreover, the present invention can also be implemented by a circuit which implements one or more functions (for example, an application specific integrated circuit (ASIC)).

According to an embodiment of the present invention, when a plurality of terminals exhibiting respective different voltage levels is located adjacent to each other, electrical influences on electrical circuits connected to the respective terminals can be prevented or reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments.

This application claims the benefit of Japanese Patent Application No. 2018-161164 filed Aug. 30, 2018, which is hereby incorporated by reference herein in its entirety.

What is claimed is:

1. A mount device including a second mount which an accessory including a first mount is attachable to and detachable from, the mount device comprising:

a plurality of terminals arranged along a circumferential direction of the second mount and used for electrical connection with the accessory, the plurality of terminals including a first terminal which is used to supply driving electric power serving as a first voltage for driving an internal member of the accessory while the accessory is in a state of being mounted to the mount device, and a second terminal which is located adjacent to the first terminal and which exhibits a voltage that changes according to the accessory mounted to the mount device, wherein the second terminal is able to be set to an input state or an output state, and is set to the input state during a period in which the driving electric power is not output to the accessory via the first terminal.

2. The mount device according to claim 1, wherein the second terminal is set to the output state during a period in which the driving electric power is output to the accessory via the first terminal.

3. The mount device according to claim 2, wherein the second terminal becomes lower in impedance when exhibiting a voltage at low level in the output state than in the input state, and the second terminal exhibits a voltage at low level in the output state during a period in which the driving electric power is output to the accessory via the first terminal.

4. The mount device according to claim 2, further comprising:

at least one processor or circuit configured to perform the operations of the following unit; and a control unit including a port connected to the second terminal, wherein the control unit is able to set the state of the second terminal by setting the state of the port to the input state or the output state, and is able to detect a voltage of the port.

5. The mount device according to claim 4, wherein a withstand voltage of the control unit is lower than the first voltage.

6. The mount device according to claim 5, wherein the second terminal is connected to the port via a first element with a first resistance value, and is pull-up-connected to a power source unit which outputs a second voltage lower than the first voltage via a second element with a second resistance value different from the first resistance value.

7. The mount device according to claim 6, wherein the second terminal is connected to the port via the first element with the first resistance value and a third element with a third resistance value, and wherein the third resistance value is set based on the first resistance value and the second resistance value in such a manner that an upper limit of a current value which is allowed to be input to the port is not exceeded.

8. The mount device according to claim 7, wherein the control unit is able to discriminate a type of the accessory mounted to the mount device based on a voltage of the port connected to the second terminal, when the second terminal is in the input state.

9. The mount device according to claim 8, wherein the control unit is configured to perform control to cause the second terminal to be set to the output state until a predetermined time elapses after supplying of the driving electric power via the first terminal is stopped.

10. The mount device according to claim 9, wherein the predetermined time is at least longer than or equal to a time required until a voltage of the first terminal becomes lower than the second voltage after supplying of the driving electric power via the first terminal is stopped.

11. The mount device according to claim 1, further comprising a terminal holding unit having a step difference formed in a direction parallel to a central axis of the second mount as viewed from a side facing a contact surface of the second mount with the first mount, wherein the plurality of terminals includes the first terminal and the second terminal held on a first step in the step difference, and a third terminal held on a second step different from the first step in the step difference and used to detect that the accessory has been mounted to the mount device, and wherein the first step is smaller in number of terminals held thereon out of the plurality of terminals than the second step.

12. The mount device according to claim 1, wherein the mount device is provided in an imaging apparatus which the accessory is attachable to and detachable from, or an adapter which allows an interchangeable lens to be mounted thereto as the accessory.

13. The accessory detachably attached to the mount device according to claim 1.

14. A mount device including a second mount which an accessory including a first mount is attachable to and detachable from, the mount device comprising:

at least one processor or circuit configured to perform the operations of the following units;

a plurality of terminals arranged along a circumferential direction of the second mount and used for electrical connection with the accessory, the plurality of terminals including a first terminal which is used to supply electric power exhibiting a first voltage to the accessory while the accessory is in a state of being mounted to the mount device, and a second terminal which is located adjacent to the first terminal; and a control unit including a port connected to the second terminal, wherein a withstand voltage of the control unit is lower than the first voltage, and wherein the second terminal is set to an output state during a period in which the electric power of the first voltage is output to the accessory via the first terminal.

15. The mount device according to claim 14, wherein the second terminal is connected to the port via an element with a first resistance value, and is pull-up-connected to a power source unit which outputs a second voltage lower than the first voltage via an element with a second resistance value different from the first resistance value, and wherein the first resistance value is set based on the second resistance value in such a manner that an upper limit of a current value which is allowed to be input to the port is not exceeded.

16. The mount device according to claim 14, wherein the mount device is provided in an imaging apparatus which the accessory is attachable to and detachable from, or an adapter which allows an interchangeable lens to be mounted thereto as the accessory.

17. A control method for a mount device including a second mount which an accessory including a first mount is attachable to and detachable from, the control method comprising:

providing a plurality of terminals arranged along a circumferential direction of the second mount and used for electrical connection with the accessory, the plurality of terminals including a first terminal which is used to supply driving electric power serving as a first voltage for driving an internal member of the accessory while the accessory is in a state of being mounted to the mount device, and a second terminal which is located adjacent to the first terminal, which exhibits a voltage that changes according to the accessory mounted to the mount device, and which is able to be set to an input state or an output state; and setting the second terminal to the input state during a period in which the driving electric power is not output to the accessory via the first terminal.

18. A control method for a mount device including a second mount which an accessory including a first mount is attachable to and detachable from, the control method comprising:

providing a plurality of terminals arranged along a circumferential direction of the second mount and used for electrical connection with the accessory, the plurality of terminals including a first terminal which is used to supply electric power exhibiting a first voltage to the accessory while the accessory is in a state of being mounted to the mount device, and a second terminal which is located adjacent to the first terminal;

providing a control unit including a port connected to the second terminal, wherein a withstand voltage of the control unit is lower than the first voltage; and setting the second terminal to an output state during a period in which the electric power of the first voltage is output to the accessory via the first terminal.

19. A non-transitory computer-readable storage medium storing a program for causing a processor to execute a method of controlling a mount device including a second mount which an accessory including a first mount is attachable to and detachable from, the control method comprising:

providing a plurality of terminals arranged along a circumferential direction of the second mount and used for electrical connection with the accessory, the plurality of terminals including a first terminal which is used to supply driving electric power serving as a first voltage for driving an internal member of the accessory while the accessory is in a state of being mounted to the mount device, and a second terminal which is located adjacent to the first terminal, which exhibits a voltage that changes according to the accessory mounted to the mount device, and which is able to be set to an input state or an output state; and setting the second terminal to the input state during a period in which the driving electric power is not output to the accessory via the first terminal.

20. A non-transitory computer-readable storage medium storing a program for causing a processor to execute a method of controlling a mount device including a second mount which an accessory including a first mount is attachable to and detachable from, the control method comprising:

providing a plurality of terminals arranged along a circumferential direction of the second mount and used for electrical connection with the accessory, the plurality of terminals including a first terminal which is used to supply electric power exhibiting a first voltage to the accessory while the accessory is in a state of being mounted to the mount device, and a second terminal which is located adjacent to the first terminal;

providing a control unit including a port connected to the second terminal, wherein a withstand voltage of the control unit is lower than the first voltage; and setting the second terminal to an output state during a period in which the electric power of the first voltage is output to the accessory via the first terminal.

* * * * *